United States Patent
Takashima et al.

(10) Patent No.: US 12,197,062 B2
(45) Date of Patent: Jan. 14, 2025

(54) LIQUID CRYSTAL COMPOSITION FOR LIGHT-SCATTERING LIQUID CRYSTAL DEVICE, LIGHT-SCATTERING LIQUID CRYSTAL DEVICE, AND SMART WINDOW

(71) Applicant: DIC Corporation, Tokyo (JP)

(72) Inventors: Masanao Takashima, Kitaadachi-gun (JP); Shinichi Hirata, Kitaadachi-gun (JP); Kazunori Maruyama, Kitaadachi-gun (JP); Toru Fujisawa, Kitaadachi-gun (JP); Kazuaki Hatsusaka, Kitaadachi-gun (JP); Hidetoshi Nakata, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/274,906

(22) PCT Filed: Jul. 18, 2019

(86) PCT No.: PCT/JP2019/028242
§ 371 (c)(1),
(2) Date: Mar. 10, 2021

(87) PCT Pub. No.: WO2020/110364
PCT Pub. Date: Jun. 4, 2020

(65) Prior Publication Data
US 2022/0057672 A1    Feb. 24, 2022

(30) Foreign Application Priority Data

Nov. 29, 2018  (JP) ................................ 2018-223582

(51) Int. Cl.
| | |
|---|---|
| *G02F 1/1333* | (2006.01) |
| *C09K 19/12* | (2006.01) |
| *C09K 19/18* | (2006.01) |
| *C09K 19/20* | (2006.01) |
| *C09K 19/30* | (2006.01) |
| *G02F 1/1335* | (2006.01) |
| *C09K 19/04* | (2006.01) |

(52) U.S. Cl.
CPC ........ *G02F 1/133504* (2013.01); *C09K 19/12* (2013.01); *C09K 19/18* (2013.01); *C09K 19/2028* (2013.01); *C09K 19/3003* (2013.01); *C09K 19/3059* (2013.01); *C09K 2019/0448* (2013.01); *C09K 2019/122* (2013.01); *C09K 2019/181* (2013.01); *C09K 2019/2078* (2013.01); *C09K 2019/3009* (2013.01); *C09K 2019/3016* (2013.01); *C09K 2019/3063* (2013.01)

(58) Field of Classification Search
CPC .... C09K 19/12; C09K 19/18; C09K 19/3003; C09K 19/3059; C09K 19/38; C09K 2019/0448; C09K 2019/181; C09K 2019/2078; C09K 2019/3063; G02F 1/1333
See application file for complete search history.

(56) References Cited

U.S. PATENT DOCUMENTS

| | | | |
|---|---|---|---|
| 5,305,126 A | 4/1994 | Kobayashi et al. | |
| 2007/0298193 A1* | 12/2007 | Nakamura | G02B 5/0278 427/163.4 |
| 2011/0186776 A1 | 8/2011 | Kuriyama et al. | |
| 2016/0298035 A1 | 10/2016 | Fujisawa | |
| 2019/0292461 A1 | 9/2019 | Matsuda et al. | |
| 2020/0183203 A1* | 6/2020 | Tanabe | C09K 19/04 |
| 2022/0057672 A1* | 2/2022 | Takashima | C09K 19/12 |

FOREIGN PATENT DOCUMENTS

| | | | | |
|---|---|---|---|---|
| CN | 110050226 A | | 7/2019 | |
| JP | 5-119302 A | | 5/1993 | |
| JP | 2004157247 | * | 6/2004 | ............. C09K 19/02 |
| JP | 2008-58374 A | | 3/2008 | |
| JP | 2008-276197 A | | 11/2008 | |
| JP | 2011-162571 A | | 8/2011 | |
| JP | 5017963 B2 | | 9/2012 | |
| JP | 2016-206445 A | | 12/2016 | |
| TW | 201512375 A | | 4/2015 | |
| WO | 2018/043276 A1 | | 3/2018 | |
| WO | 2018/105312 A1 | | 6/2018 | |
| WO | 2018/105726 A1 | | 6/2018 | |

OTHER PUBLICATIONS

Machine translation of JP2016206445 (Year: 2016).*
Wang et al., "Electrically controllable microstructures and dynamic light scattering properties of liquid crystals with negative dielectric anisotropy", Mar. 31, 2015, RSC Adv., 5, 33489-33495 (Year: 2015).*
International Search Report dated Sep. 17, 2019, issued in counterpart International Application No. PCT/JP2019/028242 (3 pages).

* cited by examiner

*Primary Examiner* — Geraldina Visconti
(74) *Attorney, Agent, or Firm* — WHDA, LLP

(57) ABSTRACT

The present invention relates to a liquid crystal composition for a light-scattering liquid crystal device shown in FIG. 1 containing a polymerizable compound selected from the group consisting of compounds represented by the following general formula (1) as a first component and containing a compound having a negative dielectric anisotropy as a second component, a light-scattering liquid crystal device using the liquid crystal composition, and a smart window using the light-scattering liquid crystal device. A reverse mode type light-scattering liquid crystal device can have excellent transparency when no voltage is applied and a reduced driving voltage by the liquid crystal composition of the present invention.

6 Claims, 2 Drawing Sheets

LIQUID CRYSTAL COMPOSITION FOR LIGHT-SCATTERING LIQUID CRYSTAL DEVICE, LIGHT-SCATTERING LIQUID CRYSTAL DEVICE, AND SMART WINDOW

TECHNICAL FIELD

The present invention relates to a liquid crystal composition for a light-scattering liquid crystal device, a light-scattering liquid crystal device using the composition, and a smart window.

BACKGROUND ART

In recent years, along with diversification and higher performance of display applications, it is expected to realize transparent displays, liquid crystal display devices with a high contrast ratio, and dimming devices having an optical shutter function capable of dimming to a desired degree of transmission/scattering, and development of dimming materials to achieve them is an important issue.

A light-scattering liquid crystal display device using a polymer network type liquid crystal as a material for transmission/scattering type dimming device among dimming materials is a liquid crystal device system in which the liquid crystal and the polymer are phase-separated in the device to form a polymer network of the polymer. Since the light-scattering liquid crystal display device is a display system utilizing the contrast ratio between the transparent state and the white turbidity state, an optical film, such as polarizing plate, is not necessary. Accordingly, the display device has a merit of realizing a bright display, and the device configuration is also simple, compared to liquid crystal display devices of TN, STN, IPS, or VA mode using a polarizing plate. Consequently, the device is applied to optical shutter uses, such as dimming glass, and segment display uses, such as watches. In addition, in order to realize high definition display, the device is also being studied for application to projector uses, reflective display uses, etc. in combination with an active driving display device.

In recent years, liquid crystal display apparatuses with unprecedented designs, such as a transparent display and a flexible display, are also being developed for practical uses. Examples of the liquid crystal device that is expected to be used to such applications include light-scattering liquid crystal devices of a so-called reverse mode type that becomes a transparent state when no voltage is applied and becomes a scattering state when a voltage is applied, as those described in PTLs 1 and 2. These light-scattering liquid crystal devices of a reverse mode type have an advantage of excellent transparency in the transparent state, compared to light-scattering liquid crystal display devices of a so-called usual mode, that is, existing light-scattering liquid crystal devices that use a liquid crystal material having a positive dielectric anisotropy and becomes a scattering state when no voltage is applied and becomes a transparent state when a voltage is applied.

However, in order to design a light-scattering liquid crystal device of a reverse mode type, in a state when no voltage is applied, high order alignment of the liquid crystal molecules in the device and the mesogen group in the polymer network in substantially the same direction is necessary. If the alignment is insufficient when no voltage is applied, local light scattering tends to occur at the interface between the liquid crystal composition and the polymer network and between domains of the liquid crystal, and thereby white turbidity tends to remain when the liquid crystal device is in the transparent state. It is required to highly suppress such white turbidity in applications that require high transparency, such as next-generation displays.

At the same time, since the liquid crystal molecules in the device receives a strong anchoring force by the alignment with the mesogen group in the polymer network, the liquid crystal molecules are unlikely to be driven compared to those in usual liquid crystal devices, and it is difficult to obtain a practical driving voltage.

CITATION LIST

Patent Literature

PTL 1: Japanese Unexamined Patent Application Publication No. 5-119302
PTL 2: Japanese Patent No. 5017963

SUMMARY OF INVENTION

Technical Problem

Accordingly, an object to be solved by the present invention is to provide a light-scattering liquid crystal device of a reverse mode type having excellent transparency when no voltage is applied and a reduced driving voltage.

Solution to Problem

The present inventions have been studied diligently to solve the above problems and, as a result, have found that it is important to use a specific polymerizable compound in a liquid crystal composition for a light-scattering liquid crystal device of a reverse mode type, and the present invention has been accomplished.

That is, the present invention relates to a liquid crystal composition for a light-scattering liquid crystal device, the composition containing a polymerizable compound selected from the group consisting of compounds represented by the following general formula (1) as a first component and containing a compound having a negative dielectric anisotropy as a second component.

[Chem. 1]

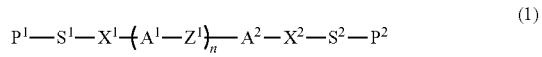

(1)

(In the formula, $P^1$ and $P^2$ each independently represent a polymerizable group;
$S^1$ and $S^2$ each independently represent a spacer group or a single bond;
$X^1$ and $X^2$, when the bonding hand with $S^1$ or $S^2$ is expressed as a leftmost bond, each independently represent —O—, —S—, —OCH$_2$—, —CO—, —COO—, —OCO—, —CO—S—, —S—CO—, —O—CO—O—, —CO—NH—, —NH—CO—, —SCH$_2$—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —COO—CH$_2$—, —OCO—CH$_2$—, —CH=CH—, —N=N—, —CH=N—N=CH—, —CF=CF—, —C≡C—, or a single bond (provided that each P—(S—X)— bond does not include —O—O—);
$Z^1$ represents —O—, —S—, —OCH—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—R$^{z1}$—, —OCO—R$^{z1}$—, —R$^{z1}$—COO—, —R$_{z1}$—OCO—, —COO—CH$_2$—, —OCO—CH$_2$—, —CH$_2$—COO—, —CH$_2$—OCO—, —CH=CH—, —CH$_2$CH$_2$—, —N=N—, —CH=N—N=CH—, —CF=CF—, —C≡C—, or a single bond (provided that —R$^{z1}$— represents an alkylene group having 2 to 6 carbon atoms and that each P—(S—X)— bond does not include —O—O—), and when multiple Z$^1$s are present, although they may be the same or different, at least one of Z$^1$s is a group selected from the group consisting of —COO—R$^{z1}$—, —OCO—R$^{z1}$—, —R$^{z1}$—COO—, and —R$^{z1}$—OCO—;

A$^1$ and A$^2$ each independently represent a group selected from divalent aromatic, alicyclic, heterocyclic, and fused rings, and when multiple A$^1$s are present, they may be the same or different; and n each independently represents an integer of 1 to 9.)

The present invention further relates to a light-scattering liquid crystal device in which a polymer network is formed by polymerizing the polymerizable compound in the light-scattering liquid crystal composition.

The present invention further relates to a smart window using the light-scattering liquid crystal device.

Advantageous Effects of Invention

According to the present invention, in a light-scattering liquid crystal device of a reverse mode type, the transparency when no voltage is applied is excellent, the driving voltage can be reduced.

DESCRIPTION OF EMBODIMENTS

Figure 1:
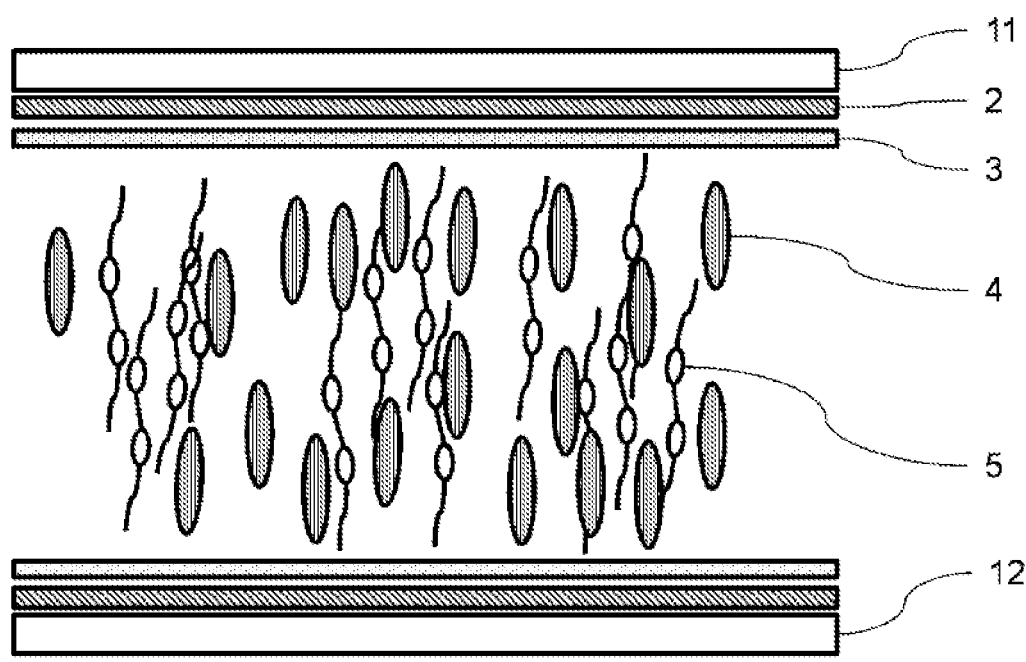
FIG. 1 is a diagram of an example of the configuration of a liquid crystal device of the present invention and schematically illustrating the state when no voltage is applied.

In the liquid crystal composition for a light-scattering liquid crystal device of the present invention contains, as described above, a polymerizable compound as a first component and a compound having a negative dielectric anisotropy as a second component are essential components.

(First Component: Polymerizable Compound)

The liquid crystal composition for a light-scattering liquid crystal device according to the present invention contains a polymerizable compound selected from the group consisting of compounds represented by the following general formula (1) as a first component.

[Chem. 2]

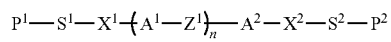
(1)

(In the formula, P$^1$ and P$^2$ each independently represent a polymerizable group;

S$^1$ and S$^2$ each independently represent a spacer group or a single bond;

X$^1$ and X$^2$ each independently represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—(CH$_2$CH$_2$)—, —OCO—(CH$_2$CH$_2$)$_m$—, —(CH$_2$CH$_2$)—COO—, —(CH$_2$CH$_2$)—OCO—, —COO—CH$_2$—, —OCO—CH$_2$—, —CH$_2$—COO—, —CH$_2$—OCO—, —CH=CH—, —CH$_2$CH$_2$—, —N=N—, —CH=N—N=CH—, —CF=CF—, —C≡C—, or a single bond (provided that each P—(S—X)— bond does not include —O—O—);

Z$^1$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—R$^{z1}$—, —OCO—R$^{z1}$—, —R$^{z1}$—COO—, —R$^{z1}$—OCO—, —COO—CH$_2$—, —OCO—CH$_2$—, —CH$_2$—COO—, —CH$_2$—OCO—, —CH=CH—, —CH$_2$CH$_2$—, —N=N—, —CH=N—N=CH—, —CF=CF—, —C≡C—, or a single bond (provided that —R$^{z1}$— represents an alkylene group having 2 to 6 carbon atoms and that each P—(S—X)— bond does not include —O—O—), and when multiple Z$^1$s are present, although they may be the same or different, at least one of Z$^1$s is a group selected from the group consisting of —COO—R$^{z1}$—, —OCO—R$^{z1}$—, —R$^{z1}$—COO—, and —R$^{z1}$—OCO—;

A$^1$ and A$^2$ each independently represent a group selected from divalent aromatic, alicyclic, heterocyclic, and fused rings, and when multiple A$^1$s are present, they may be the same or different; and n and m each independently represent an integer of 1 to 9.)

Here, in the general formula (1), the polymerizable groups represented by P$^1$ and P$^2$ are preferably those represented by the following formulae (P-1) to (P-20):

[Chem. 3]

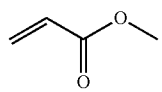
(P-1)

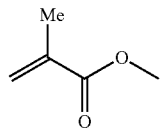
(P-2)

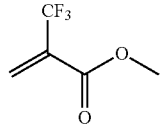
(P-3)

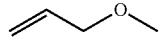
(P-4)

-continued (P-5)
(P-6)
(P-7)
(P-8)
(P-9)
(P-10)
(P-11)
(P-12)
(P-13)
(P-14)
(P-15)
(P-16)
(P-17)
(P-18)
(P-19)

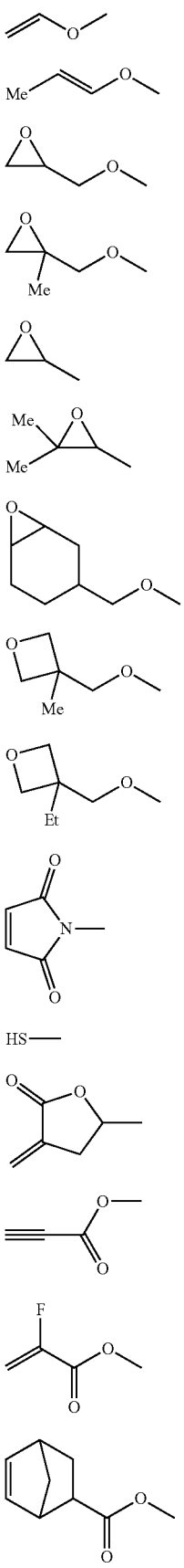

-continued (P-20)

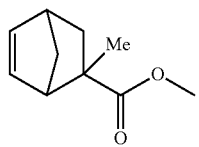

Among these polymerizable groups, from the viewpoint of enhancing the polymerizability and storage stability, the polymerizable group is preferably of a formula (P-1), (P-2), (P-7), (P-12), or (P-13), more preferably of a formula (P-1), (P-2), or (P-7), and particularly preferably of a formula (P-1) or (P-2).

In the general formula (1), $S^1$ and $S^2$ each independently represent a single bond or a spacer group and preferably an alkylene group having 1 to 18 carbon atoms from the viewpoint of especially easily expressing liquid crystallinity and reducing the driving voltage. Here, the alkylene group is preferably a linear alkylene group or a branched alkylene group, and the hydrogen atoms in the alkylene group may be substituted by one or more halogen atoms, CN groups, or alkyl groups having 1 to 8 carbon atoms and having a polymerizable group mentioned above. One $CH_2$ group or two or more non-adjacent $CH_2$ groups present in the alkylene group may be each independently substituted by —O—, —S—, —NH—, —N(CH$_3$)—, —CO—, —CH(OH)—, CH(COOH), —COO—, —OCO—, —OCOO—, —SCO—, —COS—, or —C≡C— in such a manner that oxygen atoms do not directly bond to each other.

In particular, among these spacer groups, from the viewpoint of expressing crystallinity, preferred are a linear alkylene group having 2 to 8 carbon atoms, a fluorine-substituted alkylene group having 2 to 6 carbon atoms, and an alkylene group having 4 to 14 carbon atoms in which the alkylene group is partially substituted by —O—.

In the general formula (1), the groups represented by $X^1$ and $X^2$ are, as described above, each independently —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—(CH$_2$CH$_2$)$_m$—, —OCO—(CH$_2$CH$_2$)$_m$—, —(CH$_2$CH$_2$)$_m$—COO—, —(CH$_2$CH$_2$)$_m$—OCO—, —COO—CH$_2$—, —OCO—CH$_2$—, —CH$_2$—COO—, —CH$_2$—OCO—, —CH=CH—, —CH$_2$CH$_2$—, —N=N—, —CH=N—N=CH—, —CF=CF—, —C≡C—, or a single bond and, in particular, are preferably groups selected from the group consisting of a single bond, —O—, —S—, —CO—, —COO—, and —OCO—. m's each independently represent an integer of 1 to 9.

However, in the general formula (1), each P—(S—X)— bond does not include —O—O— bond.

In the general formula (1), the group represented by $Z^1$ is, as described above, —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—R$^{z1}$—, —OCO—R$^{z1}$—, —R$^{z1}$—COO—, —R$^{z1}$—OCO—, —COO—CH$_2$—, —OCO—CH$_2$—, —CH$_2$—COO—, —CH$_2$—OCO—, —CH=CH—, —CH$_2$CH$_2$—, —N=N—, —CH=N—N=CH—, —CF=CF—, —C≡C—, or a single bond (provided that —R$^{z1}$— represents an alkylene group having 2 to 6 carbon atoms and that each P—(S—X)— bond does not include —O—O—).

When multiple Z$^1$s are present, although they may be the same or different, at least one of Z$^1$s is a group selected from the group consisting of —COO—R$^{z1}$—, —OCO—R$^{z1}$—, —R$^{z1}$—COO—, and —R$^{z1}$—OCO—.

In the present invention, since a group selected from the group consisting of —COO—R$^{z1}$—, —OCO—R$^{z1}$—, —R$^{z1}$—COO—, and —R$^{z1}$—OCO— is included as Z$^1$, the driving voltage can be reduced while maintaining the transparency when no voltage is applied in a good state. In the general formula (1), although at least one group selected from the group consisting of —COO—R$^{z1}$—, —OCO—R$^{z1}$—, —R$^{z1}$—COO—, and —R$^{z1}$—OCO— may be included, in particular, only one group is preferably included in the compound represented by the general formula (1). Especially, it is preferable that n be 2 to 4 and that one Z$^1$ be a group selected from the group consisting of —COO—R$^{z1}$—, —OCO—R$^{z1}$—, —R$^{z1}$—COO—, and —R$^{z1}$—OCO— and other Z$^1$s be single bonds, because the driving voltage can be further reduced while aligning the liquid crystal compound well to express excellent transparency when no voltage is applied. From the point of the balance between the transparency and driving voltage, —R$^{z1}$— is preferably —CH$_2$CH$_2$—.

In the general formula (1), A$^1$ and A$^2$ each independently represent a group selected from divalent aromatic, alicyclic, heterocyclic, and fused rings and, specifically, preferably a group selected from the following (a) to (c). Incidentally, when multiple A$^1$s are present, they may be the same or different.

(a) a trans-1,4-cyclohexylene group (one methylene group or two or more non-adjacent methylene groups present in this group may be substituted by —O— or —S—);
(b) a phenylene group (one —CH═ group or two or more non-adjacent —CH═ groups present in this group may be substituted by a nitrogen atom); and
(c) a cyclohexenylene group, a bicyclo(2.2.2)octylene group, a piperidine group, a naphthalene group, a decahydronaphthalene group, and a tetrahydronaphthalene group,
(one or two or more hydrogen atoms present in the above-mentioned groups (a), (b), (c) may be each independently substituted by a fluorine atom, a chlorine atom, an alkyl group having 1 to 8 carbon atoms, a halogenated alkyl group having 1 to 8 carbon atoms, a halogenated alkoxy group having 1 to 8 carbon atoms, or an alkoxy group having 1 to 8 carbon atoms).

Among these groups, from the point of easily expressing liquid crystallinity, the groups (a) and (b) are preferable, and it is particularly preferable to have the group (a) as an essential structure.

In the general formula (1), n represents an integer of 1 to 9, and n is preferably 1 to 5, more preferably 2 to 5, and particularly preferably 2 to 4.

As the compound represented by the general formula (1), further specifically, compounds represented by the following formulae (1-1) to (1-24) can be exemplified.

[Chem. 4]

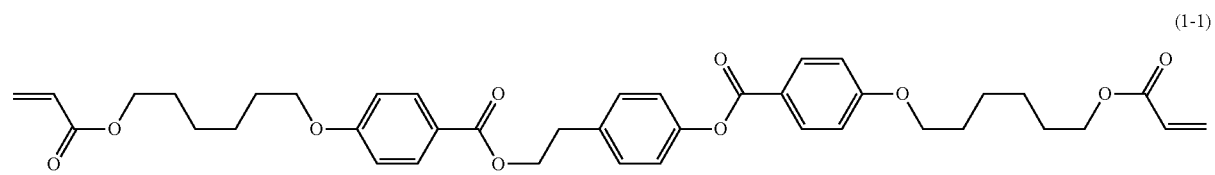

(1-1)

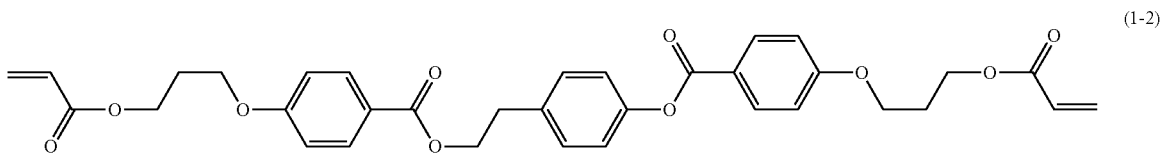

(1-2)

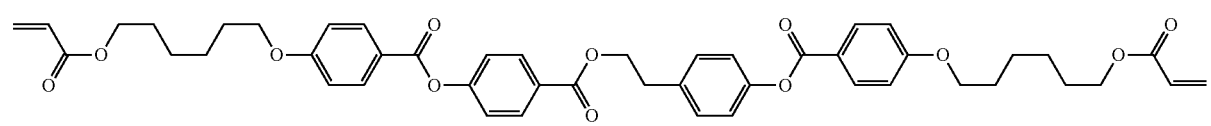

(1-3)

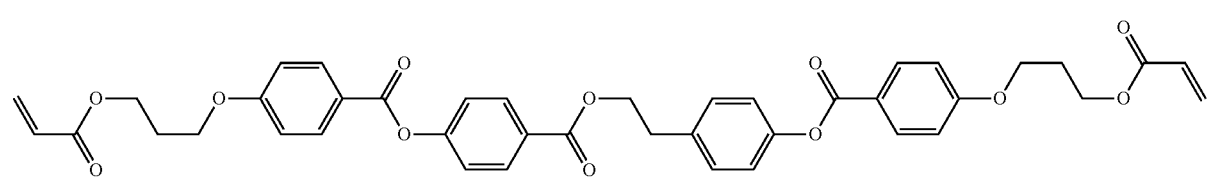

(1-4)

[Chem. 5]
(1-5)
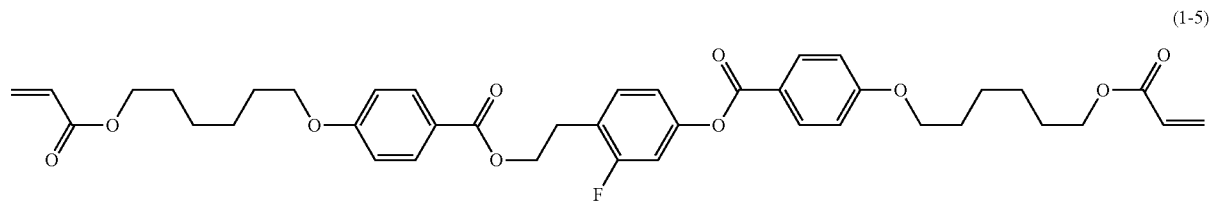
(1-6)
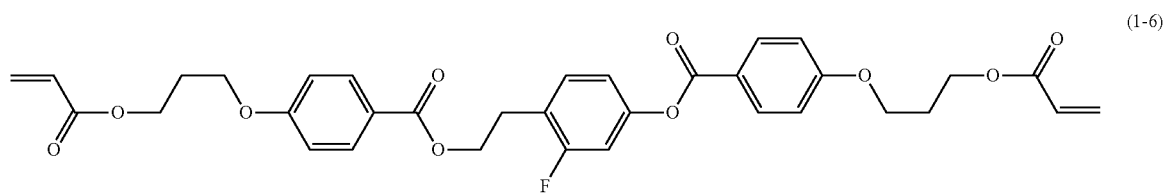
(1-7)
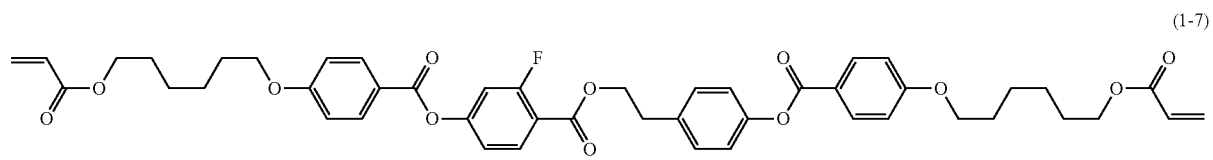
(1-8)
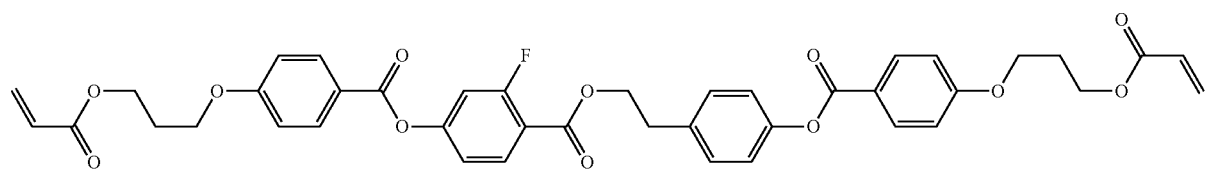
[Chem. 6]
(1-9)
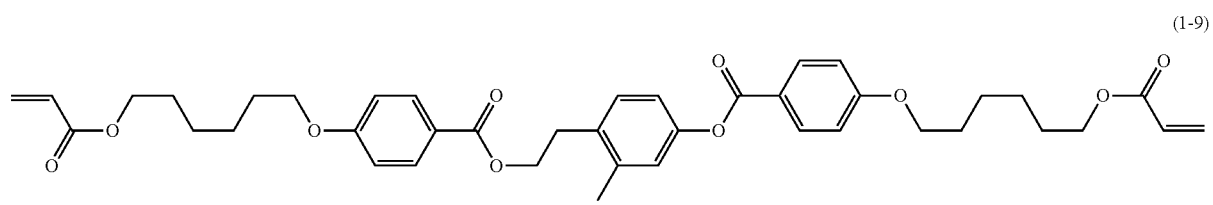
(1-10)
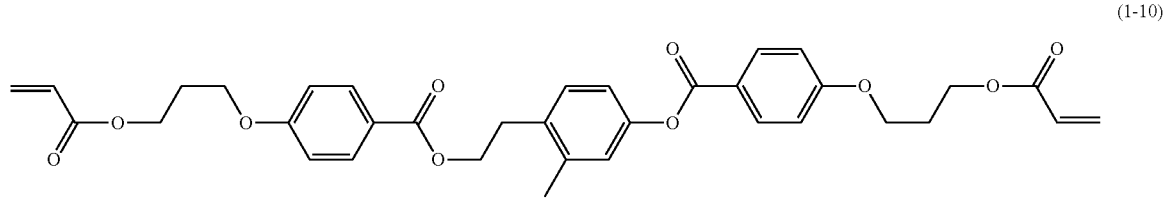
(1-11)
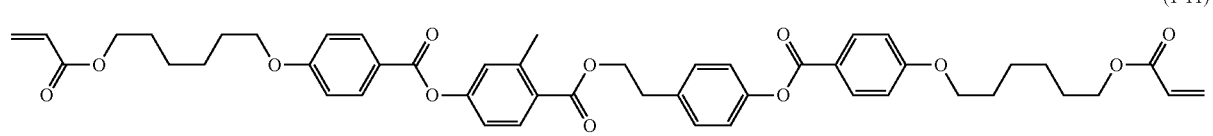
(1-12)
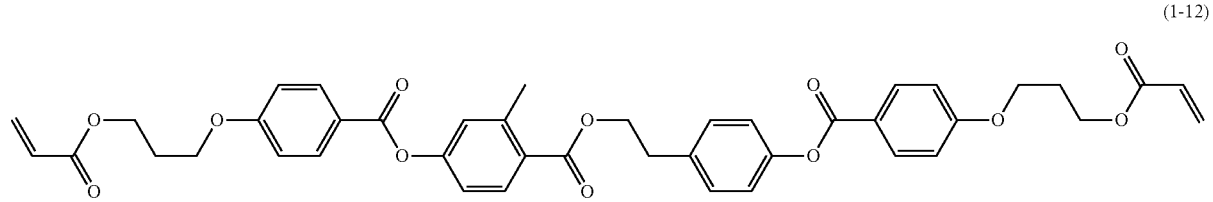

-continued
[Chem. 7]
(1-13)
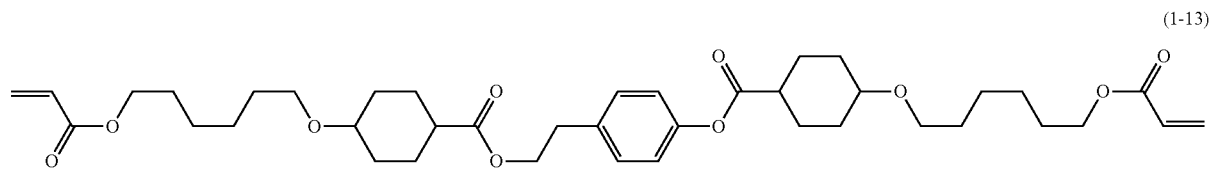
(1-14)
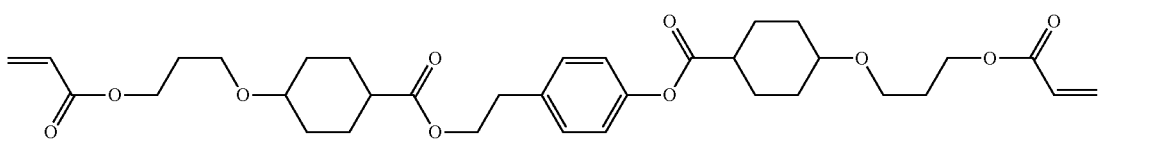
(1-15)
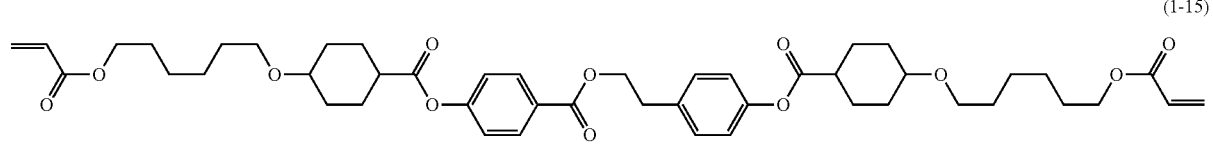
(1-16)
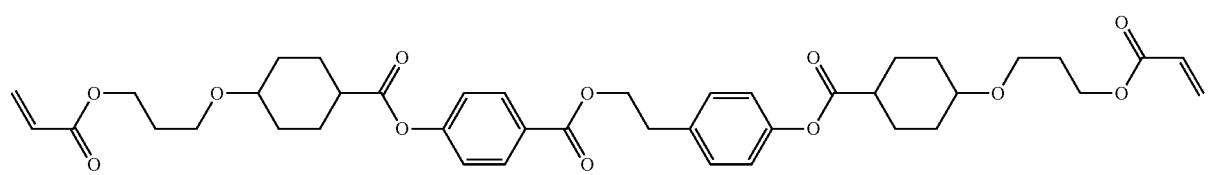
[Chem. 8]
(1-17)
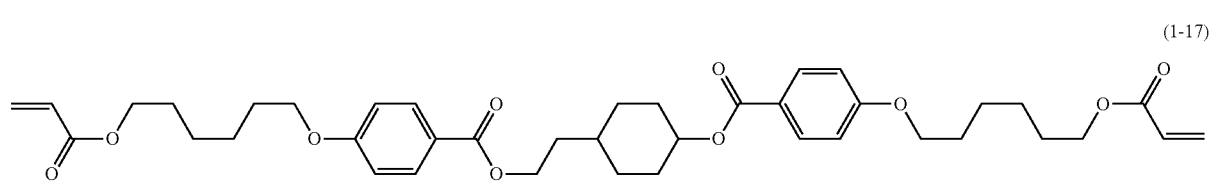
(1-18)
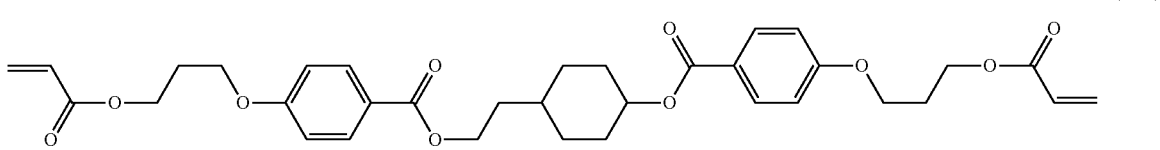
(1-19)
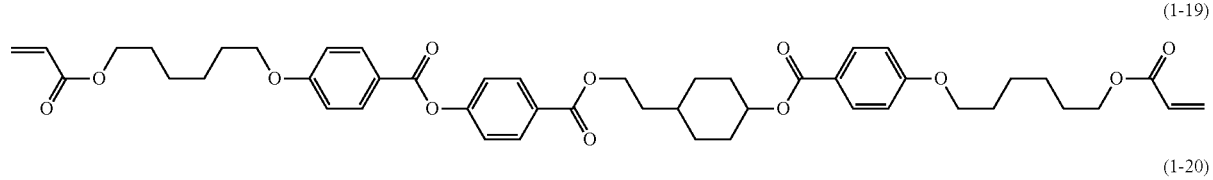
(1-20)
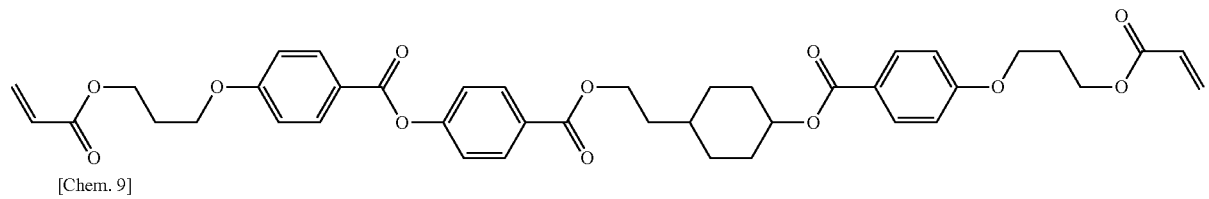
[Chem. 9]
(1-21)
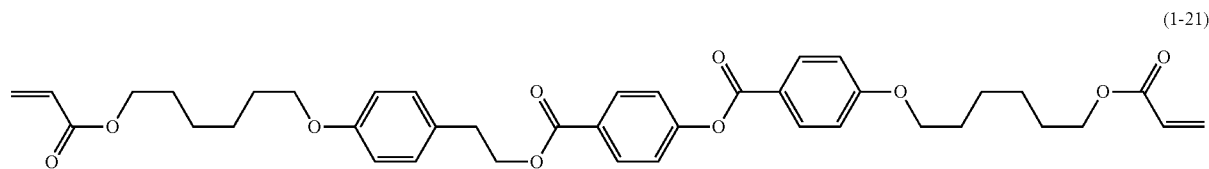

-continued

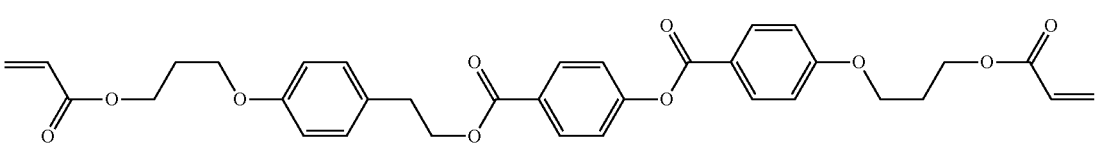
(1-22)

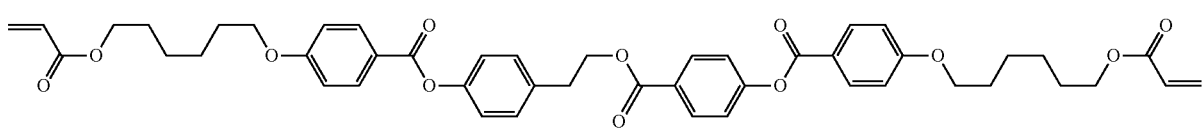
(1-23)

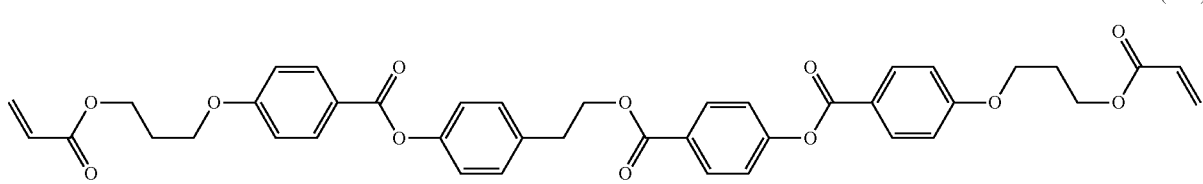
(1-24)

Among the compounds represented by the general formulae (1-1) to (1-24), the compounds represented by general formulae (1-1) to (1-20) are preferable for expressing liquid crystallinity, the compounds represented by general formulae (1-1) to (1-12) are more preferable for expression of liquid crystallinity and a reduction in the voltage, and the compounds represented by general formulae (1-1) to (1-4) are particularly preferable for expressing liquid crystallinity, a reduction in voltage contrast, and haze properties.

The content of the polymerizable compound represented by the general formula (1) with respect to 100 mass % of the liquid crystal composition for a light-scattering liquid crystal device according to the present invention is preferably 2 mass % or more, more preferably 3 mass % or more, further preferably 4 mass % or more, and particularly preferably 5 mass % or more from the viewpoint of forming a polymer network in the resulting liquid crystal device, and the upper limit is preferably 20 mass % or less, more preferably 15 mass % or less, further preferably 12 mass % or less, and particularly preferably 10 mass % or less from the viewpoint of reducing the driving voltage of the resulting liquid crystal device. Incidentally, the polymerizable compounds represented by the general formula (1) described in detail above as the first component may be used alone or in combination of two or more.

(Third Component: Polymerizable Compound)

In the present invention, as the polymerizable component, in addition to the first component, a third component can be used depending on the desired performance.

In this case, the total mass of the first component and the third component with respect to 100 mass % of the liquid crystal composition for a light-scattering liquid crystal device according to the present invention is preferably 2 mass % or more, more preferably 3 mass % or more, further preferably 4 mass % or more, and particularly preferably 5 mass % or more from the viewpoint of forming a polymer network, and is also preferably 20 mass % or less, more preferably 15 mass % or less, further preferably 12 mass % or less, and particularly preferably 10 mass % or less from the viewpoint of the driving voltage and light-scattering properties of the liquid crystal device.

In addition, the proportion of the first component with respect to the total mass of the first component and the third component is preferably 10 mass % or more, more preferably 15 mass % or more, further preferably 20 mass % or more, further preferably 25 mass % or more, and particularly preferably 40 mass % or more from the point of enhancing the transparency when no voltage is applied to further improve the contrast and is more preferably 95 mass % or less, further preferably 90 mass % or less, and particularly preferably 85 mass % or less from the point of more enhancing the light-scattering properties in a reverse mode or the viewpoint of a reduction in driving voltage.

As the third component that is used in the liquid crystal composition for a light-scattering liquid crystal device according to the present invention, specifically, polymerizable compounds represented by the following general formula (2-ii) are preferable because the driving voltage can be reduced.

[Chem. 10]

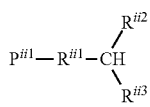
(2-ii)

In the formula, $P^{ii1}$ represents a polymerizable functional group, specifically, a polymerizable group and is preferably a polymerizable group selected from the following formulae (P-1) to (P-20):

[Chem. 11]

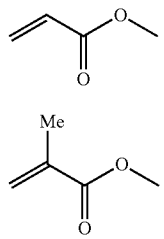
(P-1)

(P-2)

(P-3) 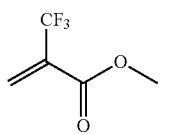

(P-4) 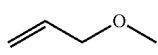

(P-5) 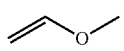

(P-6) 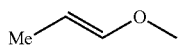

(P-7) 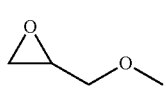

(P-8) 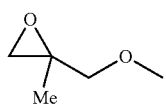

(P-9) 

(P-10) 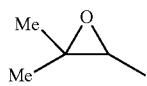

(P-11) 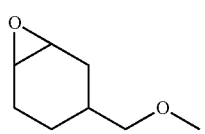

(P-12) 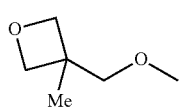

(P-13) 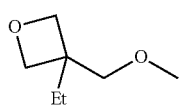

(P-14) 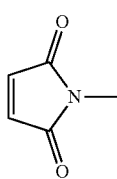

(P-15) 

(P-16) 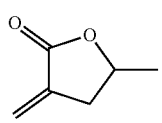

(P-17) 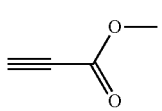

(P-18) 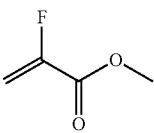

(P-19) 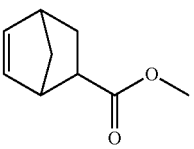

(P-20) 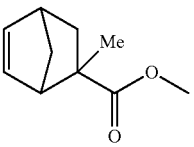

Among these polymerizable groups, from the viewpoint of enhancing the polymerizability and storage stability, the polymerizable group is preferably of the formula (P-1), (P-2), (P-7), (P-12), or (P-13) and more preferably of the formula (P-1), (P-7), or (P-12).

$R^{ii1}$ represents a single bond or an alkylene group having 1 to 9 carbon atoms, and one or two or more —CH$_2$— groups in the alkylene group may be each independently substituted by —O—, —CO—, —COO—, or —OCO— in such a manner that oxygen atoms are not directly adjacent to each other, and one or two or more hydrogen atoms present in the alkylene group may be each independently substituted by a fluorine atom.

$R^{ii1}$ is preferably an alkylene group having 1 to 6 carbon atoms and more preferably an alkylene group having 1 to 3 carbon atoms.

In the general formula (2-ii), $R^{ii2}$ and $R^{ii3}$ preferably each independently represent an alkyl group having 1 to 21 carbon atoms in which one or two or more non-adjacent —CH$_2$— groups may be substituted by —O— and one or two or more of hydrogen atoms may be each independently substituted by $P^{ii2}$, more preferably represent an alkyl group having 3 to 16 carbon atoms in which one or two or more hydrogen atoms may be each independently substituted by $P^{ii2}$, further preferably represent an alkyl group having 5 to 14 carbon atoms in which one or two or more hydrogen atoms may be each independently substituted by $P^{ii2}$, and particularly preferably represent an alkyl group having 6 to 12 carbon atoms because crystallinity can be suppressed. Here, $P^{ii2}$ represents an alkyl group having 1 to 6 carbon atoms.

In addition, $R^{ii2}$ and $R^{ii3}$ each independently represent a hydrogen atom or an alkyl group having 1 to 21 carbon atoms, and one or two or more —CH$_2$— groups in the alkyl group may be each independently substituted by —O—, —CO—, —COO—, or —OCO— in such a manner that oxygen atoms are not directly adjacent to each other, and one or two or more hydrogen atoms present in the alkyl group may be each independently substituted by $P^{ii2}$, a fluorine atom, an alkyl group having 1 to 8 carbon atoms, or a halogenated alkyl group having 1 to 8 carbon atoms.

In the general formula (2-ii), the total of the numbers of carbon atoms contained in $R^{ii1}$, $R^{ii2}$, and $R^{ii3}$ is preferably 3 to 30, more preferably 4 to 28, further preferably 5 to 26, further preferably 6 to 24, and particularly preferably 12 to 24.

Examples of the compound represented by the general formula (2-ii) include mono(meth)acrylates having a linear alkyl chain, such as ethyl (meth)acrylate, 2-hydroxyethyl acrylate, propyl (meth)acrylate, butyl (meth)acrylate, isobutyl (meth)acrylate, octyl (meth)acrylate, dodecyl (meth)acrylate, and stearyl (meth)acrylate, and mono(meth) acrylates having a branched alkyl chain represented by any of the following structures.

[Chem. 12]

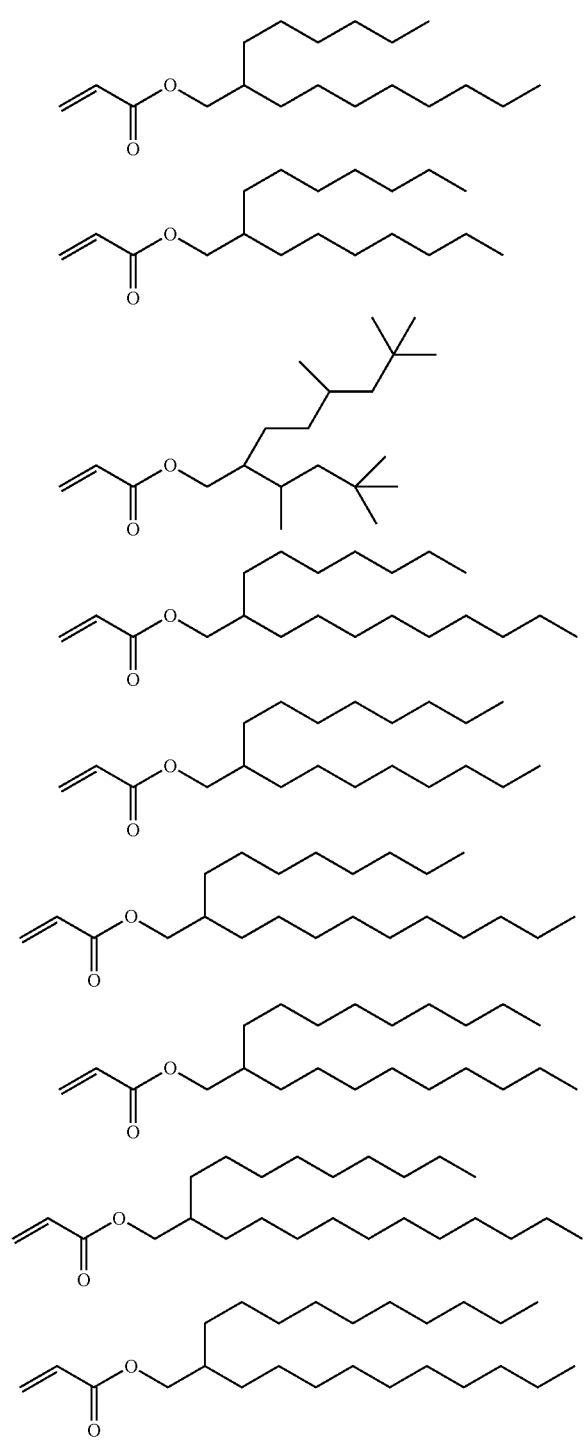

-continued

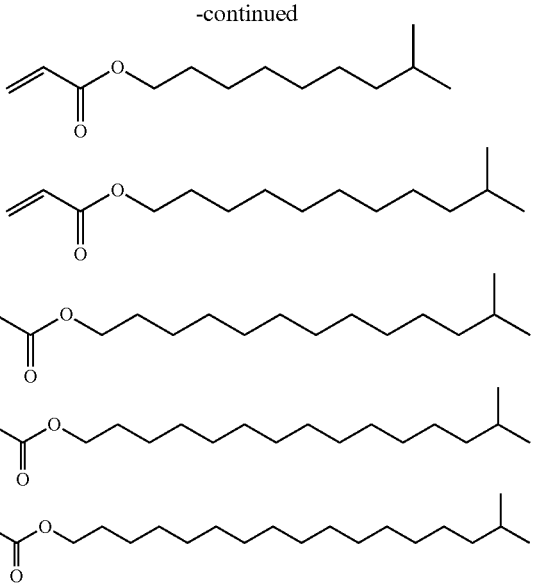

In addition, examples of the compound represented by the general formula (2-ii) include those in which $R^{ii2}$ in the general formula (2-ii) is an acrylate having a linear or branched ether chain structure. The acrylate having an ether chain structure is preferably a compound having any of the following structures:

[Chem. 13]

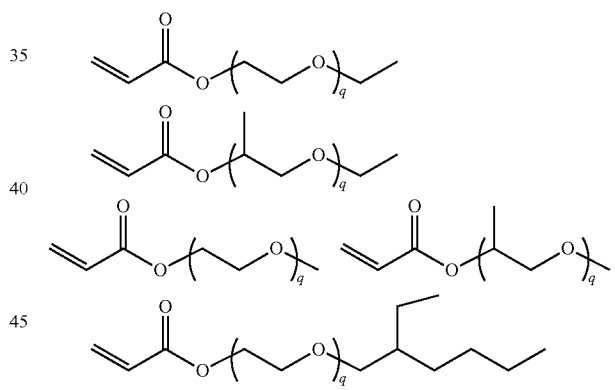

(in the formulae, q represents an integer of 1 to 10).

Among these compounds, in particular, from the point of making the driving voltage-reducing effect significant while maintaining good transparency when no voltage is applied, it is preferable to use a mono(meth)acrylate having a branched alkyl chain.

Here, the content of the polymerizable compound represented by the general formula (2-ii) with respect to 100 mass % of the total amount of the polymerizable component including the first component, i.e., with respect to 100 mass % of the total amount of the polymerizable compounds used in the liquid crystal composition for a light-scattering liquid crystal device of the present invention, is more preferably 5 mass % or more, 10 mass % or more, 15 mass % or more, 20 mass % or more, or 25 mass % or more from the viewpoint of a reduction in the voltage and is further preferably 60 mass % or less or 55 mass % or less from the viewpoint of maintaining the strength of the polymer network.

In addition, in the present invention, it is preferable to use a polymerizable compound represented by the following formula (3-i) as a third component instead of the polymerizable compound represented by the general formula (2-ii) or together with the polymerizable compound represented by the general formula (2-ii).

[Chem. 14]

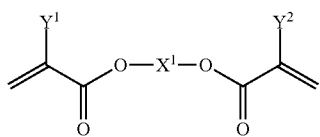

(3-i)

(In the formula, $Y^1$ and $Y^2$ each represent a hydrogen atom or a methyl group; and
$X^1$ represents a linear or branched alkylene having 4 to 80 carbon atoms, where an arbitrary carbon atom of the alkylene may be substituted by —O—, —CH=CH—, —CO—, —C≡C—, —OCO—, —COO—, or OH in such a manner that oxygen atoms are not directly adjacent to each other.)

Here, in the general formula (3-i), although the number of the carbon atoms of the linear or branched alkylene as $X^1$ is within a range of 6 to 80, the number of carbon atoms is preferably within a range of 7 to 70, in particular, within a range of 8 to 60, and especially, within a range of 9 to 50 from the point of a reduction in the driving voltage.

In addition, $X^1$ in the general formula (3-i) is preferably alkylene having 6 to 80 carbon atoms where an alkylidene group is included in the alkylene from the point of a reduction in the driving voltage. Here, the alkylidene group is preferably an ethylidene group or a 2,2-propylidene group.

Further specifically, $X^1$ preferably includes a structural portion represented by the following structural formula (i-1) or structural formula (i-2) as a partial structure or a repeat unit.

[Chem. 15]

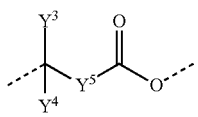

(i-1)

(In the structural formula (i-1), $Y^3$ and $Y^4$ each represent a methyl group or a hydrogen atom, where at least one of Y and $Y^4$ is a methyl group; $Y^5$ represents a single bond, a methylene group, or a 1,3-propylene group; and the broken lines represent bonding hands.)

[Chem. 16]

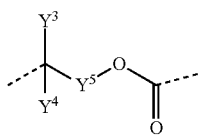

(i-2)

(In the structural formula (i-2), $Y^3$ and $Y^4$ each represent a methyl group or a hydrogen atom, where at least one of $Y^3$ and $Y^4$ is a methyl group; $Y^5$ represents a single bond, a methylene group, or a 1,3-propylene group; and the broken lines represent bonding hands.)

Examples of the polymerizable compound represented by the general formula (3-i) include those having the following structures:

[Chem. 17]

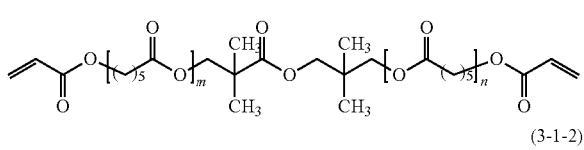

(3-1-1)

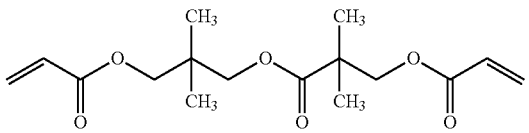

(3-1-2)

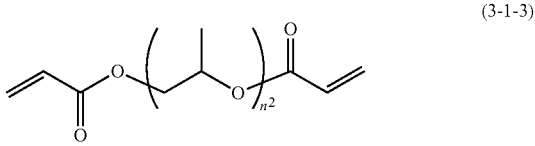

(3-1-3)

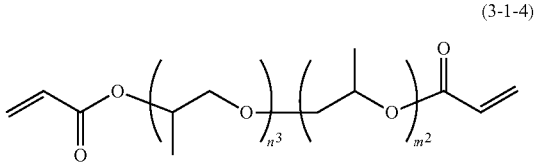

(3-1-4)

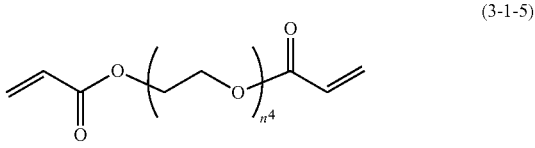

(3-1-5)

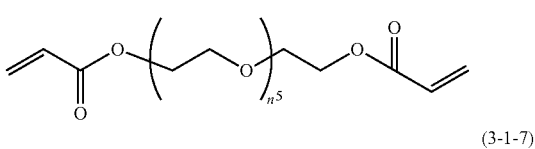

(3-1-6)

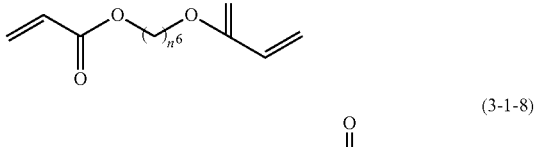

(3-1-7)

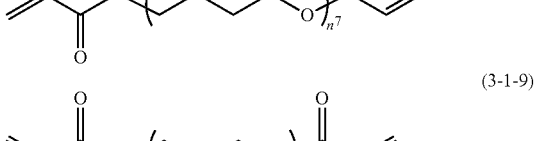

(3-1-8)

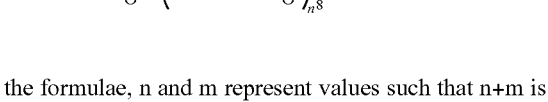

(3-1-9)

(in the formulae, n and m represent values such that n+m is 1 to 10; $n^2$ represents 1 to 18; $n^3$ and $m^2$ represent values such that $n^3+m^2$ is 1 to 18; $n^4$ represents 1 to 23; $n^5$ represents 1 to 23; $n^6$ represents 4 to 30; $n^7$ represents 2 to 10; and $n^8$ represents 2 to 10).

Here, the content of the polymerizable compound represented by the general formula (3-i) with respect to 100 mass % of the total amount of the polymerizable component including the first component, i.e., with respect to 100 mass % of the total amount of the polymerizable compounds used in the liquid crystal composition for a light-scattering liquid crystal device of the present invention, is more preferably 5 mass % or more, 10 mass % or more, 15 mass % or more, 20 mass % or more, or 25 mass % or more from the viewpoint of a reduction in the voltage and is further preferably 60 mass % or less or 55 mass % or less from the viewpoint of maintaining the strength of the polymer network.

In the present invention, a polymerizable compound represented by the general formula (2-ii) and/or a polymerizable compound represented by the general formula (3-i) can be preferably used as the third component, and another polymerizable compound (hereinafter, abbreviated as "optional polymerizable compound") may be used in combination within a range that does not impair the effects of the present invention.

Preferred examples of the optional polymerizable compound include compounds represented by the following general formulae (2) to (8) (provided that the first component, the polymerizable compounds represented by the general formula (2-ii), and the polymerizable compounds represented by the general formula (3-i) are excluded).

[Chem. 18]

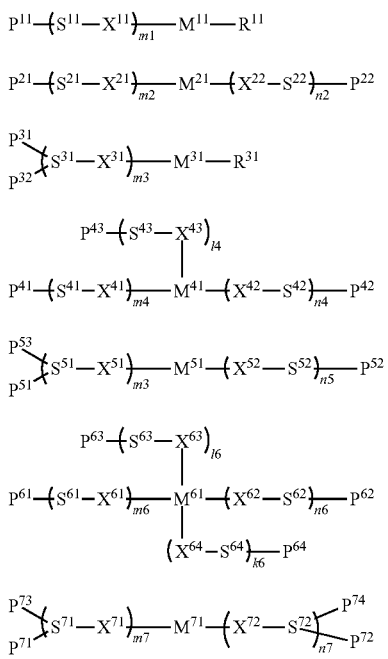

In the formulae (2) to (8), $P^{11}$ to $P^{74}$ represent polymerizable groups selected from the formulae (P-1) to (P-20) and are, among these polymerizable groups, preferably of the formula (P-1), (P-2), (P-7), (P-12), or (P-13) and more preferably of the formula (P-1), (P-7), or (P-12) from the viewpoint of enhancing the polymerizability and storage stability.

$X^{11}$ to $X^{72}$ each independently represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, and in each of $X^{11}$ to $X^{72}$, when multiple X"s are present, they may be the same or different (provided that each P—(S—X)— bond does not include —O—O—). In particular, a group selected from a single bond, —O—, —S—, —CO—, —COO—, and —OCO— is preferable.

$M^{11}$, $M^{21}$, $M^{31}$, $M^{51}$, and $M^{71}$ each independently represent a mesogen group represented by the following general formula (9-a):

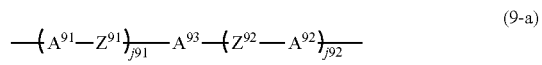

(9-a)

(in the general formula (9-a), $A^{91}$, $A^{92}$, and $A^{93}$ are each independently a divalent group having at least one ring structure, the divalent group being a group selected from a 1,2-cyclopropylene group, a 1,3-cyclobutylene group, a 2,5-cyclopentylene group, an octahydro-4,7-methano-1H-indene-1,5-diyl group, an octahydro-4,7-methano-1H-indene-1,6-diyl group, an octahydro-4,7-methano-1H-indene-2,5-diyl group, a tricyclo[3.3.1.1$^{3,7}$]-1,3-diyl group, a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2.2.2)octylene group, a decahydronaphthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a naphthylene-1,4-diyl group, a naphthylene-1,5-diyl group, a naphthylene-1,6-diyl group, a naphthylene-2,6-diyl group, a phenanthrene-2,7-diyl group, a 9,10-dihydrophenanthrene-2,7-diyl group, a benzothiazole group, a 1,2,3,4,4a,9,10a-octahydrophenanthrene-2,7-diyl group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzosenopheno[3,2-b]selenophene-2,7-diyl group, and a fluorene-2,7-diyl group, where these groups may be unsubstituted or may be substituted by one or more $L^1$, and when multiple $A^{91}$s and/or $A^{92}$s are present, they may be the same or different; $Z^{91}$ and $Z^{92}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, or a single bond, and multiple $Z^{91}$s and/or $Z^{92}$s are present, they may be the same or different;

j91 and j92 each independently represent 0 to 4, and j91+j92 represent an integer of 1 to 4; and $L^1$ represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —$CH_2$— group or two or more non-adjacent —$CH_2$— groups may be each independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, —N=N—, —$CR^1$=N—, N=$CR^1$—, or —C≡C—, where an arbitrary hydrogen atom in the alkyl group may be substituted by a fluorine atom (incidentally, $R^1$ represents a hydrogen atom or an alkyl group having 1 to 20 carbon atoms, where the alkyl group may be linear or branched, an arbitrary hydrogen atom in the alkyl group may be substituted by a fluorine atom, and one —$CH_2$— group or two or more non-adjacent —$CH_2$— groups in the alkyl group may be each independently substituted by —O—, —S—, —CO—, —COO—, —OCO—, —CO—S—, —S—CO—, —O—CO—O—, —CO—NH—, —NH—CO—, or —C≡C—)).

In addition, $M^{41}$ is a trivalent organic group having a ring structure exemplified as the above-described $A^{91}$, $A^{92}$, or $A^{93}$, and $M^{61}$ is a tetravalent organic group having a ring structure exemplified as the above-described $A^{91}$, $A^{92}$, or $A^{93}$.

In the general formulae (2) to (8), $R^{11}$ and $R^{31}$ each represent a hydrogen atom, a fluorine atom, a chlorine atom, a bromine atom, an iodine atom, a cyano group, or an alkyl group having 1 to 20 carbon atoms, where the alkyl group may be linear or branched, an arbitrary hydrogen atom in the alkyl group may be substituted by a fluorine atom, and one —$CH_2$— group or two or more non-adjacent —$CH_2$— groups in the alkyl group may be each independently substituted by —O—, —S—, —CO—, —COO—, —OCO—, —CO—S—, —S—CO—, —O—CO—O—, —CO—NH—, —NH—CO—, or —C≡C—;

m1 to m7, n2 to n7, 14 to 16, and k6 each independently represent an integer of 0 to 5.)

In the general formulae (2) to (8), $S^{11}$ to $S^{72}$ each independently represent a spacer group or a single bond, the spacer group represented by $S^{11}$ to $S^{72}$ represents an alkylene group having 1 to 18 carbon atoms (the alkylene group may be substituted by one or more halogen atoms, CN groups, alkyl groups having 1 to 8 carbon atoms, or alkyl groups having 1 to 8 carbon atoms and having a polymerizable functional group, and one $CH_2$ group or two or more non-adjacent $CH_2$ groups present in this group may be each independently substituted by —O—, —S—, —NH—, —N($CH_3$)—, —CO—, —CH(OH)—, CH(COOH), —COO—, —OCO—, —OCOO—, —SCO—, —COS—, or —C≡C— in such a manner that oxygen atoms do not directly bond to each other. Among these spacer groups, from the viewpoint of alignment properties, preferred are a linear alkylene group having 2 to 8 carbon atoms, a fluorine-substituted alkylene group having 2 to 6 carbon atoms, and an alkylene group having 5 to 14 carbon atoms in which the alkylene group is partially substituted by —O—. In addition, in each of $S^{11}$ to $S^{72}$, when multiple S″s are present, they may be the same or different.

In the general formulae (2) to (8), m1 to m7, n2 to n7, 14 to 16, and k6 each independently represent an integer of 0 to 5, and m1 to m7, n2 to n7, 14 to 16, and k6 are preferably each independently 0 or 1.

Specifically, the polymerizable compound represented by the general formula (2) is preferably a polymerizable compound represented by any of the following formulae (2-1) to (2-39).

[Chem. 19]

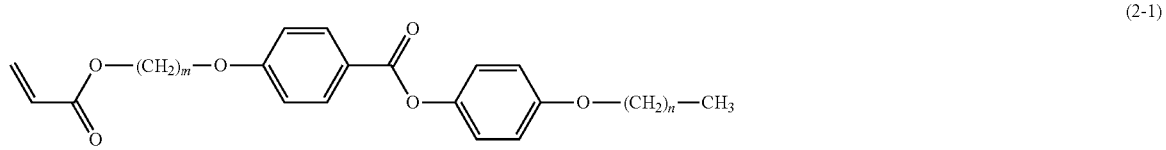

(2-1)

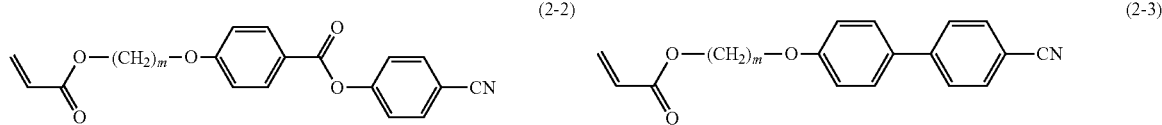

(2-2)

(2-3)

(2-4)

(2-5)

-continued
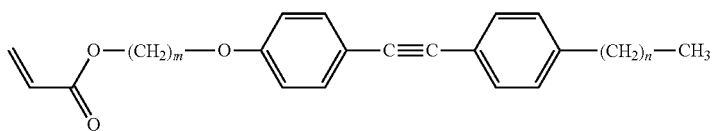
(2-6)
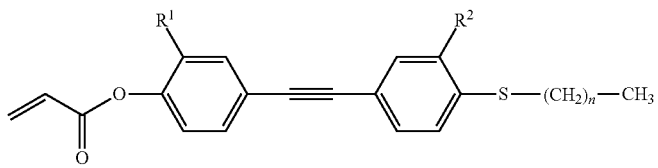
(2-7)
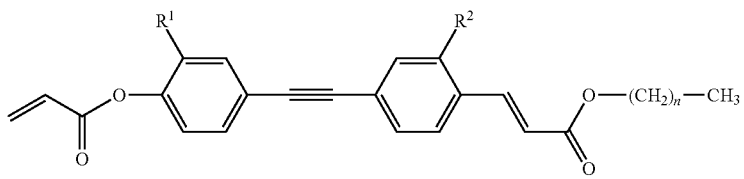
(2-8)
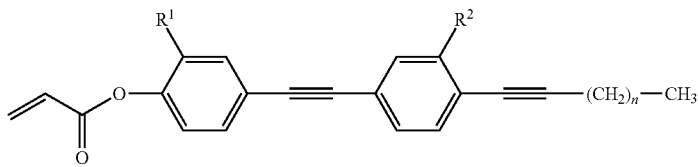
(2-9)
[Chem. 20]
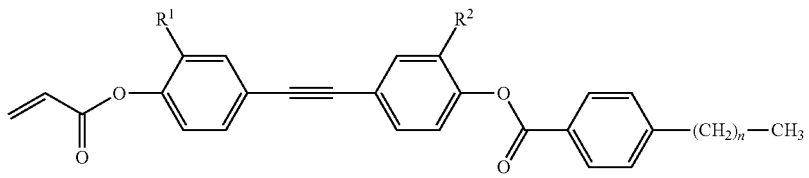
(2-10)
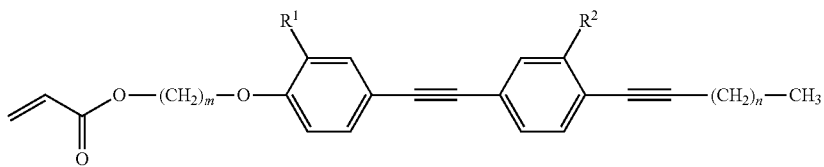
(2-11)
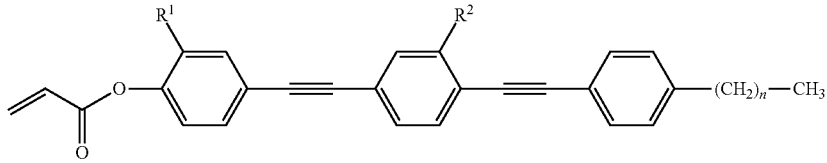
(2-12)
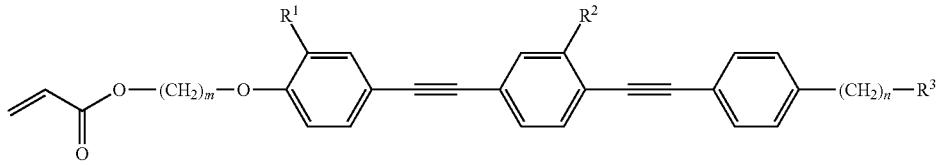
(2-13)
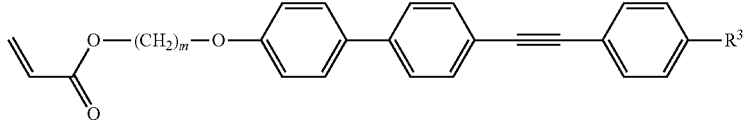
(2-14)

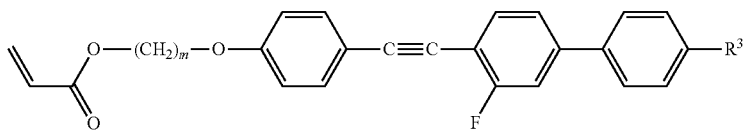
(2-15)
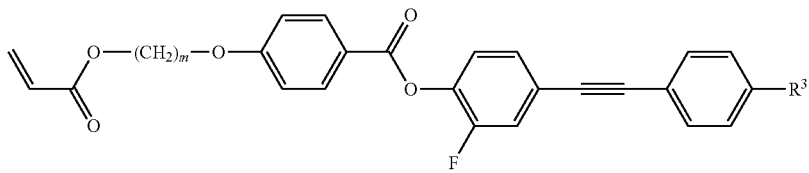
(2-16)
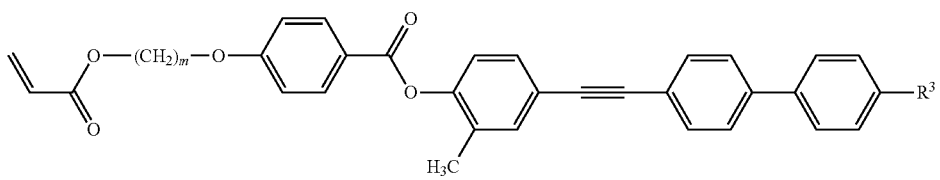
(2-17)
[Chem. 21]
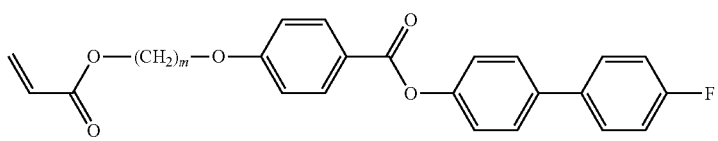
(2-18)
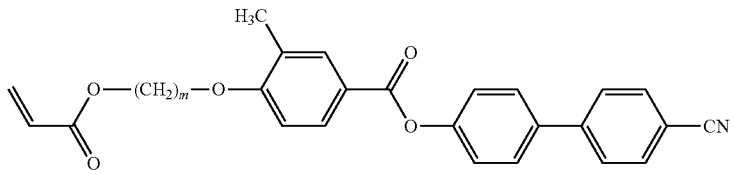
(2-19)
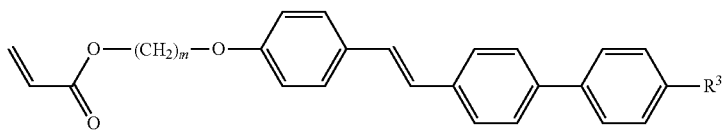
(2-20)
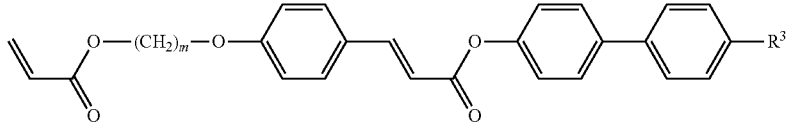
(2-21)
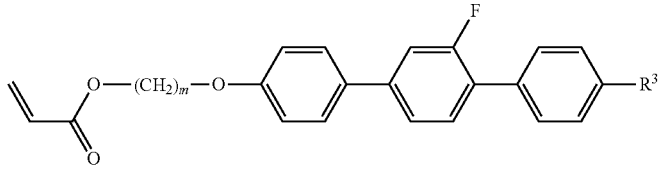
(2-22)
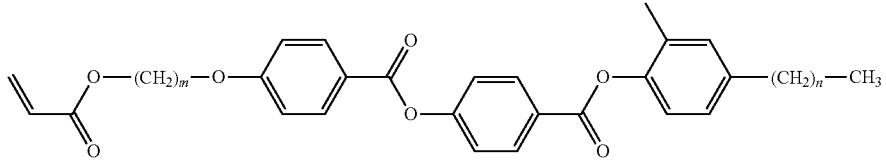
(2-23)

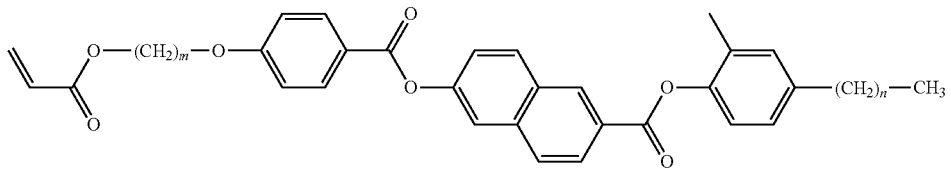
(2-24)
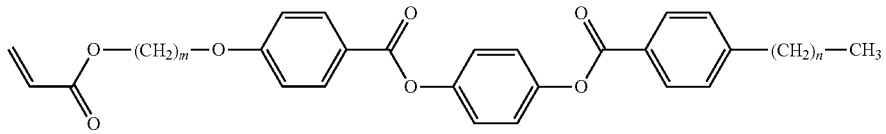
(2-25)
[Chem. 22]
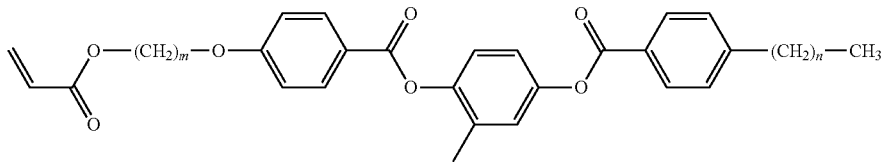
(2-26)
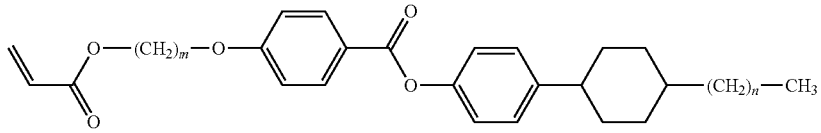
(2-27)
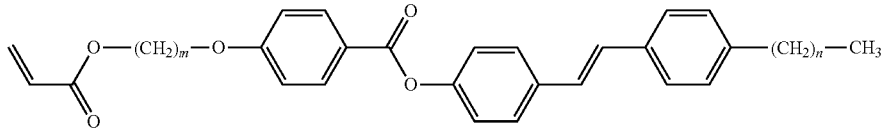
(2-28)
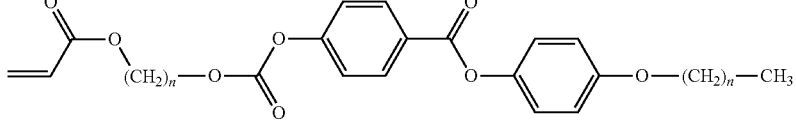
(2-29)
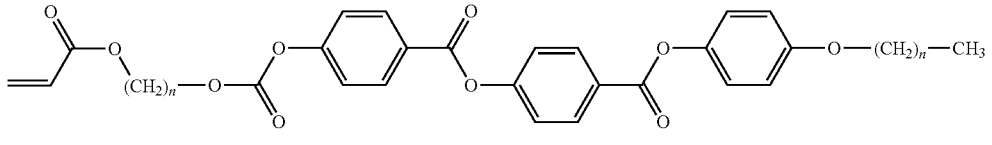
(2-30)
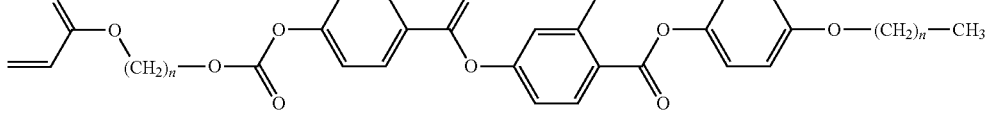
(2-31)
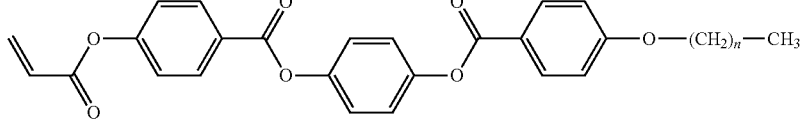
(2-32)
[Chem. 23]
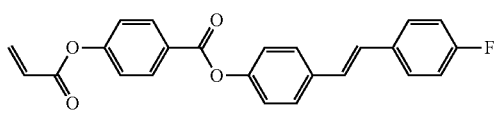
(2-33)
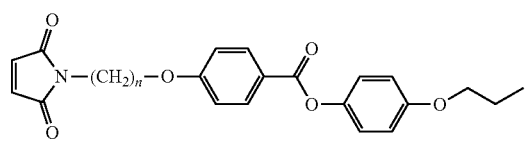
(2-34)

-continued

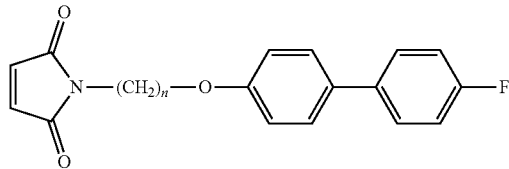
(2-35)

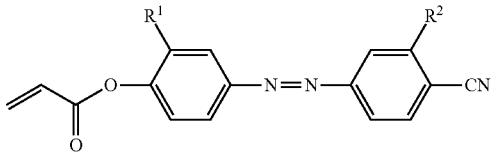
(2-36)

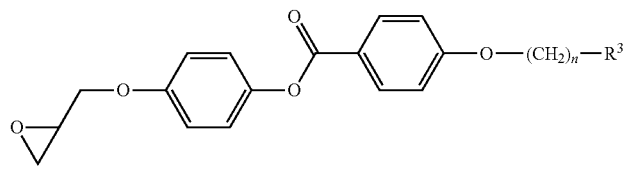
(2-37)

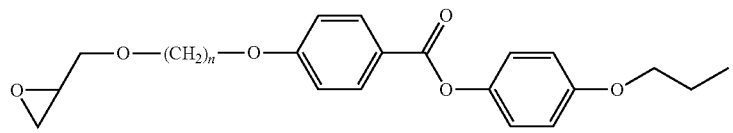
(2-38)

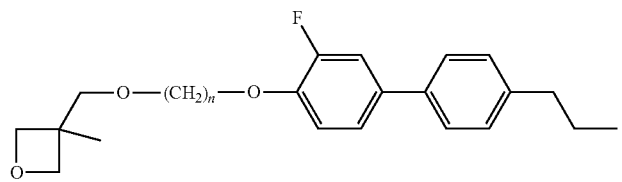
(2-39)

In the formulae (2-1) to (2-39), n and m each independently represent an integer of 1 to 10; $R^1$, $R^2$, and $R^3$ each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

The content of the polymerizable compound represented by the general formula (2) with respect to 100 mass % of the total amount of the polymerizable compounds used in the liquid crystal composition for a light-scattering liquid crystal device of the present invention is preferably 1 mass % or more and more preferably 5 mass % or more from the viewpoint of a reduction in the voltage and is particularly preferably 50 mass % or less, 40 mass % or less, 30 mass % or less, or 25 mass % or less from the viewpoint of maintaining the strength of the polymer network.

As the polymerizable compound represented by the general formula (3), polymerizable compounds represented by the following formulae (3-1) to (3-53) are preferable.

[Chem. 24]

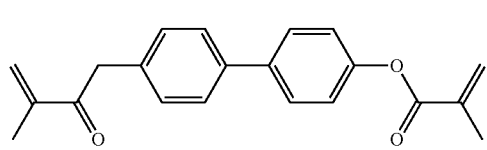
(3-1)

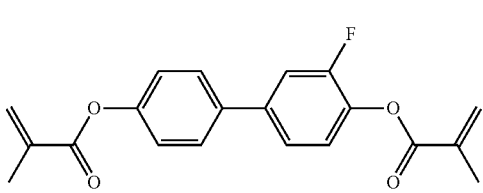
(3-2)

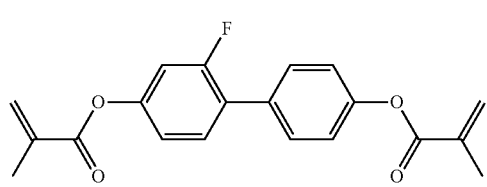
(3-3)

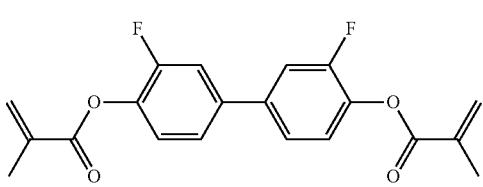
(3-4)

-continued
(3-5)
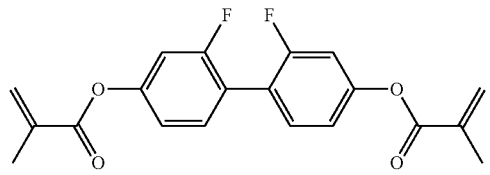
(3-6)
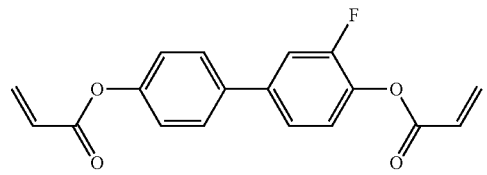
(3-7)
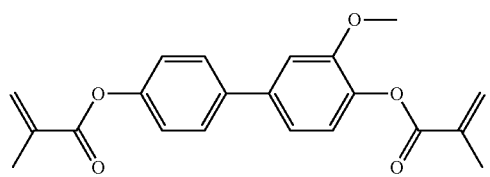
[Chem. 25]
(3-7)
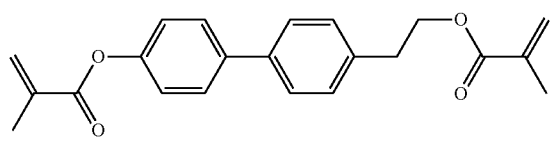
(3-8)
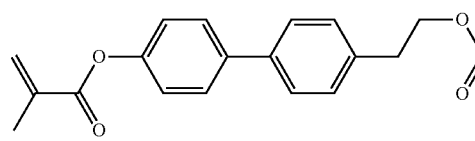
(3-9)
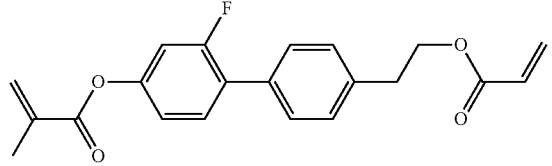
(3-10)
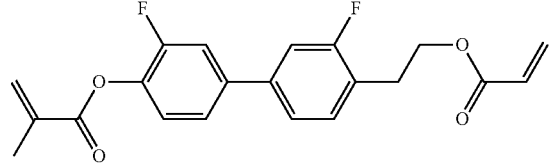
(3-11)
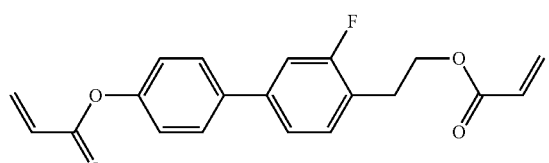
[Chem. 26]
(3-12)
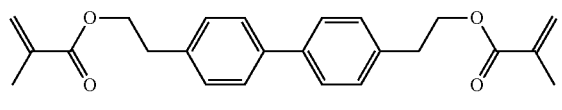
(3-13)
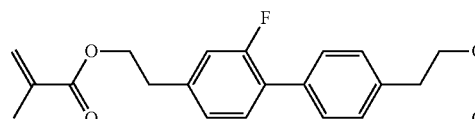
(3-14)
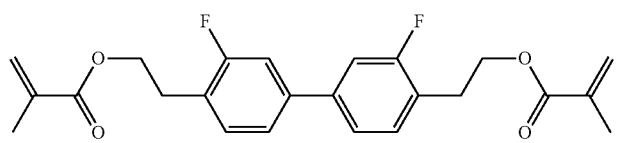
[Chem. 27]
(3-15)
(3-16)

-continued
[Chem. 28]
(3-17) (3-18)
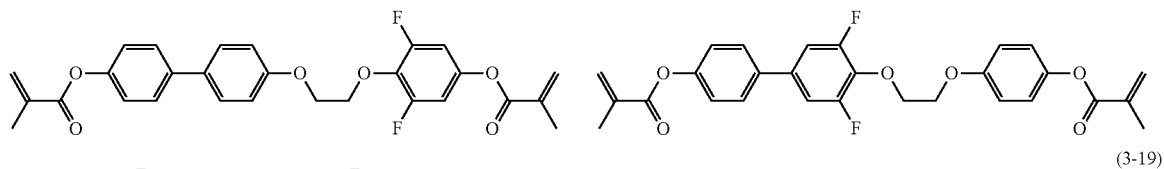
(3-19)
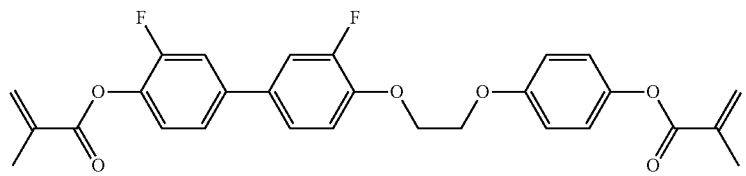
[Chem. 29]
(3-20) (3-21)
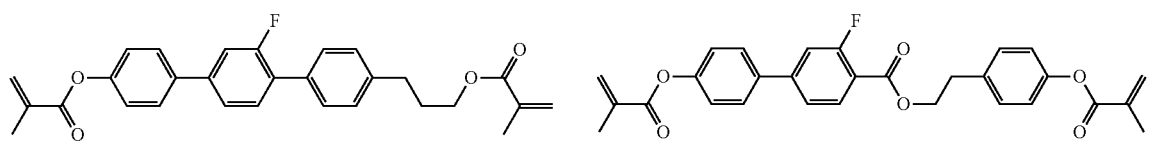
[Chem. 30]
(3-22)
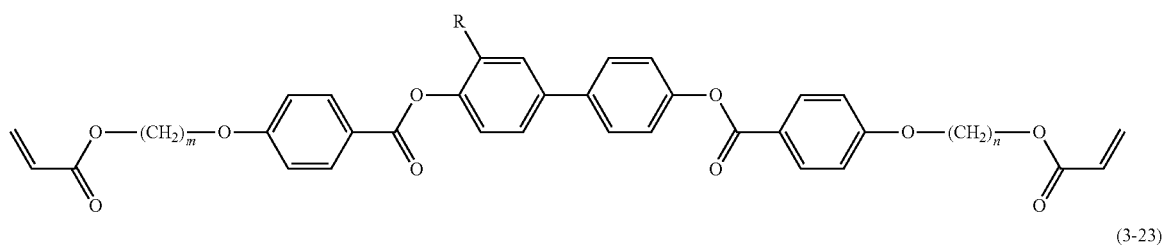
(3-23)
(3-24)
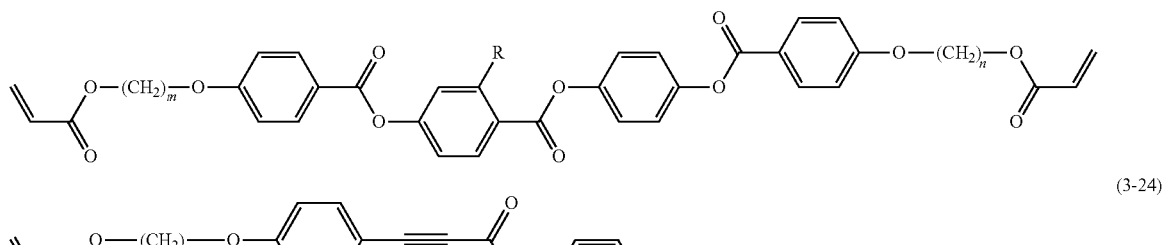
(3-25)
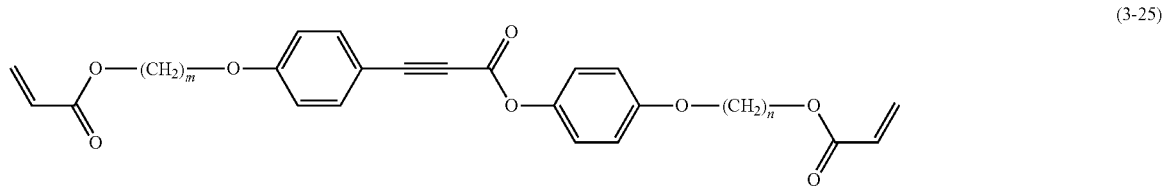
(3-26)
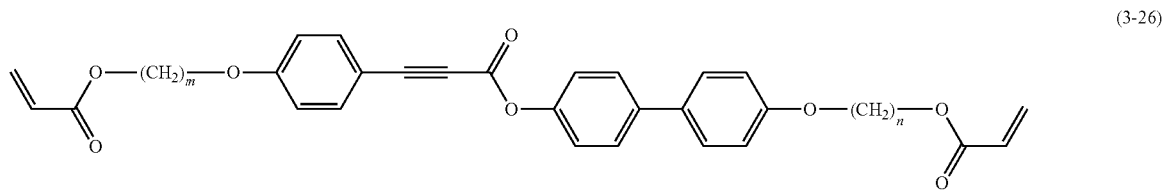

-continued
(3-27)
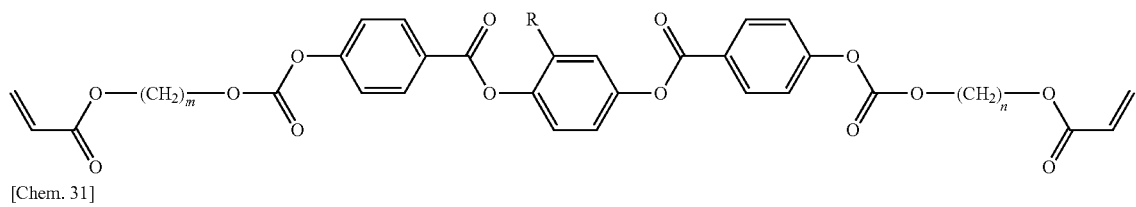
[Chem. 31]
(3-28)
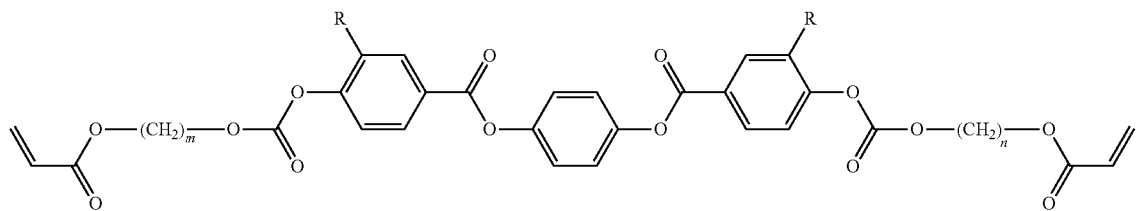
(3-29)
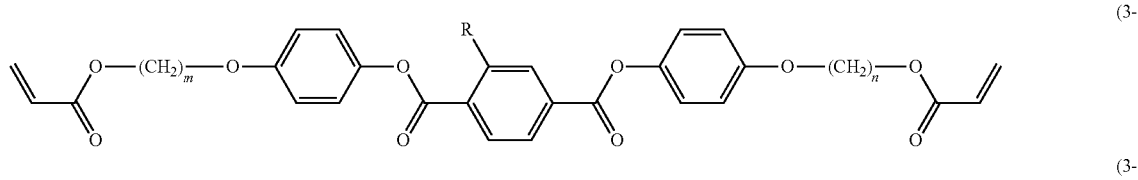
(3-30)
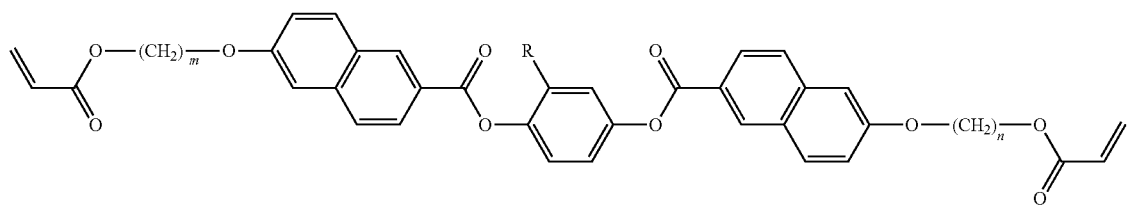
(3-31)
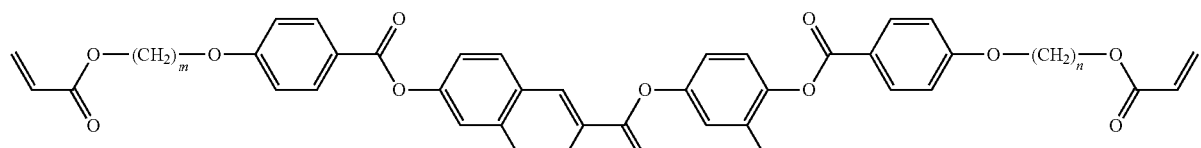
[Chem. 32]
(3-32)
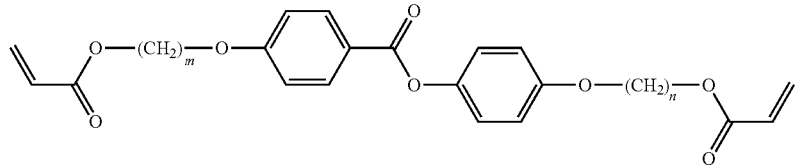
(3-33)
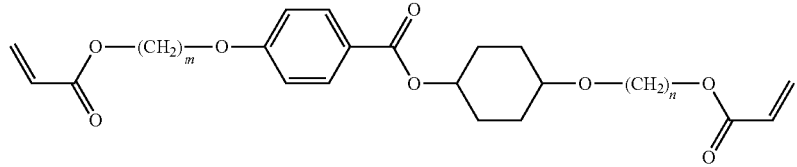
(3-34)
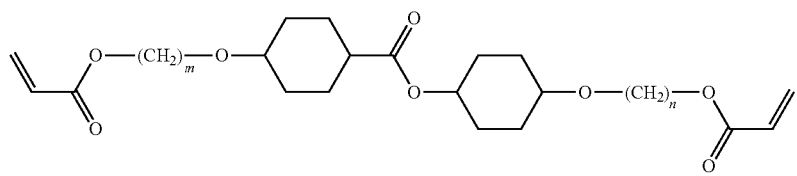

-continued
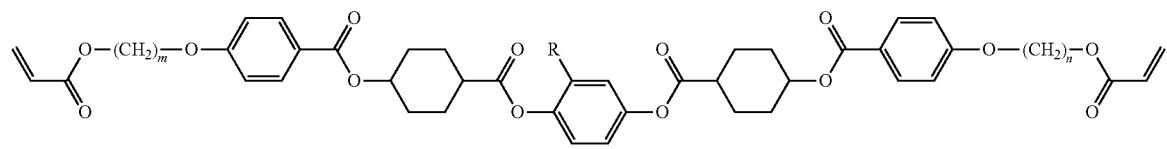
(3-35)
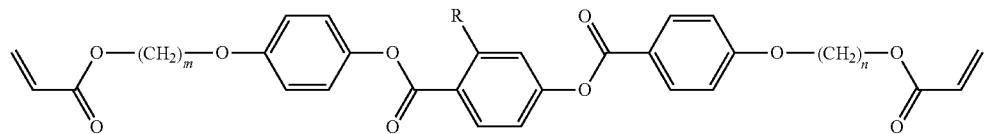
(3-36)
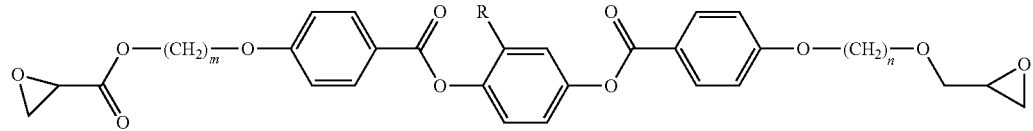
(3-37)
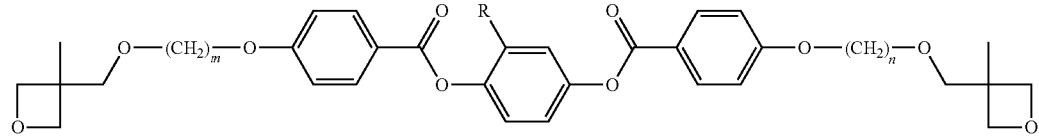
(3-38)
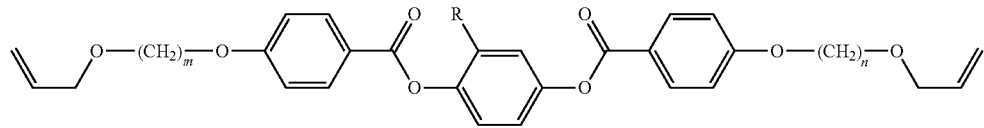
(3-39)
[Chem. 33]
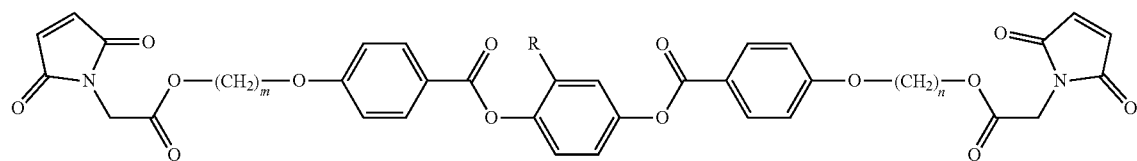
(3-40)
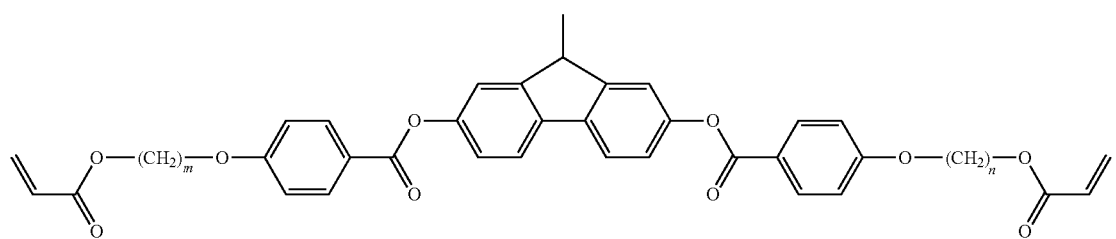
(3-41)
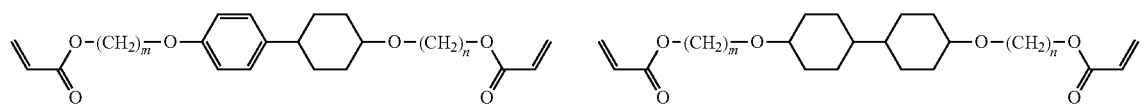
(3-42) (3-43)
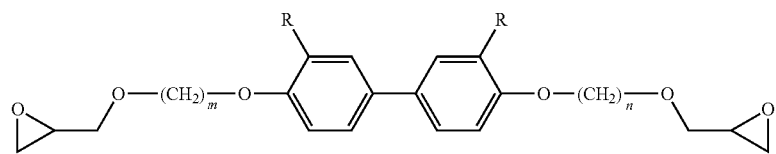
(3-44)

-continued
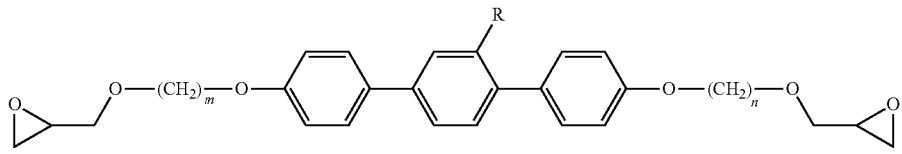
(3-45)
[Chem. 34]
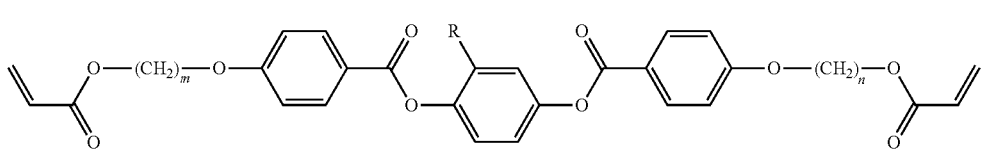
(3-46)
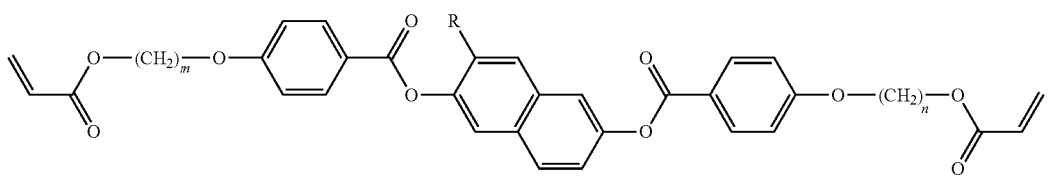
(3-47)
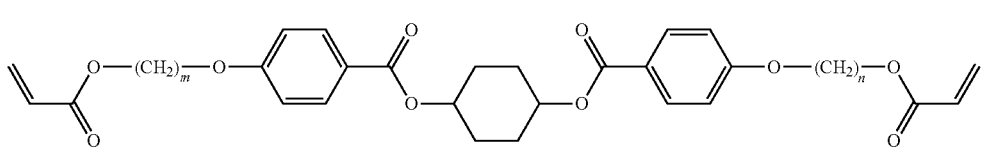
(3-48)
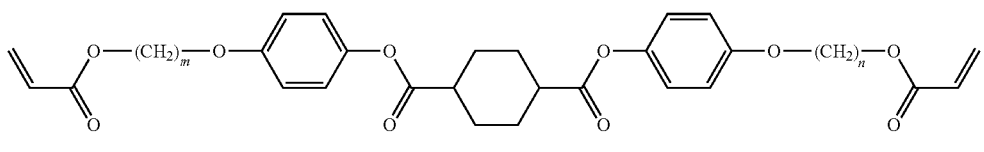
(3-49)
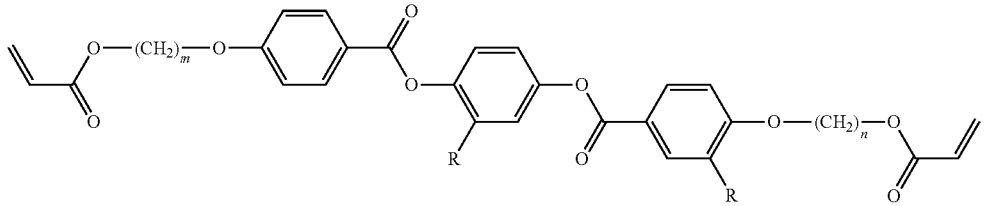
(3-50)
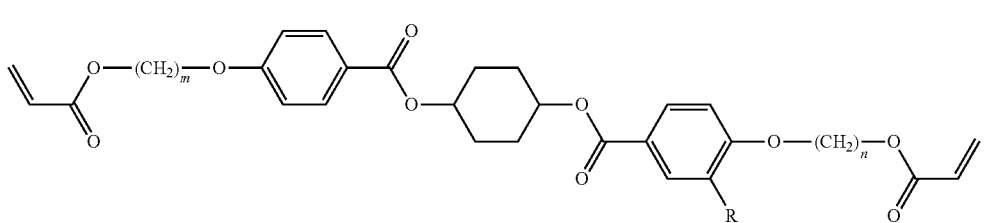
(3-51)
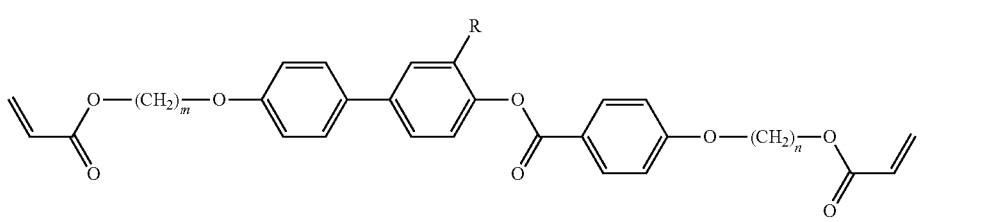
(3-52)
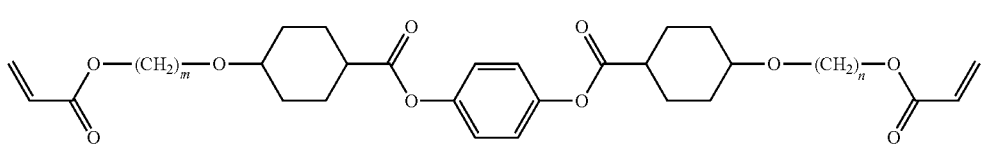
(3-53)

In the formulae (3-1) to (3-53), n and m each independently represent an integer 1 to 10, R's each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

The content of the polymerizable compound represented by the general formula (3) with respect to 100 mass % of the total amount of the polymerizable compounds used in the liquid crystal composition for a light-scattering liquid crystal device of the present invention is preferably 1 mass % or more and more preferably 5 mass % or more from the viewpoint of a reduction in the voltage and is particularly preferably 50 mass % or less, 40 mass % or less, 30 mass % or less, or 25 mass % or less from the viewpoint of maintaining the strength of the polymer network.

As the compounds represented by the general formula (4), specifically, the compounds represented by the following formulae (4-1) to (4-9) are preferable because they can contribute to the formation of a polymer network and also can function as a self-alignment agent that does not require a polyimide alignment film.

[Chem. 35]

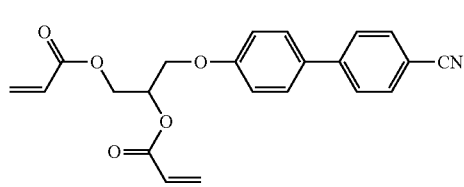
(4-1)

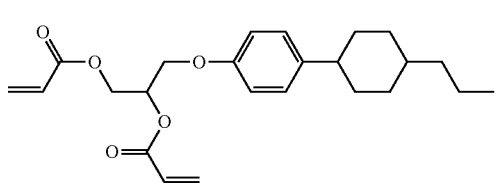
(4-2)

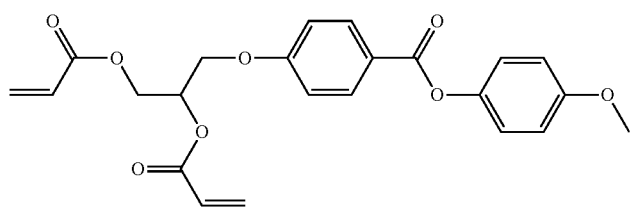
(4-3)

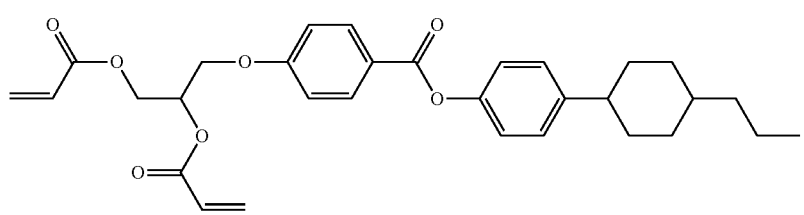
(4-4)

[Chem. 36]

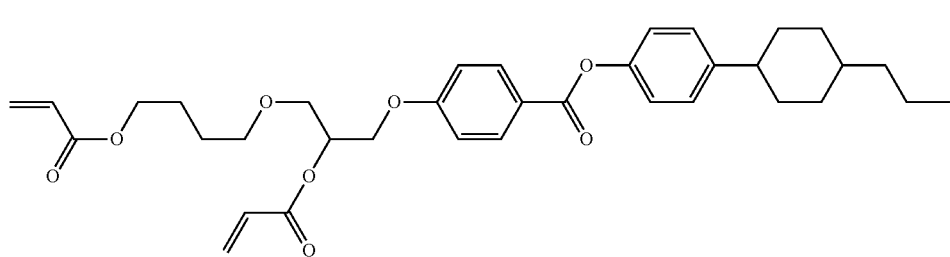
(4-5)

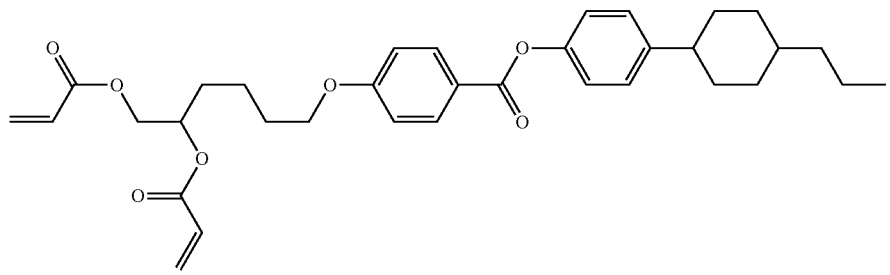
(4-6)

-continued (4-7)

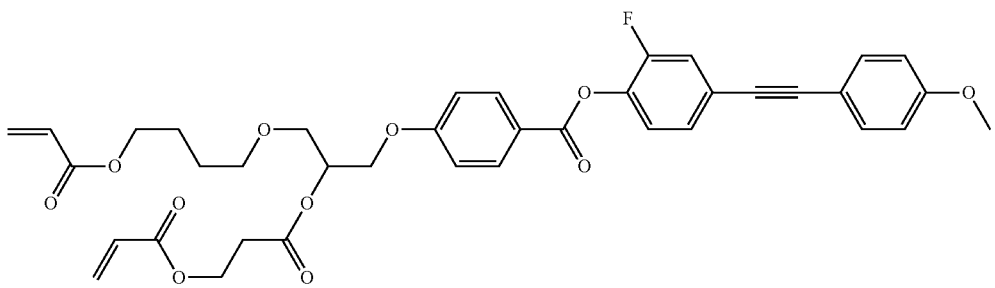

[Chem. 37]

(4-8)

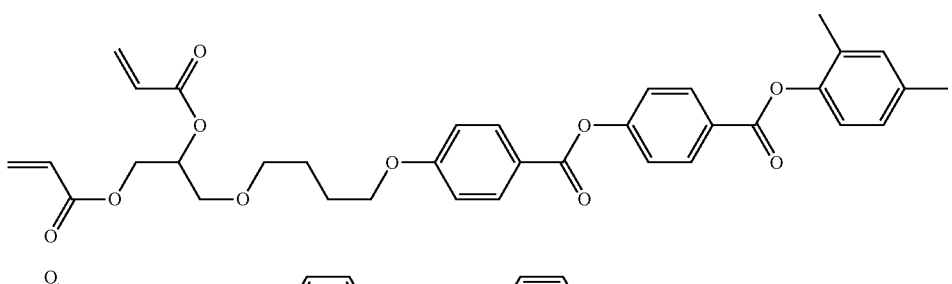

(4-9)

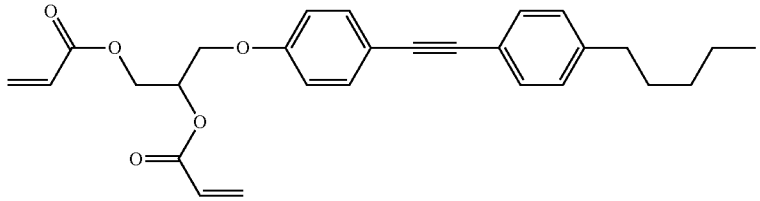

Regarding the content of the polymerizable compound represented by the general formula (4) with respect to 100 mass % of the total amount of the polymerizable compounds used in the liquid crystal composition for a light-scattering liquid crystal device of the present invention, the lower limit is preferably 0.2 mass % or more, more preferably 0.5 mass % or more, further preferably 2 mass % or more, and particularly preferably 5 mass % or more from the viewpoint of utilizing it as a self-alignment additive exhibiting vertical alignment properties without using a vertical alignment film, and the upper limit is preferably 15 mass % or less, more preferably 10 mass % or less, and particularly preferably 8 mass % or less from the viewpoint of not accumulating a large amount of polymers on the substrate surface.

As the compounds represented by the general formula (5), specifically, preferred are tri(meth)acrylates, such as trimethylolpropane tri(meth)acrylate, ethoxylated isocyanuric acid triacrylate, pentaerythritol tri(meth)acrylate, and ε-caprolactone-modified tris-(2-acryloyloxyethyl) isocyanurate; and compounds represented by the following formulae (5-1) to (5-23):

[Chem. 38]

(5-1)

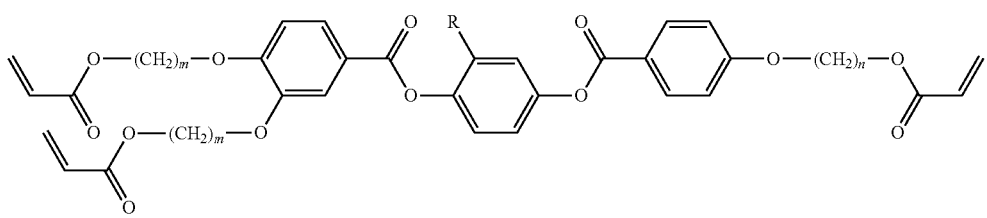

(5-2)

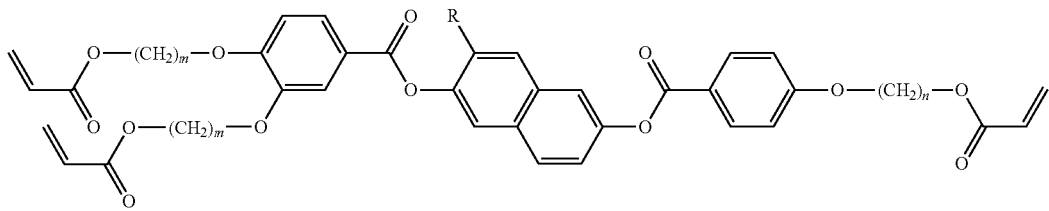

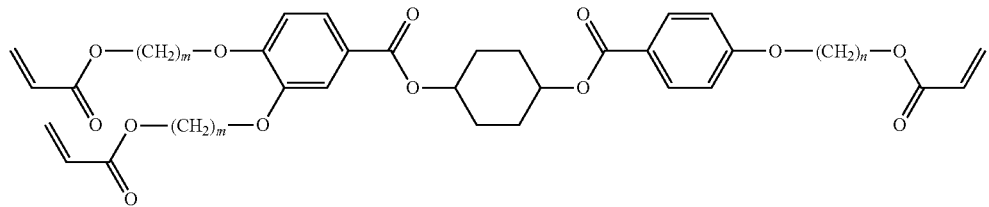
(5-3)
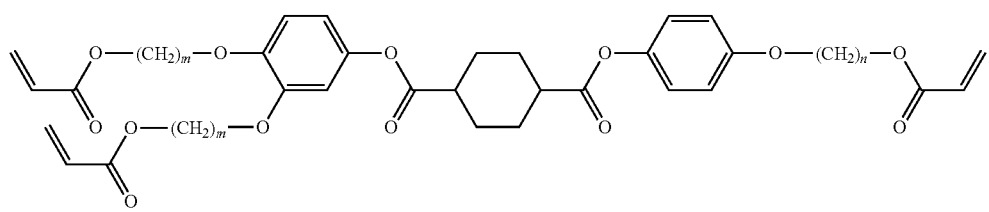
(5-4)
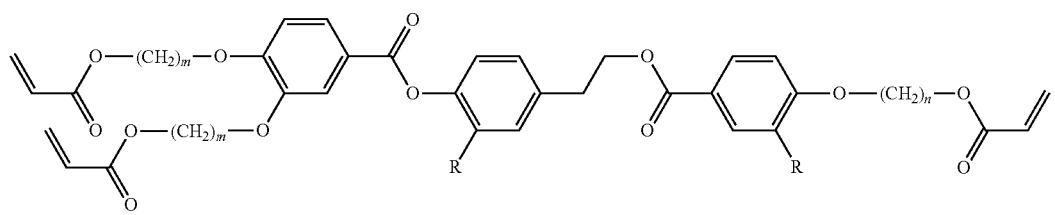
(5-5)
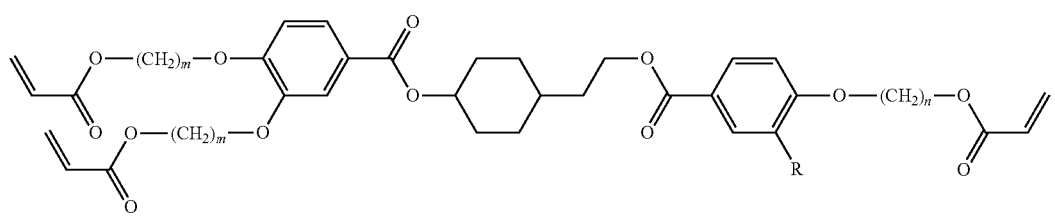
(5-6)
[Chem. 39]
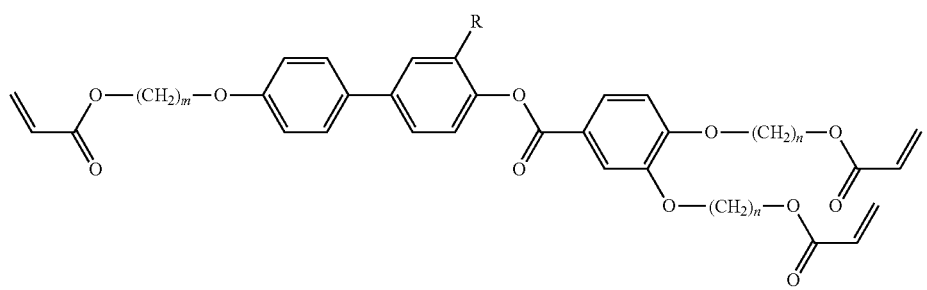
(5-7)
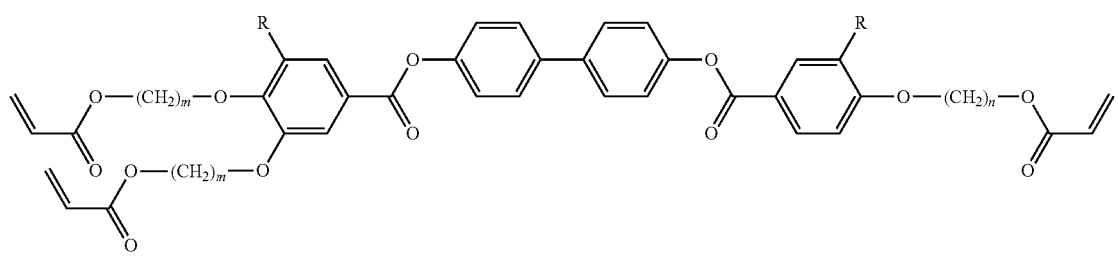
(5-8)

-continued
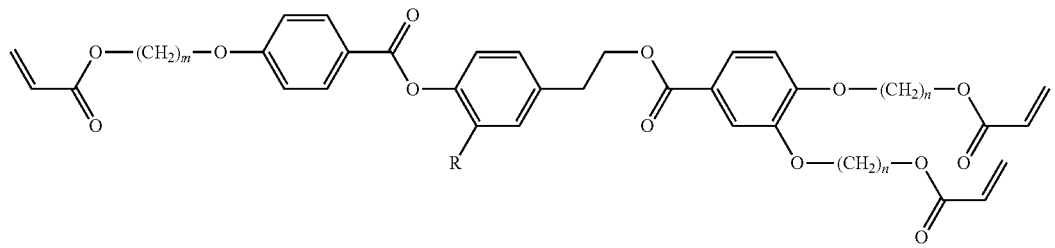
(5-9)
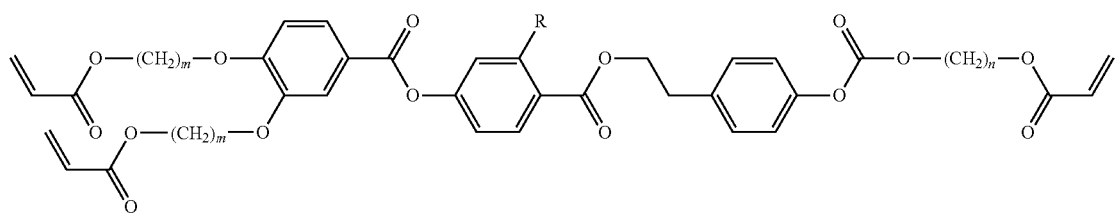
(5-10)
[Chem. 40]
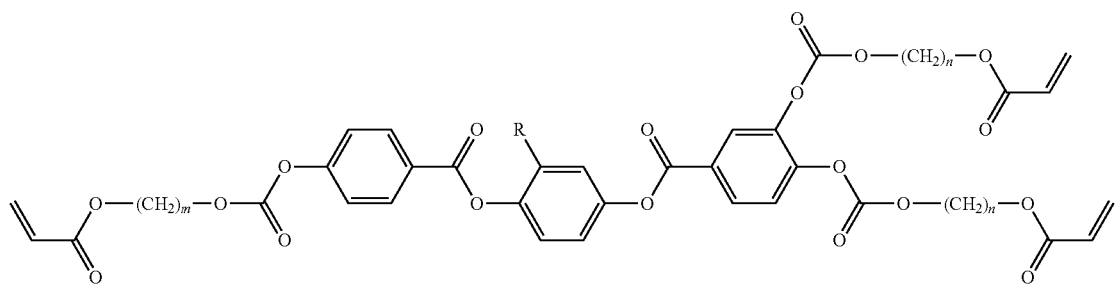
(5-11)
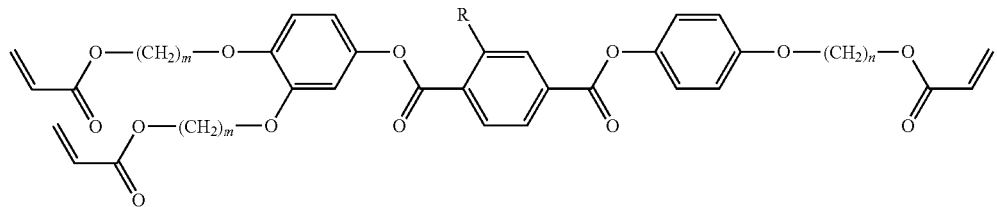
(5-12)
[Chem. 41]
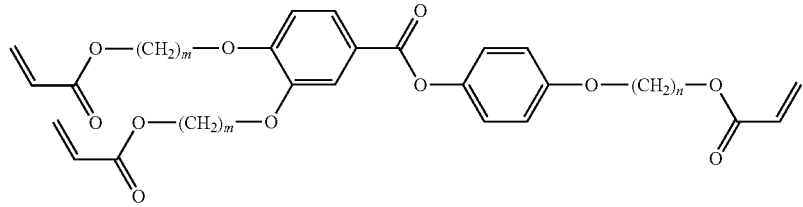
(5-13)
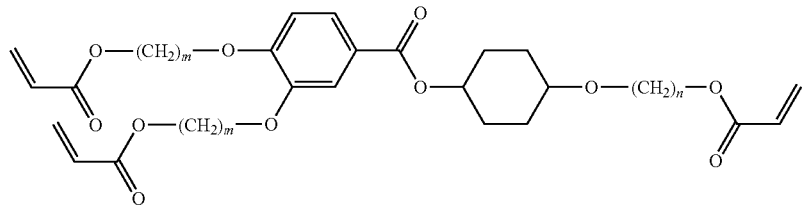
(5-14)

-continued
[Chem. 42]
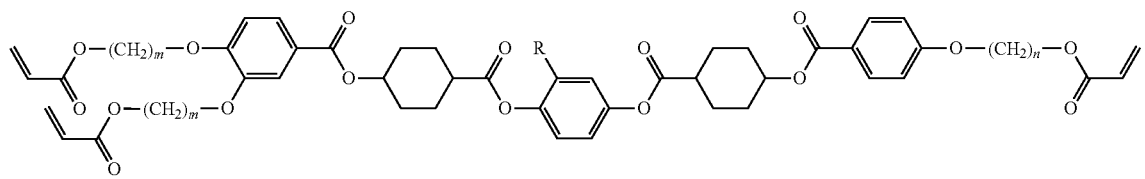
(5-14)
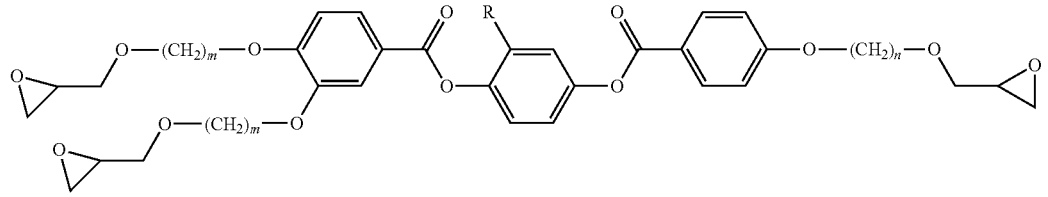
(5-15)
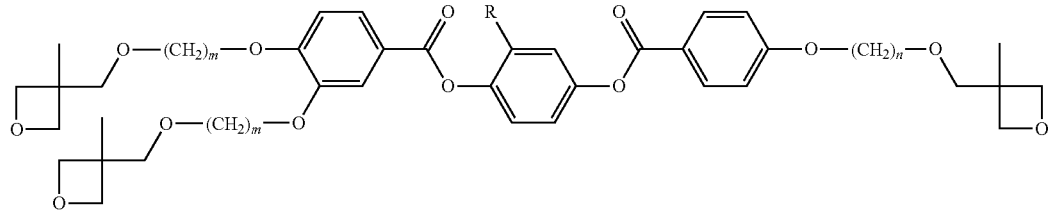
(5-16)
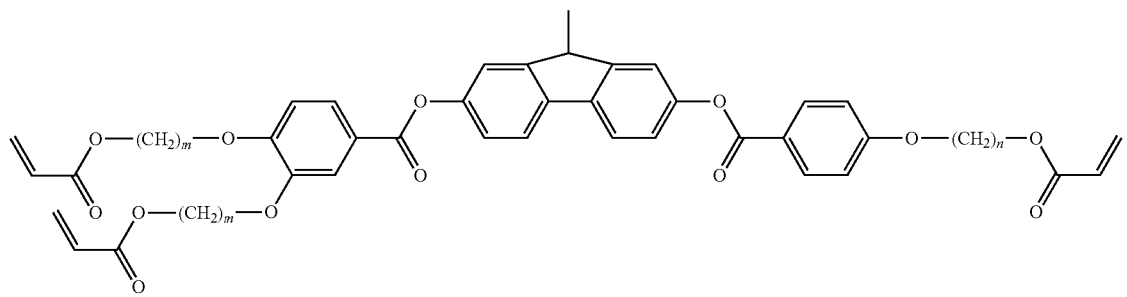
(5-17)
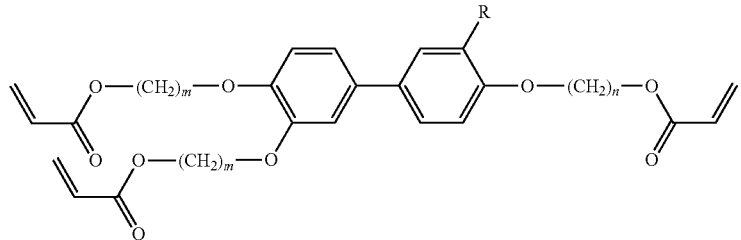
(5-18)
[Chem. 43]
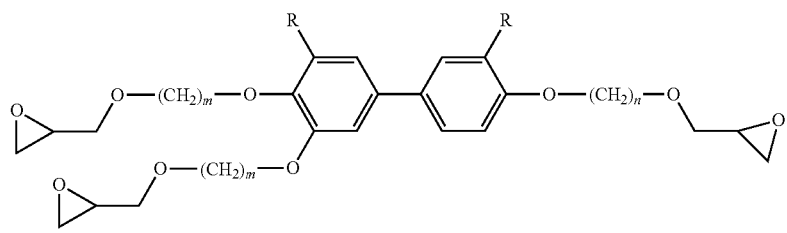
(5-19)

-continued

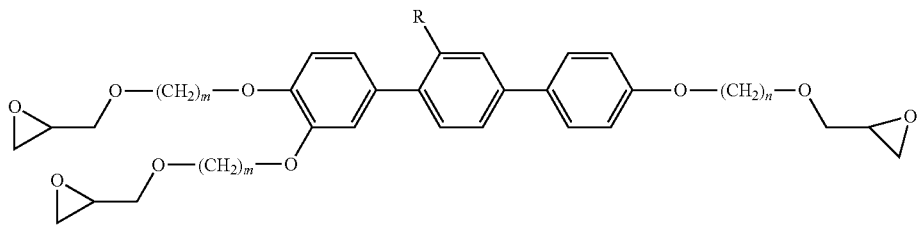
(5-20)

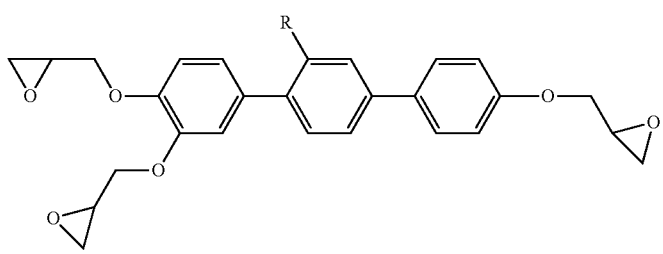
(5-21)

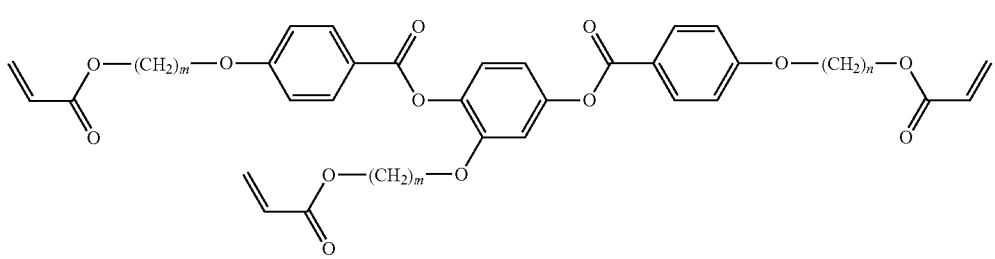
(5-22)

(5-23)

In the formulae (5-1) to (5-23), n and m each independently represent an integer of 1 to 10, R's each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

As the compounds represented by the general formula (6), specifically, preferred are compounds represented by the following formulae (6-1) to (6-11):

[Chem. 44]

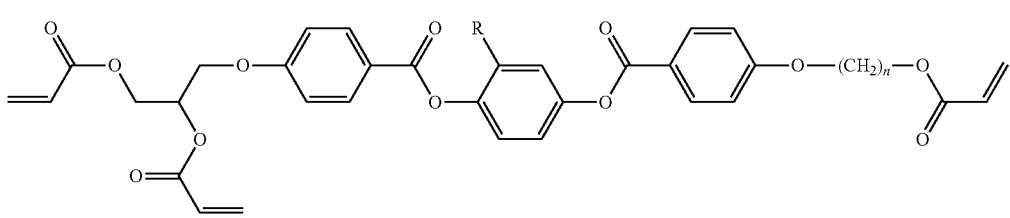
(6-1)

-continued
(6-2)
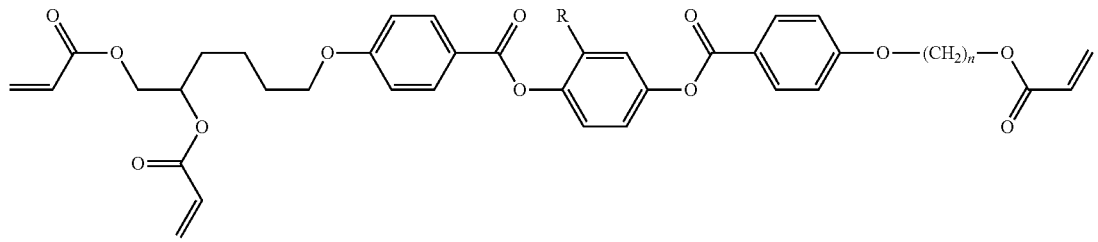
(6-3)
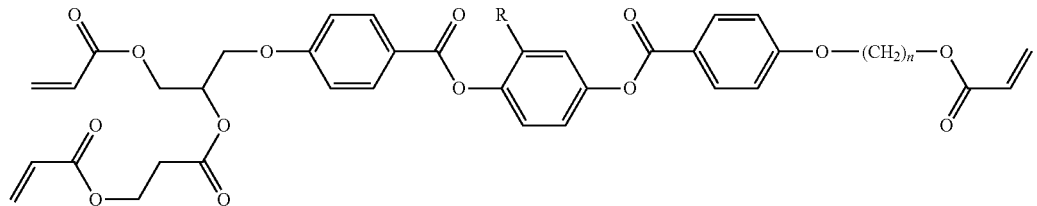
(6-4)
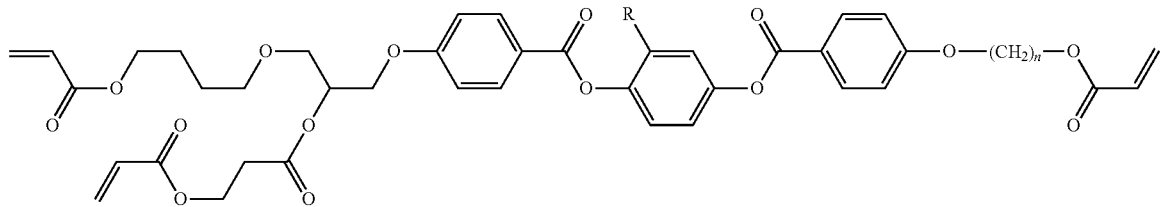
(6-5)
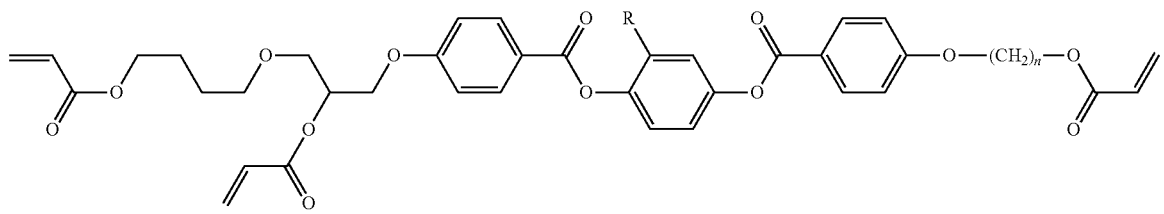
[Chem. 45]
(6-6)
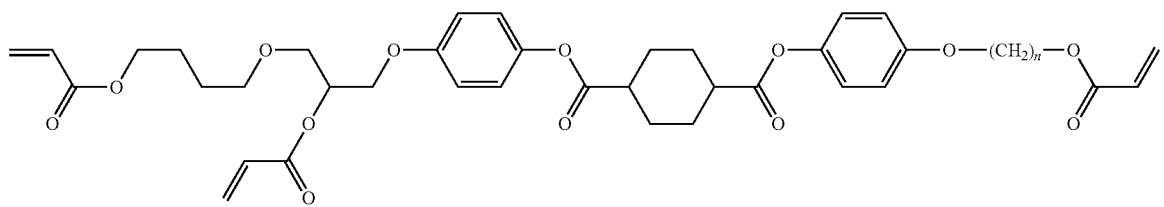
(6-7)
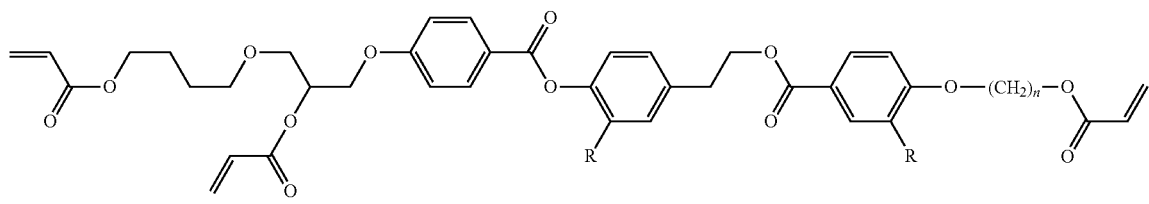

[Chem. 46]

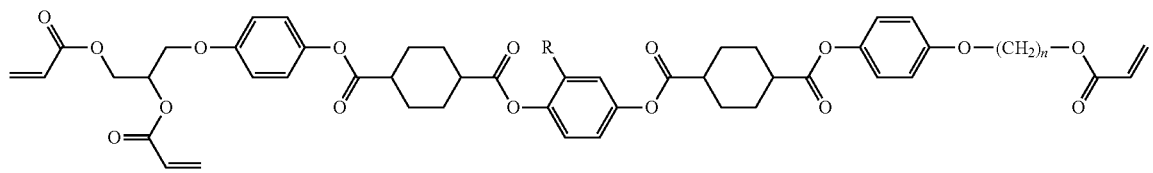

(6-8)

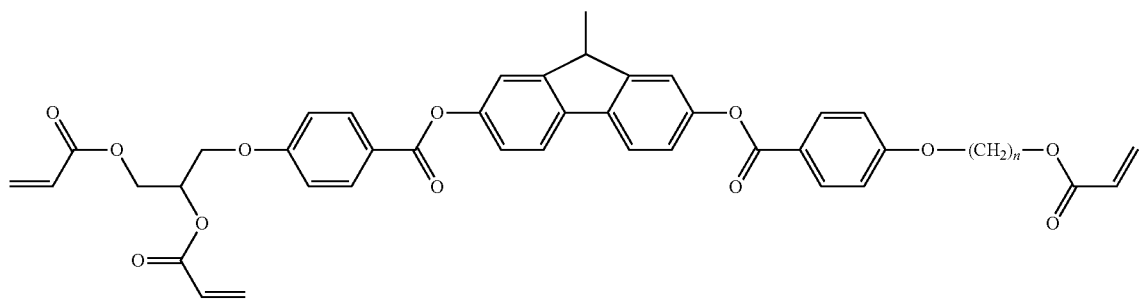

(6-9)

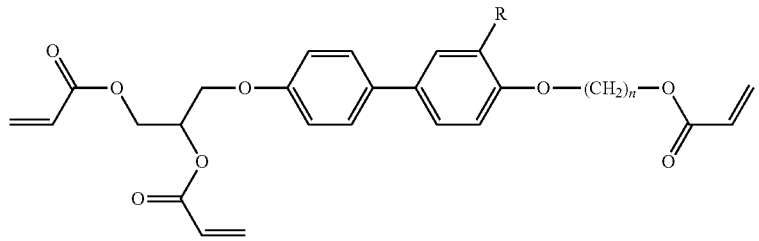

(6-10)

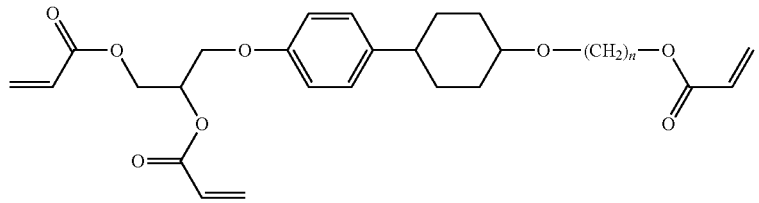

(6-11)

In the formulae (6-1) to (6-11), n's each independently represent an integer of 1 to 10, and R's each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

As the compounds represented by the general formula (7), specifically, preferred are tetra(meth)acrylates, such as pentaerythritol tetra(meth)acrylate and di(trimethylolpropane) tetra(meth)acrylate, and compounds represented by the following formulae (7-1) to (7-14):

[Chem. 47]

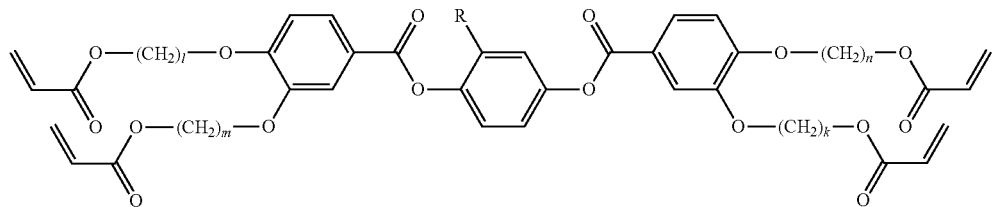

(7-1)

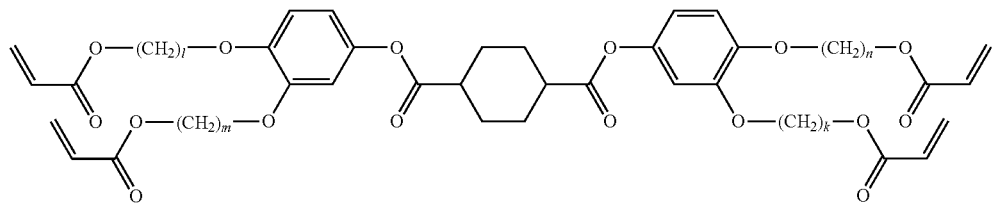
(7-2)
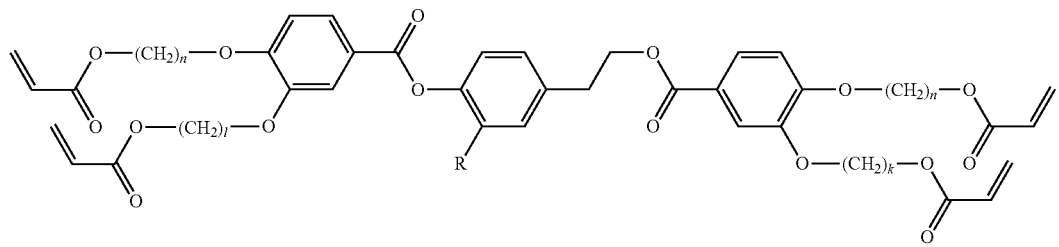
(7-3)
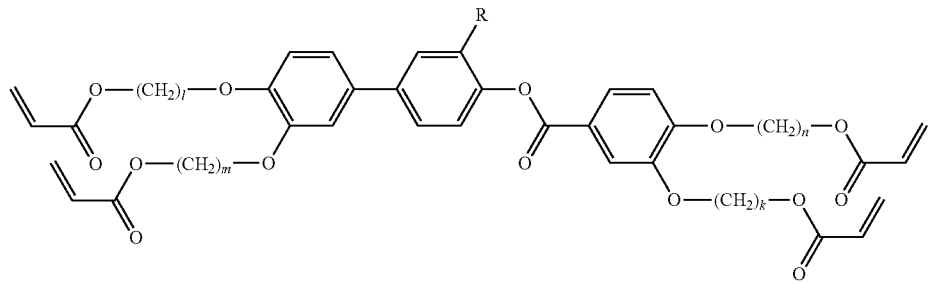
(7-4)
[Chem. 48]
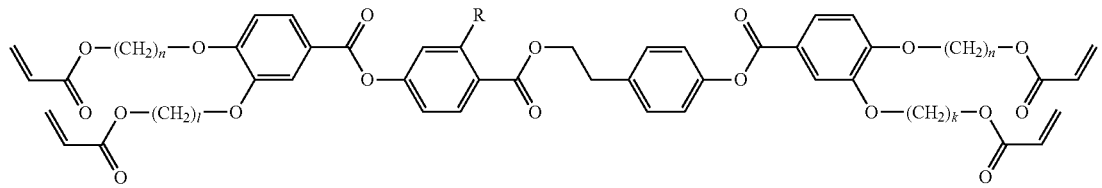
(7-5)
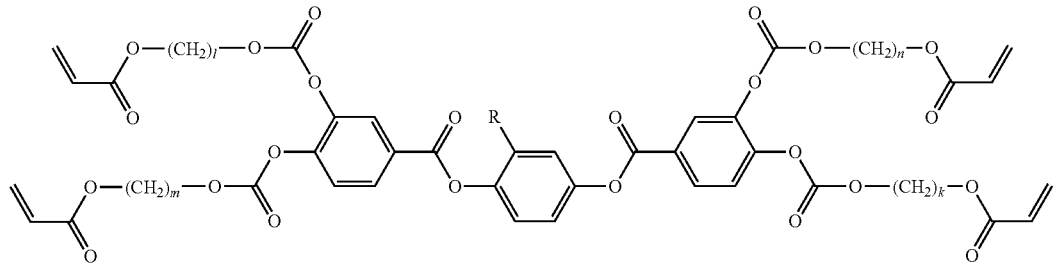
(7-6)
[Chem. 49]
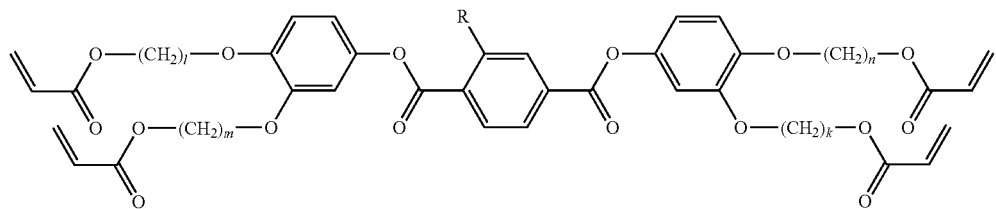
(7-7)

-continued
(7-8)
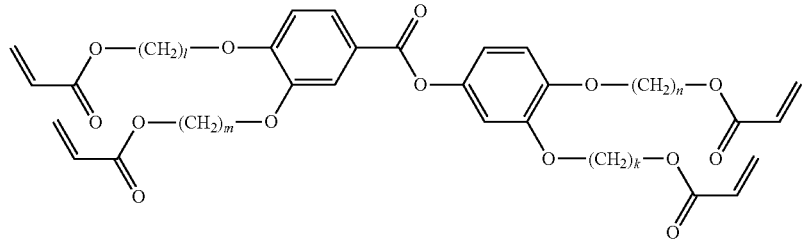
(7-9)
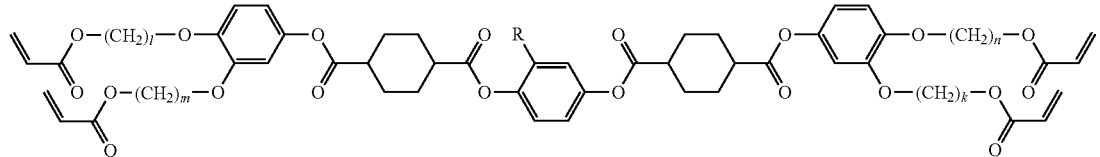
[Chem. 50]
(7-10)
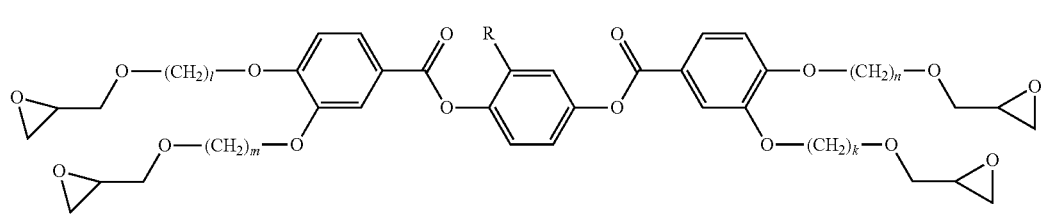
(7-11)
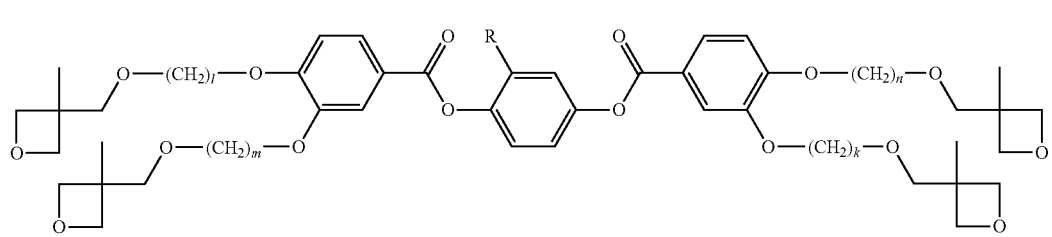
[Chem. 51]
(7-12)
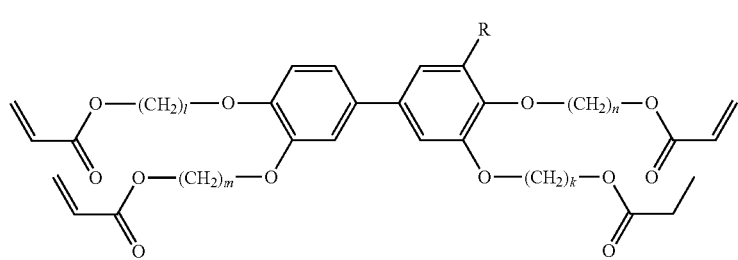
(7-13)
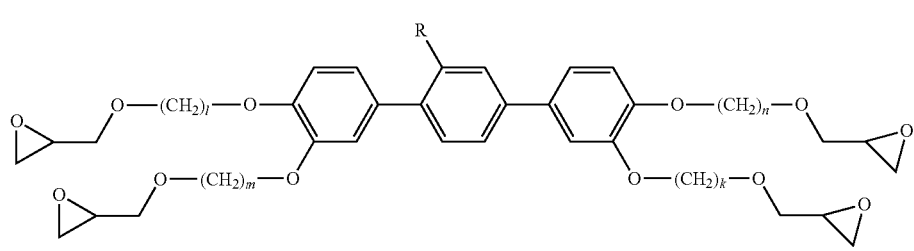

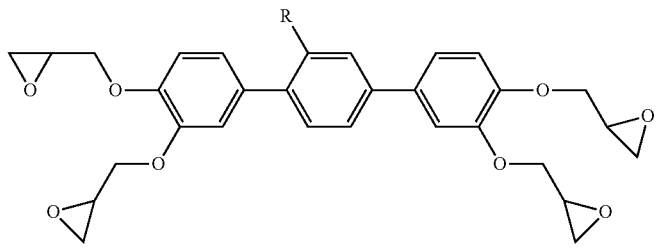
(7-14)

In the formulae (7-1) to (7-14), n, m, l, and k each independently represent an integer of 1 to 10, and R's each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

As the compounds represented by the general formula (8), specifically, preferred are compounds represented by the following formulae (8-1) to (8-10):

[Chem. 52]

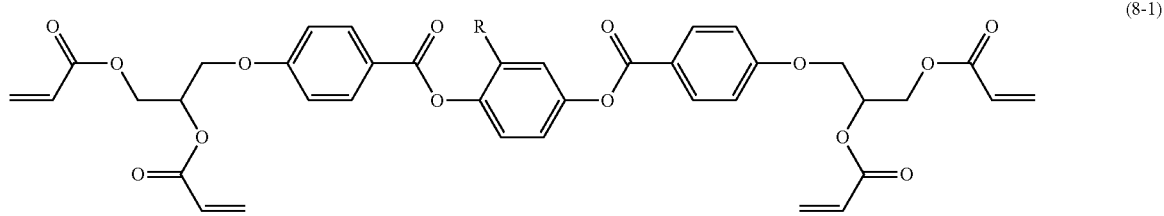
(8-1)

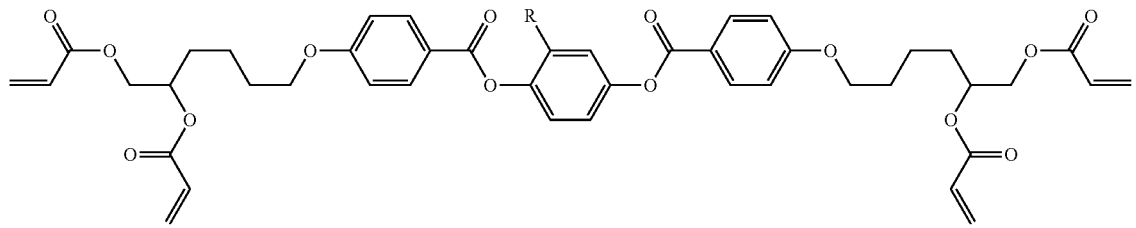
(8-2)

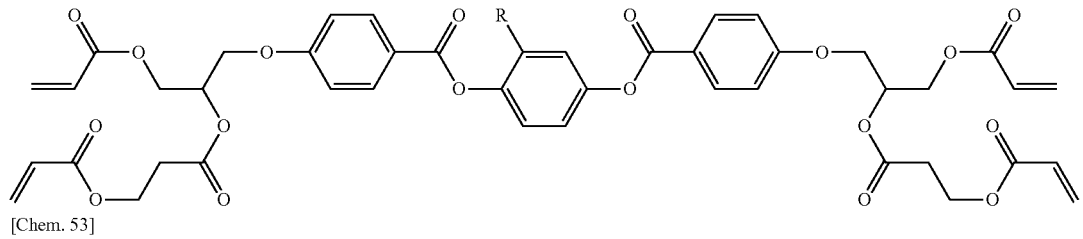
(8-3)

[Chem. 53]

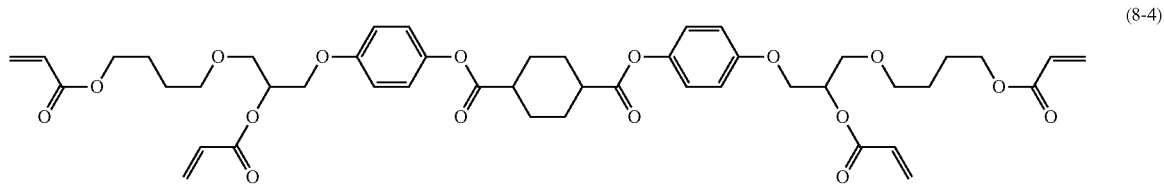
(8-4)

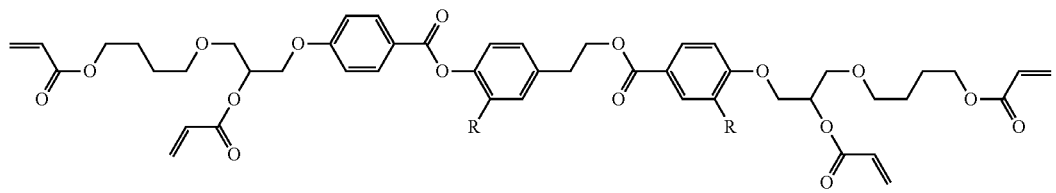
(8-5)

[Chem. 54]

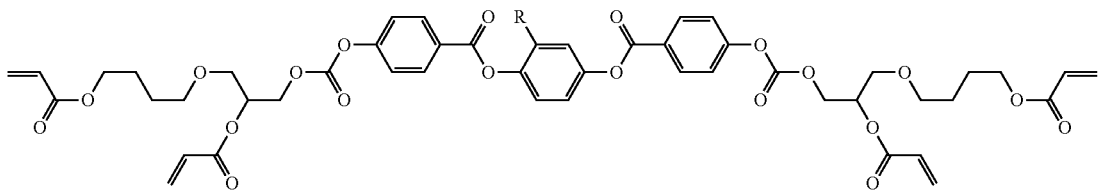

(8-6)

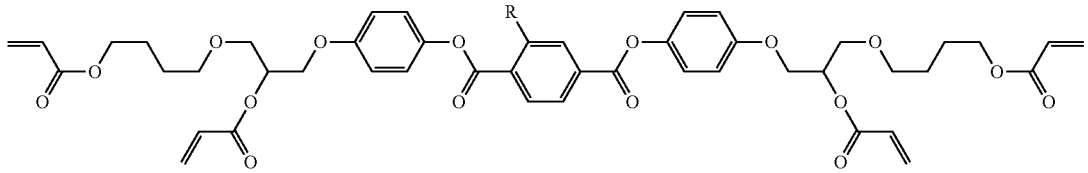

(8-7)

[Chem. 55]

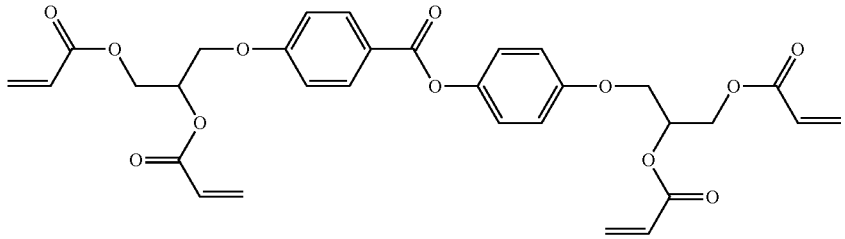

(8-8)

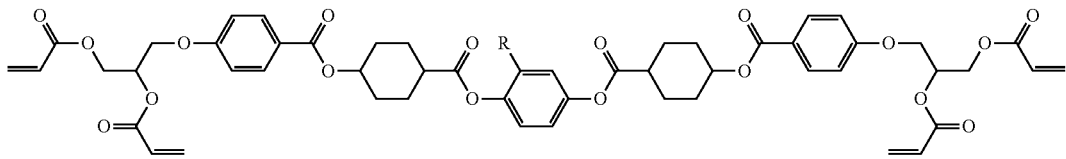

(8-9)

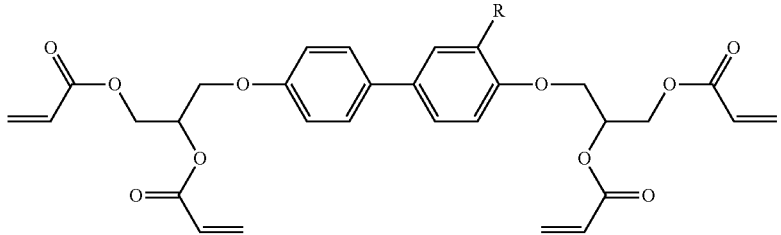

(8-10)

In the formulae (8-1) to (8-10), R's each independently represent a hydrogen atom, a halogen atom, an alkyl group having 1 to 6 carbon atoms, an alkoxyl group having 1 to 6 carbon atoms, or a cyano group. When these groups are alkyl groups having 1 to 6 carbon atoms or alkoxyl groups having 1 to 6 carbon atoms, all of them may be unsubstituted or may be substituted by one or two or more halogen atoms.

The content of the polymerizable compound represented by the general formulae (5) to (8) with respect to 100 mass % of the total amount of the polymerizable compounds used in the liquid crystal composition for a light-scattering liquid crystal device of the present invention is preferably 1 mass % or more, further preferably 3 mass % or more, and particularly preferably 5 mass % or more from the viewpoint of enhancing the crosslink density of the polymer network, and also is preferably 20 mass % or less, more preferably 15 mass % or less, and particularly preferably 10 mass % or less from the viewpoint that the driving voltage does not become too high due to an excessively high crosslink density.

The liquid crystal composition for a light-scattering liquid crystal device according to the present invention may use, with the polymerizable compound represented by the general formulae (1) to (8), another polymerizable compound having a group improving the adhesion with a base material, for example, a polar group such as a hydroxyl group, a thiol group, an amide group, an amino group, or a phosphate group, in combination.

The total amount of the contents of the polymerizable compounds used in the liquid crystal composition for a light-scattering liquid crystal device of the present invention is, with respect to 100 mass % of the liquid crystal composition for a light-scattering liquid crystal device of the present invention, preferably 1 mass % or more, further preferably 3 mass % or more, and particularly preferably 5 mass % or more, and also is preferably 50 mass % or less, preferably 40 mass % or less, preferably 30 mass % or less, preferably 20 mass % or less, more preferably 15 mass % or less, and particularly preferably 10 mass % or less from the viewpoint that the driving voltage does not become too high due to an excessively high crosslink density.

Incidentally, in the present invention, as described above, among the third components described in detail above, in particular, it is preferable to use a polymerizable compound represented by the general formula (2-ii) and a polymerizable compound represented by the general formula (3-i) from the point of the effect of reducing the driving voltage, and in particular, it is preferable to use a polymerizable compound represented by the general formula (2-ii).

(Compound Having Negative Dielectric Anisotropy)

The liquid crystal composition for a light-scattering liquid crystal device according to the present invention contains a compound having a negative dielectric anisotropy as a second component. More specifically, the liquid crystal composition for a light-scattering liquid crystal device according to the present invention preferably contains one or two or more compounds represented by the following general formula (N-1).

In the liquid crystal composition for a light-scattering liquid crystal device according to the present invention, as long as at least a compound represented by the general formula (N-1) is contained, other components are not limited. For example, the composition can be constituted by arbitrarily combining a group of liquid crystal compounds shown below together with a liquid crystal compound represented by the general formula (N-1). Incidentally, hereinafter, unless otherwise specified, when simply referred to as composition, it indicates a liquid crystal composition.

The liquid crystal composition for a light-scattering liquid crystal device according to the present invention may contain one or two or more liquid crystal compounds represented by a general formula (N-2) or (N-3) together with one or two or more liquid crystal compound represented by the general formula (N-1). These liquid crystal compounds correspond to dielectrically negative compounds (the sign of the dielectric anisotropy is negative, and its absolute value is greater than 2).

[Chem. 56]

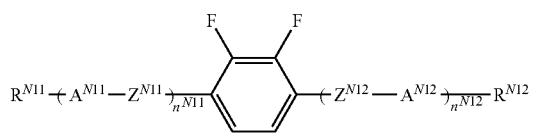
(N-1)

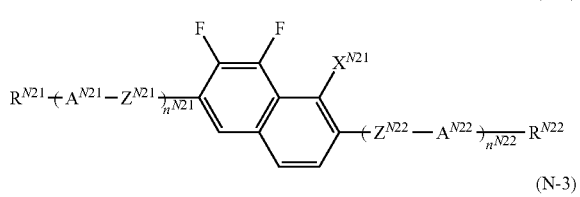
(N-2)

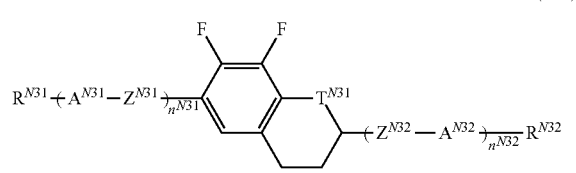
(N-3)

(In the formulae, $R^{N11}$, $R^{N12}$, $R^{N21}$, $R^{N22}$, $R^{N31}$, and $R^{N32}$ each independently represent an alkyl group having 1 to 8 carbon atoms, where one or two or more non-adjacent —CH$_2$— groups in the alkyl group may be each independently substituted by —CH=CH—, —C≡C—, —O—, —CO—, —COO—, or —OCO—;

$A^{N11}$, $A^{N12}$, $A^{N21}$, $A^{N22}$, $A^{N31}$, and $A^{N32}$ each independently represent a group selected from the group consisting of:

(a) a 1,4-cyclohexylene group (one —CH$_2$— group or two or more non-adjacent —CH$_2$— groups present in this group may be substituted by —O—);

(b) a 1,4-phenylene group (one —CH= group or two or more non-adjacent —CH= groups present in this group may be substituted by —N=);

(c) a naphthalene-2,6-diyl group, a 1,2,3,4-tetrahydronaphthalene-2,6-diyl group, or a decahydronaphthalene-2,6-diyl group (one —CH= group or two or more non-adjacent —CH= groups present in the naphthalene-2,6-diyl group or the 1,2,3,4-tetrahydronaphthalene-2,6-diyl group may be substituted by —N=); and (d) a 1,4-cyclohexenylene group, and the groups (a), (b), (c), and (d) may be each independently substituted by a cyano group, a fluorine atom, or a chlorine atom;

$Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

$X^{N21}$ represents a hydrogen atom or a fluorine atom;

$T^{N31}$ represents —CH$_2$— or an oxygen atom; and $n^{N11}$, $n^{N12}$, $n^{N21}$, $n^{N22}$, $n^{N31}$, and $n^{N32}$ each independently represent an integer of 0 to 3, provided that $n^{N11}+n^{N12}$, $n^{N21}+n^{N22}$, and $n^{N31}+n^{N32}$ are each independently 1, 2, or 3, and in each of $A^{N11}$ to $A^{N32}$ and $Z^{N11}$ to $Z^{N32}$, when multiple $A^{Nn}$s or $Z^{Nn}$s are present, they may be the same or different. However, compounds represented by a general formula (i) are excluded).

The compounds represented by the general formulae (N-1), (N-2), and (N-3) are preferably compounds having a negative dielectric anisotropy of which the absolute value is greater than 2.

In the general formulae (N-1), (N-2), and (N-3), $R^{N11}$, $R^{N12}$, $R^{N21}$, $R^{N22}$, $R^{N31}$, and $R^{N32}$ are preferably each independently an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, further preferably an alkyl group having 1 to 5 carbon atoms or an alkenyl group having 2 to 5 carbon atoms, further preferably an alkyl group having 2 to 5 carbon atoms or an alkenyl group having 2 or 3 carbon atoms, and particularly preferably an alkenyl group having 3 carbon atoms (propenyl group).

In addition, when the ring structure to which a group mentioned above bonds is a phenyl group (aromatic), the group is preferably a linear alkyl group having 1 to 5 carbon atoms, a linear alkoxy group having 1 to 4 carbon atoms, or an alkenyl group having 4 or 5 carbon atoms, and when the ring structure to which a group mentioned above bonds is a saturated ring structure such as cyclohexane, pyran, and dioxane, the group is preferably a linear alkyl group having 1 to 5 carbon atoms, a linear alkoxy group having 1 to 4 carbon atoms, or a linear alkenyl group having 2 to 5 carbon atoms. In order to stabilize the nematic phase, the total number of carbon atoms and, when present, oxygen atoms in the group is preferably five or less in total, and the group is preferably linear.

The alkenyl group is preferably selected from the groups represented by any of formulae (R1) to (R5) (in each formula, the black circle represents a carbon atom in the ring structure).

[Chem. 57]

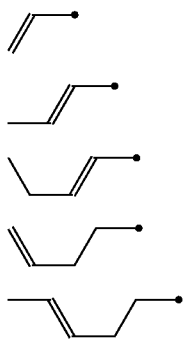

(R1)
(R2)
(R3)
(R4)
(R5)

$A^{N11}$, $A^{N12}$, $A^{N21}$, $A^{N22}$, $A^{N31}$, and $A^{N32}$ are preferably each independently aromatic when a large Δn is required, and preferably aliphatic for improving the response speed, and preferably represent a trans-1,4-cyclohexylene group, a 1,4-phenylene group, 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, and more preferably represent the following structures:

[Chem. 58]

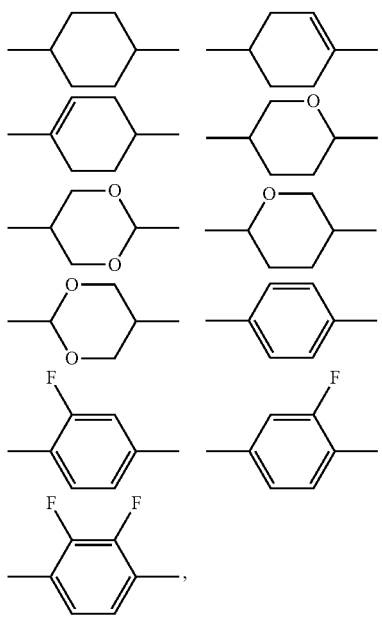

and more preferably represent a trans-1,4-cyclohexylene group, a 1,4-cyclohexenylene group, or a 1,4-phenylene group.

$Z^{N11}$, $Z^{N12}$, $Z^{N21}$, $Z^{N22}$, $Z^{N31}$, and $Z^{N32}$ preferably each independently represent —CH$_2$O—, —CF$_2$O—, —CH$_2$CH$_2$—, —CF$_2$CF$_2$—, or a single bond, further preferably —CH$_2$O—, —CH$_2$CH$_2$—, or a single bond, and particularly preferably —CH$_2$O— or a single bond. $X^{N21}$ is preferably a fluorine atom, and $T^{N31}$ is preferably an oxygen atom.

$n^{N11}+n^{N12}$, $n^{N21}+n^{N22}$, and $n^{N31}+n^{N32}$ are preferably 1 or 2, and a combination of $n^{N11}$ being 1 and $n^{N12}$ being 0, a combination of $n^{N11}$ being 2 and $n^{N12}$ being 0, a combination of $n^{N11}$ being 1 and $n^{N12}$ being 1, a combination of $n^{N11}$ being 2 and $n^{N12}$ being 1, a combination of $n^{N21}$ being 1 and $n^{N22}$ being 0, a combination of $n^{N21}$ being 2 and $n^{N22}$ being 0, a combination of $n^{N31}$ being 1 and $n^{N32}$ being 0, and a combination of $n^{N31}$ being 2 and $n^{N32}$ being 0 are preferable.

The composition preferably does not contain the compounds represented by the general formula (N-2) or the general formula (N-3) from the viewpoint of enhancing the transparency of the liquid crystal device of the present invention.

The lower limit of the content of the liquid crystal compound represented by the formula (N-1) with respect to the total amount of the nonpolymerizable liquid crystal compounds contained in the liquid crystal composition for a light-scattering liquid crystal device according to the present invention is preferably 30 mass %, and the upper limit is preferably 95 mass %. The lower limit of the content is more preferably 45%, and the upper limit is preferably 80 mass %.

The content of the liquid crystal compound represented by the formula (N-2) with respect to the total amount of the nonpolymerizable liquid crystal compounds contained in the liquid crystal composition for a light-scattering liquid crystal device according to the present invention is preferably 0 mass %. However, unless the purpose, such as transparency, of the present invention is not impaired, the lower limit of the content is 1 mass % or 10 mass % and may be 20 mass %. The upper limit of the content is 35 mass % or 25 mass % and may be 20 mass %.

The content of the liquid crystal compound represented by the formula (N-3) with respect to the total amount of the composition of the nonpolymerizable liquid crystal compounds contained in the liquid crystal composition for a light-scattering liquid crystal device according to the present invention is preferably 0 mass %. However, unless the purpose, such as transparency, of the present invention is not impaired, the lower limit of the content is 1% or 10 mass % and may be 20 mass %. The upper limit of the content is 35 mass % or 25 mass % and may be 20 mass %.

When the liquid crystal composition for a light-scattering liquid crystal device according to the present invention is required to maintain a low viscosity and have a high response speed, it is preferable that the above-mentioned lower limits be low and that the above-mentioned upper limits be low. Furthermore, when the liquid crystal composition for a light-scattering liquid crystal device according to the present invention is required to maintain a high $T_{NI}$ and have good temperature stability, it is preferable that the lower limits be low and the upper limits be low. In addition, when high dielectric anisotropy is required for maintaining a low driving voltage, it is preferable that the lower limits be high and the upper limits be high.

Examples of the compound represented by the general formula (N-1) can include the group of compounds represented by the following general formulae (N-1a) to (N-1g):

[Chem. 59]

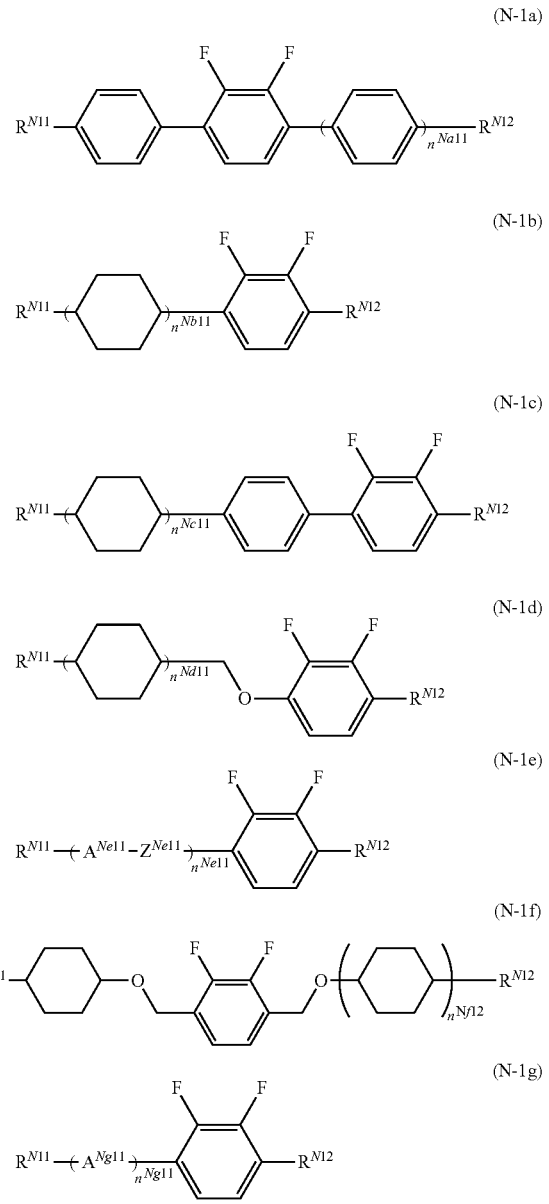

(in the formulae, $R^{N11}$ and $R^{N12}$ represent the Same meaning as $R^{N11}$ and $R^{N12}$ in the general formula (N-1), $n^{Na11}$ represents 0 or 1, $n^{Nb11}$ represents 1 or 2, $n^{Nc11}$ represents 0 or 1, $n^{Nd11}$ represents 1 or 2, $n^{Ne11}$ represents 1 or 2, $n^{Nf11}$ represents 1 or 2, $n^{Ng11}$ represents 1 or 2, $A^{Ne11}$ represents a trans-1,4-cyclohexylene group or a 1,4-phenylene group, $A^{Ng11}$ represents a trans-1,4-cyclohexylene group, a 1,4-cyclohexenylene group, or a 1,4-phenylene group and at least one $A^{Nb11}$ represents a 1,4-cyclohexenylene group, and $Z^{Ne11}$ represents a single bond or ethylene and at least one $Z^{Ne11}$ represents ethylene).

More specifically, the compound represented by the general formula (N-1) is preferably a compound selected from the group consisting of compounds represented by general formulae (N-1-1) to (N-1-5), (N-1-10) to (N-1-18), (N-1-20), and (N-1-21).

The compound represented by the general formula (N-1-1) is the following compound:

[Chem. 60]

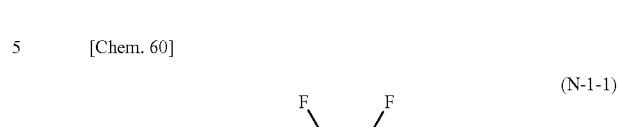

(in the formula, $R^{N111}$ and $R^{N112}$ each independently represent the same meaning as $R^{N11}$ and $R^{N12}$ in the general formula (N-1)).

$R^{N111}$ is preferably an alkyl group having 1 to 5 carbon atoms or an alkenyl group having 2 to 5 carbon atoms and is preferably a propyl group, a pentyl group, or a vinyl group. $R^{N112}$ is preferably an alkyl group having 1 to 5 carbon atoms, an alkenyl group having 4 or 5 carbon atoms, or an alkoxy group having 1 to 4 carbon atoms and is preferably an ethoxy group or a butoxy group.

The compounds represented by the general formula (N-1-1) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a lower content causes a high effect. Furthermore, in order to improve dripping marks and image-sticking characteristics, the content range is preferably set to medium.

The lower limit of the content of the compound represented by the formula (N-1-1) with respect to the total amount of the nonpolymerizable liquid crystal compounds contained in the liquid crystal composition for a light-scattering liquid crystal device according to the present invention is preferably 0%, and the upper limit is preferably 25%. More preferably, the lower limit of the content is 0%, and the upper limit is 15%.

Furthermore, the compound represented by the general formula (N-1-1) is preferably a compound selected from the group consisting of compounds represented by formulae (N-1-1.1) to (N-1-1.23), preferably a compound represented by any of formulae (N-1-1.1) to (N-1-1.4), and preferably a compound represented by any of formulae (N-1-1.1) and (N-1-1.3).

[Chem. 61]

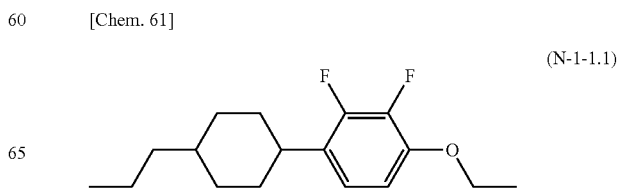

-continued

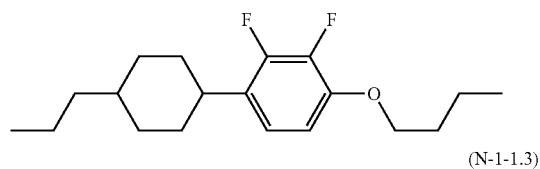
(N-1-1.2)

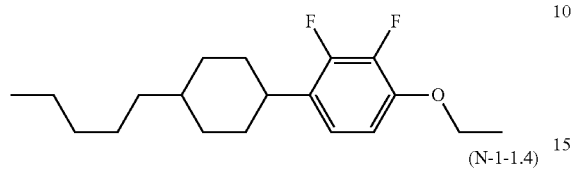
(N-1-1.3)

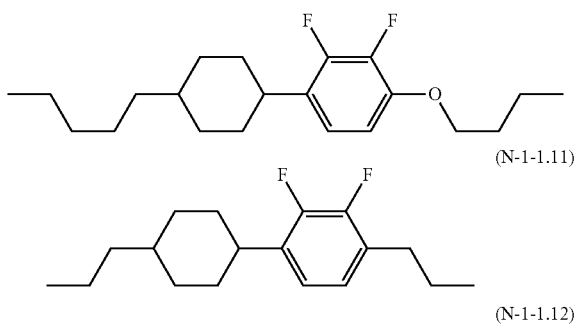
(N-1-1.4)
(N-1-1.11)
(N-1-1.12)

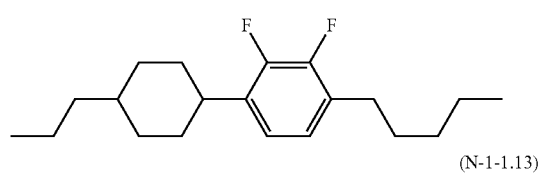
(N-1-1.13)

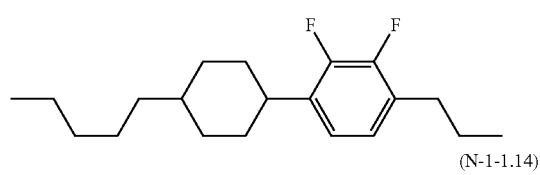
(N-1-1.14)

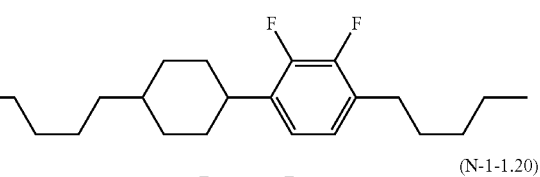
(N-1-1.20)

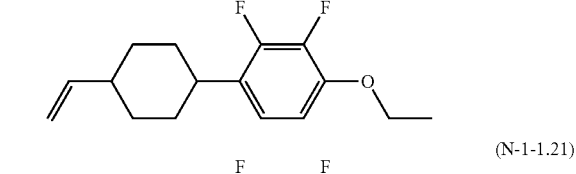
(N-1-1.21)

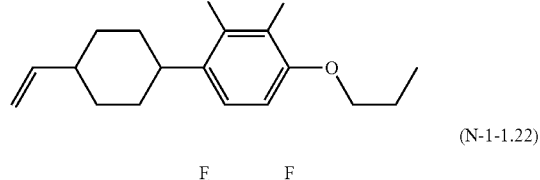
(N-1-1.22)

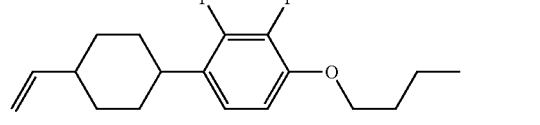

The compounds represented by the formulae (N-1-1.1) to (N-1-1.22) can be used alone or in combination.

The compound represented by the general formula (N-1-2) is the following compound:

[Chem. 62]

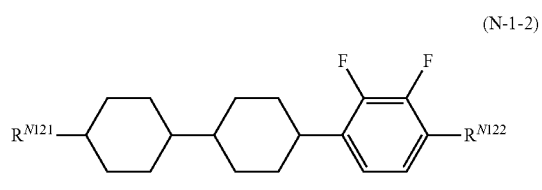
(N-1-2)

(in the formula, $R^{N121}$ and $R^{N122}$ each independently represent the same meaning as $R^{N11}$ and $R^{N12}$ in the general formula (N-1)).

$R^{N121}$ is preferably an alkyl group having 1 to 5 carbon atoms or an alkenyl group having 2 to 5 carbon atoms and is preferably an ethyl group, a propyl group, a butyl group, or a pentyl group. $R^{N122}$ is preferably an alkyl group having 1 to 5 carbon atoms, an alkenyl group having 4 or 5 carbon atoms, or an alkoxy group having 1 to 4 carbon atoms and is preferably a methyl group, a propyl group, a methoxy group, an ethoxy group, or a propoxy group.

The compounds represented by the general formula (N-1-2) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a lower content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-2) with respect to the total amount of the nonpolymerizable liquid crystal compounds contained in the liquid crystal composition for a light-scattering liquid crystal device according to the present invention is preferably 0 mass %, and the upper limit is preferably 30 mass %. More preferably, the lower limit of the content is 0 mass %, and the upper limit is 20 mass %.

Furthermore, the compound represented by the general formula (N-1-2) is preferably a compound selected from the group consisting of compounds represented by formulae (N-1-2.1) to (N-1-2.22), preferably a compound represented by any of formulae (N-1-2.3) to (N-1-2.7), (N-1-2.10), (N-1-2.11), (N-1-2.13), and (N-1-2.20), and is preferably a compound represented by any of formulae (N-1-2.3) to (N-1-2.7) when the improvement of Δε is emphasized, preferably a compound represented by any of formulae (N-1-2.10), (N-1-2.11), and (N-1-2.13) when the improvement of $T_{NI}$ is emphasized, and preferably a compound represented by formula (N-1-2.20) when the improvement of response speed is emphasized.

[Chem. 63]

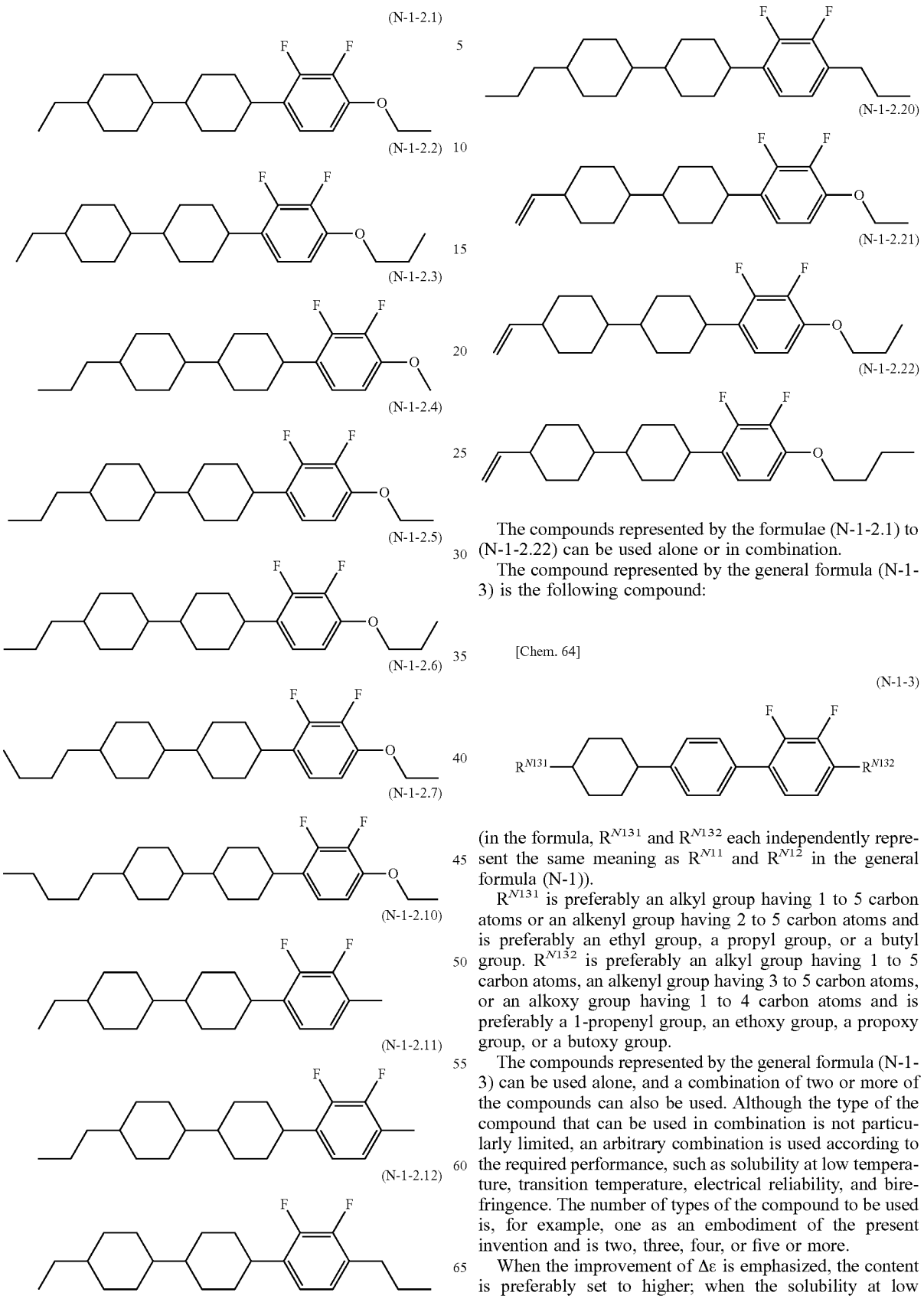

The compounds represented by the formulae (N-1-2.1) to (N-1-2.22) can be used alone or in combination.

The compound represented by the general formula (N-1-3) is the following compound:

[Chem. 64]

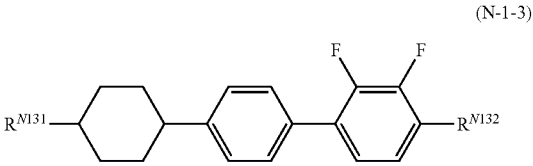

(in the formula, $R^{N131}$ and $R^{N132}$ each independently represent the same meaning as $R^{N11}$ and $R^{N12}$ in the general formula (N-1)).

$R^{N131}$ is preferably an alkyl group having 1 to 5 carbon atoms or an alkenyl group having 2 to 5 carbon atoms and is preferably an ethyl group, a propyl group, or a butyl group. $R^{N132}$ is preferably an alkyl group having 1 to 5 carbon atoms, an alkenyl group having 3 to 5 carbon atoms, or an alkoxy group having 1 to 4 carbon atoms and is preferably a 1-propenyl group, an ethoxy group, a propoxy group, or a butoxy group.

The compounds represented by the general formula (N-1-3) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-3) with respect to the total amount of the nonpolymerizable liquid crystal compounds contained in the liquid crystal composition for a light-scattering liquid crystal device according to the present invention is preferably 5 mass %, and the upper limit is preferably 50 mass %. More preferably, the lower limit of the content is 10 mass %, and the upper limit is 35 mass %.

Furthermore, the compound represented by the general formula (N-1-3) is preferably a compound selected from the group consisting of compounds represented by formulae (N-1-3.1) to (N-1-3.21), preferably a compound represented by any of formulae (N-1-3.1) to (N-1-3.7) and (N-1-3.21), and preferably a compound represented by any of formulae (N-1-3.1), (N-1-3.2), (N-1-3.3), (N-1-3.4), and (N-1-3.6).

[Chem. 65]

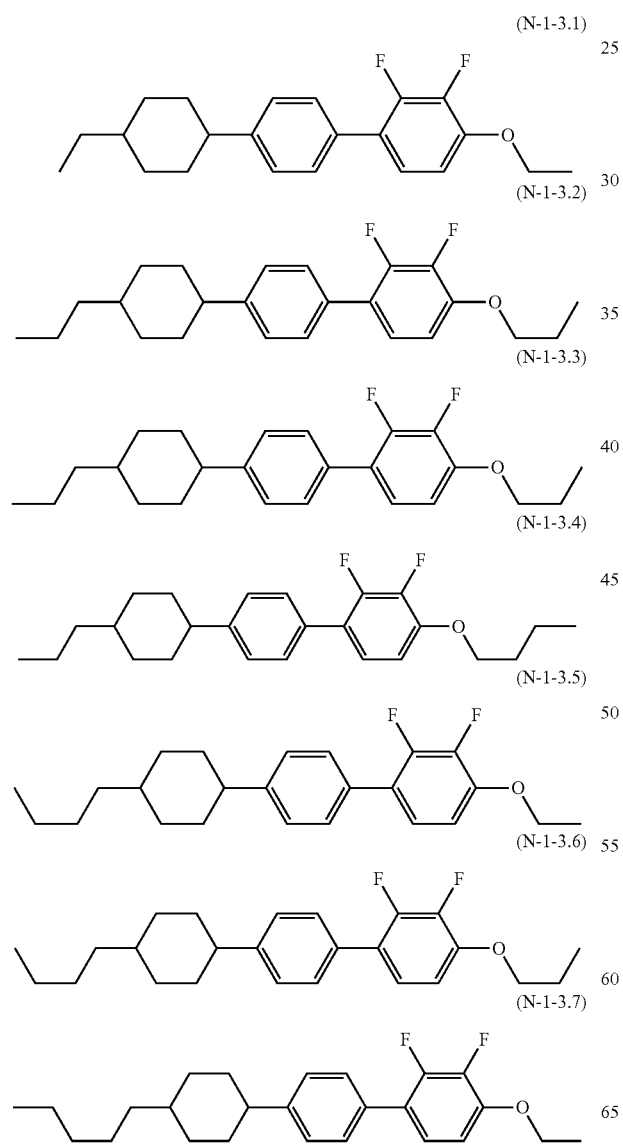

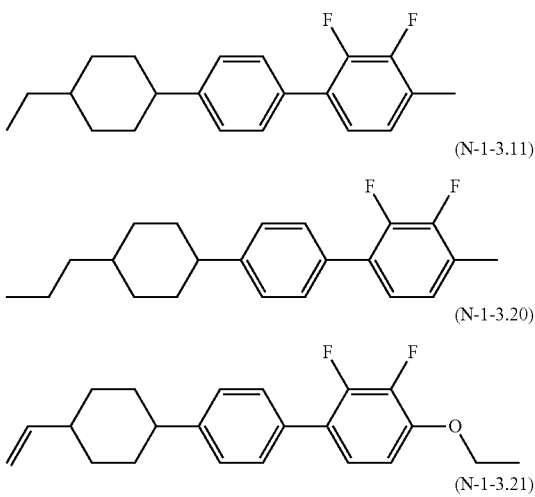

Although the compounds represented by the formulae (N-1-3.1) to (N-1-3.4), (N-1-3.6), and (N-1-3.21) can be used alone or in combination, a combination of compounds represented by the formulae (N-1-3.1) and (N-1-3.2) and a combination of two or three compounds selected from the formulae (N-1-3.3), (N-1-3.4), and (N-1-3.6) are preferable.

The compound represented by the general formula (N-1-4) is the following compound:

[Chem. 66]

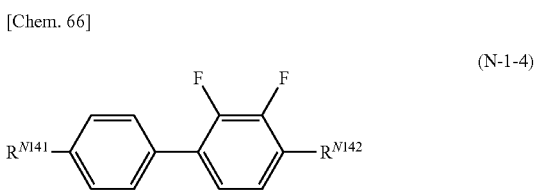

(in the formula, $R^{N141}$ and $R^{N142}$ each independently represent the same meaning as $R^{N11}$ and $R^{N12}$ in the general formula (N-1)).

$R^{N141}$ and $R^{N142}$ are preferably each independently an alkyl group having 1 to 5 carbon atoms, an alkenyl group having 4 or 5 carbon atoms, or an alkoxy group having 1 to 4 carbon atoms and preferably a methyl group, a propyl group, an ethoxy group, or a butoxy group.

The compounds represented by the general formula (N-1-4) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a lower content causes a high effect. Furthermore, in order to improve dripping marks and image-sticking characteristics, the content range is preferably set to medium.

The lower limit of the content of the compound represented by the formula (N-1-4) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the general formula (N-1-4) is preferably a compound selected from the group consisting of compounds represented by formulae (N-1-4.1) to (N-1-4.14), preferably a compound represented by any of formulae (N-1-4.1) to (N-1-4.4), and preferably a compound represented by any of formulae (N-1-4.1), (N-1-4.2), and (N-1-4.4).

[Chem. 67]

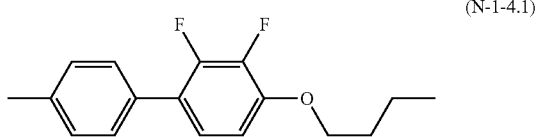
(N-1-4.1)

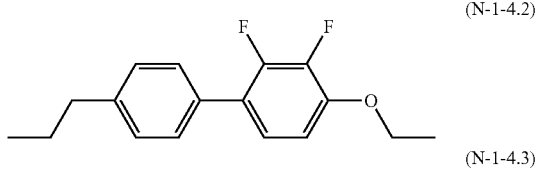
(N-1-4.2)

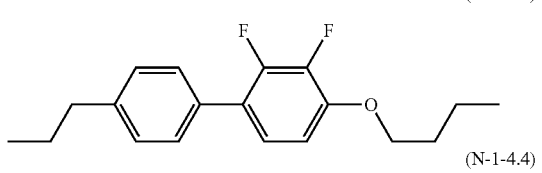
(N-1-4.3)

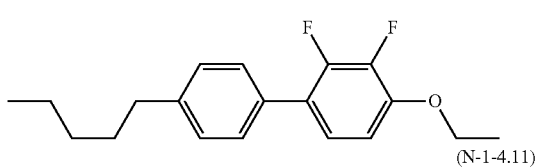
(N-1-4.4)

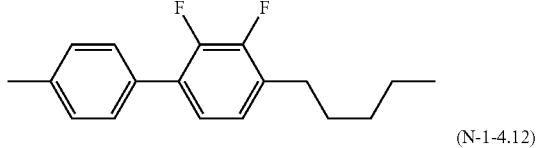
(N-1-4.11)

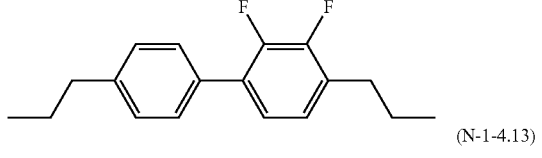
(N-1-4.12)

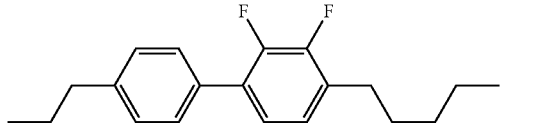
(N-1-4.13)

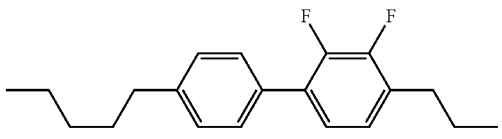
(N-1-4.14)

The compounds represented by formulae (N-1-4.1) to (N-1-4.14) can be used alone or in combination.

The compound represented by the general formula (N-1-5) is the following compound:

[Chem. 68]

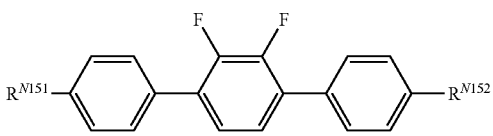
(N-1-5)

(in the formula, $R^{N151}$ and $R^{N152}$ each independently represent the same meaning as $R^{N11}$ and $R^{N12}$ in the general formula (N-1)).

$R^{N151}$ and $R^{N152}$ are preferably each independently an alkyl group having 1 to 5 carbon atoms, an alkenyl group having 4 or 5 carbon atoms, or an alkoxy group having 1 to 4 carbon atoms and preferably an ethyl group, a propyl group, or a butyl group.

The compounds represented by the general formula (N-1-5) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a lower content causes a high effect; and when $T_{NI}$ is emphasized, a higher content causes a high effect. Furthermore, in order to improve dripping marks and image-sticking characteristics, the content range is preferably set to medium.

The lower limit of the content of compound represented by the formula (N-1-5) with respect to the total amount of the nonpolymerizable liquid crystal compounds contained in the liquid crystal composition for a light-scattering liquid crystal device according to the present invention is preferably 0 mass %, and the upper limit is preferably 30 mass %. More preferably, the lower limit of the content is 0 mass %, and the upper limit is 20 mass %.

Furthermore, the compound represented by the general formula (N-1-5) is preferably a compound selected from the group consisting of compounds represented by formulae (N-1-5.1) to (N-1-5.6) and preferably a compound represented by any of formulae (N-1-5.1), (N-1-5.2), and (N-1-5.4).

[Chem. 69]

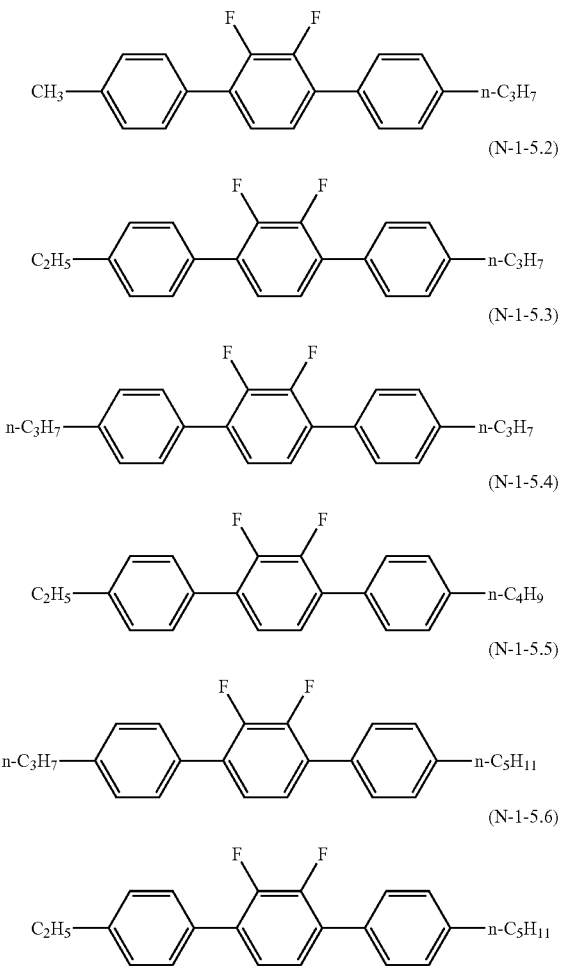

(N-1-5.1)
(N-1-5.2)
(N-1-5.3)
(N-1-5.4)
(N-1-5.5)
(N-1-5.6)

The compounds represented by the formulae (N-1-5.1), (N-1-5.2), and (N-1-5.4) can be used alone or in combination.

The compound represented by the general formula (N-1-10) is the following compound:

[Chem. 70]

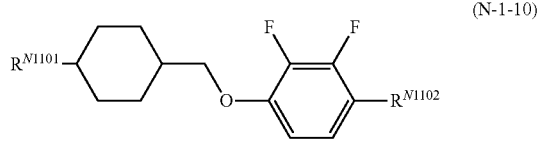

(N-1-10)

(in the formula, $R^{N1101}$ and $R^{N1102}$ each independently represent the same meaning as $R^{N11}$ and $R^{N12}$ in the general formula (N-1)).

$R^{N1101}$ is preferably an alkyl group having 1 to 5 carbon atoms or an alkenyl group having 2 to 5 carbon atoms and is preferably an ethyl group, a propyl group, a butyl group, a vinyl group, or a 1-propenyl group. $R^{N1102}$ is preferably an alkyl group having 1 to 5 carbon atoms, an alkenyl group having 4 or 5 carbon atoms, or an alkoxy group having 1 to 4 carbon atoms and preferably an ethoxy group, a propoxy group, or a butoxy group.

The compounds represented by the general formula (N-1-10) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of $\Delta\varepsilon$ is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-10) with respect to the total amount of the nonpolymerizable liquid crystal compounds contained in the liquid crystal composition for a light-scattering liquid crystal device according to the present invention is preferably 0 mass %, and the upper limit is preferably 35 mass %. More preferably, the lower limit of the content is 2 mass %, and the upper limit is 25 mass %.

Furthermore, the compound represented by the general formula (N-1-10) is preferably a compound selected from the group consisting of compounds represented by formulae (N-1-10.1) to (N-1-10.21), preferably a compound represented by any of formulae (N-1-10.1) to (N-1-10.5), (N-1-10.20), and (N-1-10.21), and preferably a compound represented by any of formulae (N-1-10.1), (N-1-10.2), (N-1-10.20), and (N-1-10.21).

[Chem. 71]

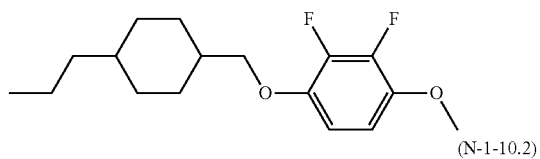

(N-1-10.1)

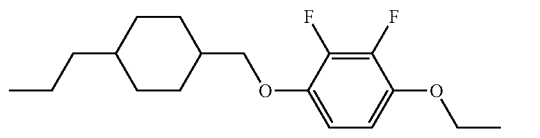

(N-1-10.2)

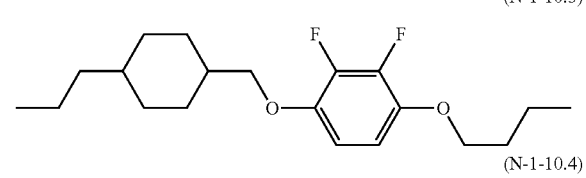

(N-1-10.3)

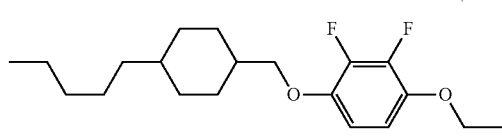

(N-1-10.4)

-continued

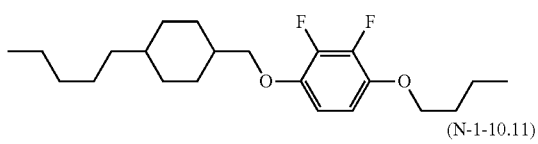
(N-1-10.5)

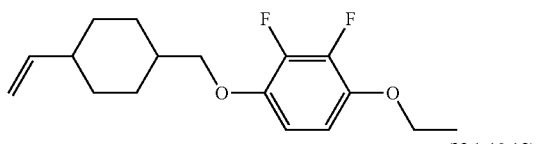
(N-1-10.11)

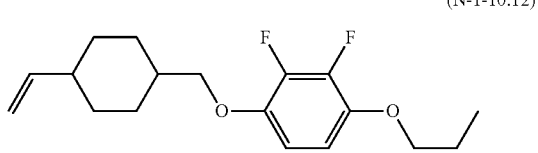
(N-1-10.12)

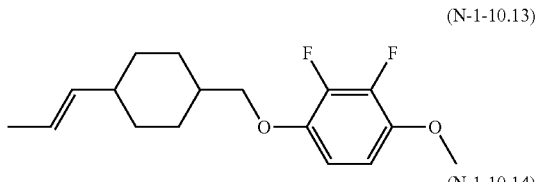
(N-1-10.13)

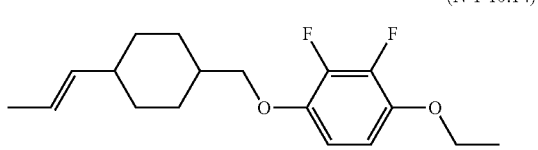
(N-1-10.14)

The compounds represented by formulae (N-1-10.1), (N-1-10.2), (N-1-10.20), and (N-1-1021) can be used alone or in combination.

The compound represented by the general formula (N-1-11) is the following compound:

[Chem. 72]

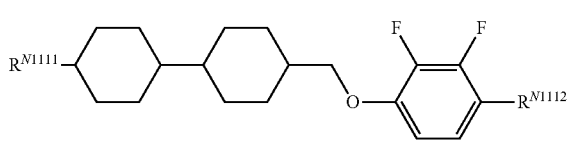
(N-1-11)

(in the formula, $R^{N1111}$ and $R^{N1112}$ each independently represent the same meaning as $R^{N11}$ and $R^{N12}$ in the general formula (N-1)).

$R^{N1111}$ is preferably an alkyl group having 1 to 5 carbon atoms or an alkenyl group having 2 to 5 carbon atoms and is preferably an ethyl group, a propyl group, a butyl group, a vinyl group, or a 1-propenyl group. $R^{N1112}$ is preferably an alkyl group having 1 to 5 carbon atoms, an alkenyl group having 4 or 5 carbon atoms, or an alkoxy group having 1 to 4 carbon atoms and is preferably an ethoxy group, propoxy group, or a butoxy group.

The compounds represented by the general formula (N-1-11) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of $\Delta\varepsilon$ is emphasized, the content is preferably set to higher; when the solubility at low temperature is emphasized, a lower content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-11) with respect to the total amount of the nonpolymerizable liquid crystal compounds contained in the liquid crystal composition for a light-scattering liquid crystal device according to the present invention is preferably 0 mass %, and the upper limit is preferably 75 mass %. More preferably, the lower limit of the content is 2%, and the upper limit is 50 mass %.

Furthermore, the compound represented by the general formula (N-1-11) is preferably a compound selected from the group consisting of compounds represented by formulae (N-1-11.1) to (N-1-11.14), preferably a compound represented by any of formulae (N-1-11.1) to (N-1-11.5), and preferably a compound represented by any of formulae (N-1-11.2) and (N-1-11.4).

[Chem. 73]

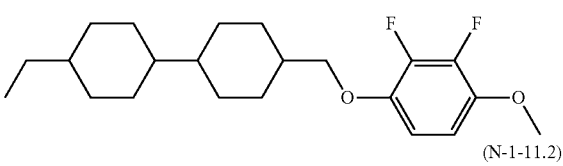
(N-1-11.1)

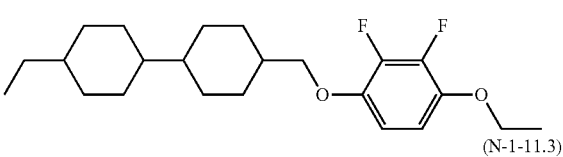
(N-1-11.2)

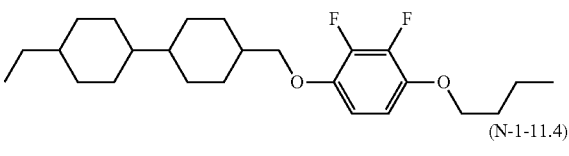
(N-1-11.3)

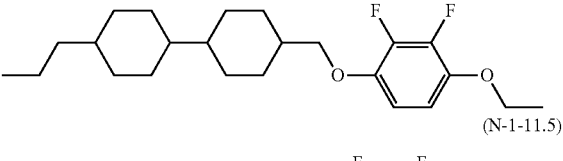
(N-1-11.4)

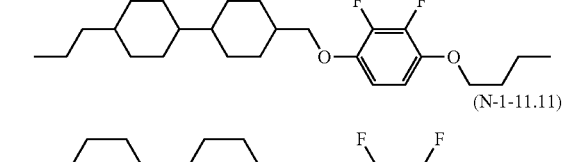
(N-1-11.5)

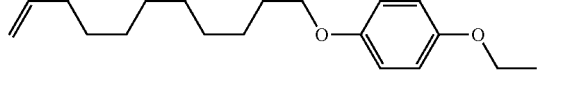
(N-1-11.11)

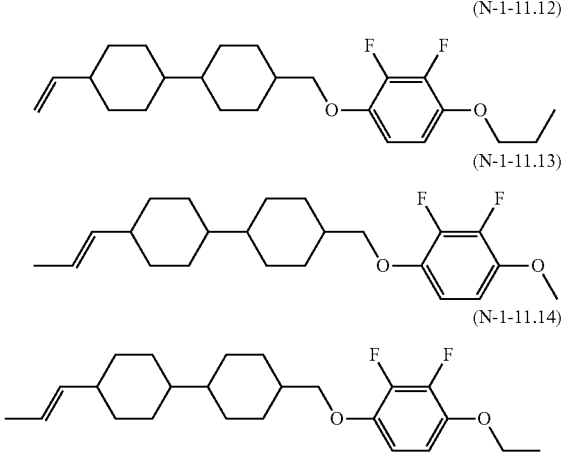

(N-1-11.12)

(N-1-11.13)

(N-1-11.14)

The compounds represented by formulae (N-1-11.2) and (N-1-11.4) can be used alone or in combination The compound represented by the general formula (N-1-12) is the following compound:

[Chem. 74]

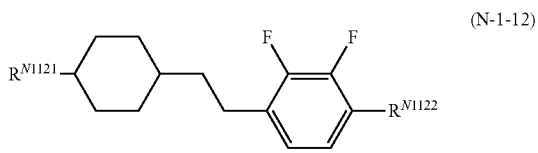

(N-1-12)

(in the formula, $R^{N1121}$ and $R^{N1122}$ each independently represent the same meaning as $R^{N11}$ and $R^{N12}$ in the general formula (N-1)).

$R^{N1121}$ is preferably an alkyl group having 1 to 5 carbon atoms or an alkenyl group having 2 to 5 carbon atoms and is preferably an ethyl group, a propyl group, or a butyl group. $R^{N1122}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-12) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-12) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-13) is the following compound:

[Chem. 75]

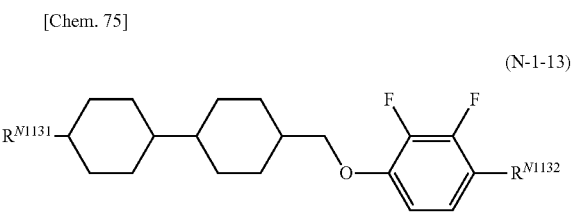

(N-1-13)

(in the formula, $R^{N1131}$ and $R^{N1132}$ each independently represent the same meaning as $R^{N11}$ and $R^{N12}$ in the general formula (N-1)).

$R^{N1131}$ is preferably an alkyl group having 1 to 5 carbon atoms or an alkenyl group having 2 to 5 carbon atoms and is preferably an ethyl group, a propyl group, or a butyl group. $R^{N1132}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-13) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-13) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-14) is the following compound:

[Chem. 76]

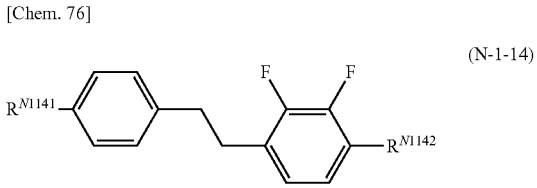

(N-1-14)

(in the formula, $R^{N1141}$ and $R^{N1142}$ each independently represent the same meaning as $R^{N11}$ and $R^{N12}$ in the general formula (N-1)).

$R^{N1141}$ is preferably an alkyl group having 1 to 5 carbon atoms or an alkenyl group having 2 to 5 carbon atoms and is preferably an ethyl group, a propyl group, or a butyl group. $R^{N1142}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-14) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by formula (N-1-14) with respect to the total amount of the nonpolymerizable liquid crystal compounds contained in the liquid crystal composition for a light-scattering liquid crystal device according to the present invention is 0 mass %, and the upper limit is preferably 25 mass %. More preferably, the lower limit of the content is 0 mass %, and the upper limit is 15 mass %.

The compound represented by the general formula (N-1-15) is the following compound:

[Chem. 77]

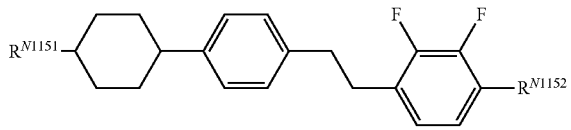

(N-1-15)

(in the formula, $R^{N1151}$ and $R^{N1152}$ each independently represent the same meaning as $R^{N11}$ and $R^{N12}$ in the general formula (N-1).

$R^{N1151}$ is preferably an alkyl group having 1 to 5 carbon atoms or an alkenyl group having 2 to 5 carbon atoms and is preferably an ethyl group, a propyl group, or a butyl group. $R^{N1152}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-15) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-15) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-16) is the following compound:

[Chem. 78]

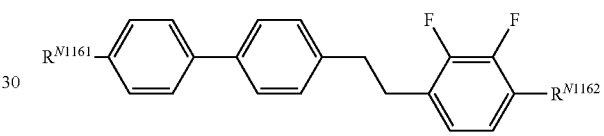

(N-1-16)

(in the formula, $R^{N1161}$ and $R^{N1162}$ each independently represent the same meaning as $R^{N11}$ and $R^{N12}$ in the general formula (N-1)).

$R^{N1161}$ is preferably an alkyl group having 1 to 5 carbon atoms or an alkenyl group having 2 to 5 carbon atoms and is preferably an ethyl group, a propyl group, or a butyl group. $R^{N1162}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-16) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-16) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-17) is the following compound:

[Chem. 79]

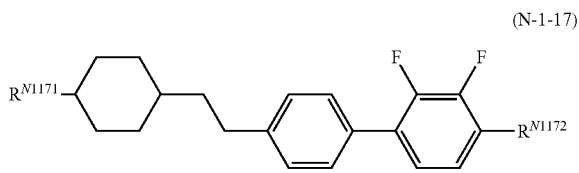

(N-1-17)

(in the formula, $R^{N1171}$ and $R^{N1172}$ each independently represent the same meaning as $R^{N11}$ and $R^{N12}$ in the general formula (N-1)).

$R^{N1171}$ is preferably an alkyl group having 1 to 5 carbon atoms or an alkenyl group having 2 to 5 carbon atoms and is preferably an ethyl group, a propyl group, or a butyl group. $R^{N1172}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-17) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-17) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-18) is the following compound:

[Chem. 80]

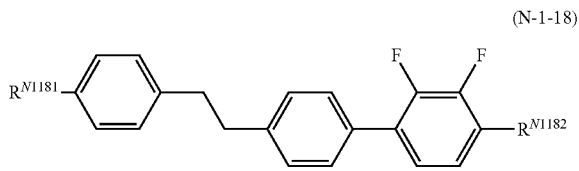

(N-1-18)

(in the formula, $R^{N1181}$ and $R^{N1182}$ each independently represent the same meaning as $R^{N11}$ and $R^{N12}$ in the general formula (N-1)).

$R^{N1181}$ is preferably an alkyl group having 1 to 5 carbon atoms or an alkenyl group having 2 to 5 carbon atoms and is preferably a methyl group, an ethyl group, a propyl group, or a butyl group. $R^{N1182}$ is preferably an alkyl group having 1 to 5 carbon atoms, an alkenyl group having 4 or 5 carbon atoms, or an alkoxy group having 1 to 4 carbon atoms and is preferably an ethoxy group, a propoxy group, or a butoxy group.

The compounds represented by the general formula (N-1-18) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-18) with respect to the total amount of the nonpolymerizable liquid crystal compounds contained in the liquid crystal composition for a light-scattering liquid crystal device according to the present invention is 0 mass %, and the upper limit is preferably 35 mass %. More preferably, the lower limit of the content is 2 mass %, and the upper limit is 25 mass %.

Furthermore, the compound represented by the general formula (N-1-18) is preferably a compound selected from the group consisting of compounds represented by formulae (N-1-18.1) to (N-1-18.5), preferably a compound represented by any of formulae (N-1-18.1) to (N-1-11.3), and preferably a compound represented by any of formulae (N-1-18.2) and (N-1-18.3).

[Chem. 81]

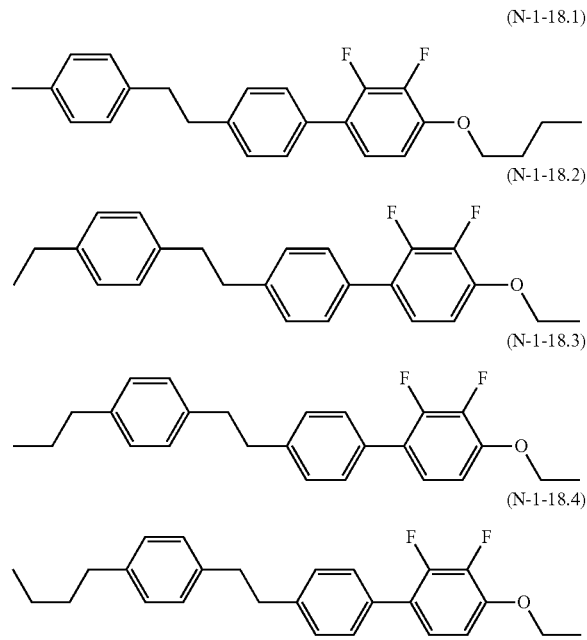

(N-1-18.1)

(N-1-18.2)

(N-1-18.3)

(N-1-18.4)

-continued

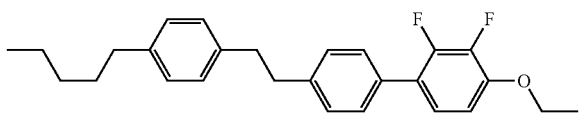

(N-1-18.5)

The compound represented by the general formula (N-1-20) is the following compound:

[Chem. 82]

(N-1-20)

(in the formula, $R^{N1201}$ and $R^{N1202}$ each independently represent the same meaning as $R^{N11}$ and $R^{N12}$ in the general formula (N-1)).

$R^{N1201}$ and $R^{N1202}$ are preferably each independently an alkyl group having 1 to 5 carbon atoms or an alkenyl group having 2 to 5 carbon atoms and preferably an ethyl group, a propyl group, or a butyl group.

The compounds represented by the general formula (N-1-20) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-20) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-21) is the following compound:

[Chem. 83]

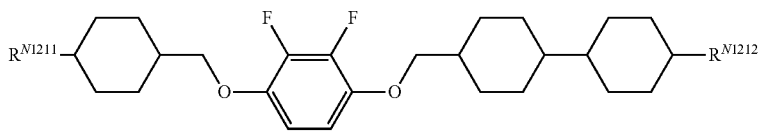

(in the formula, $R^{N1211}$ and $R^{N1212}$ each independently represent the same meaning as $R^{N11}$ and $R^{N12}$ in the general formula (N-1)).

$R^{N1211}$ and $R^{N1212}$ are preferably each independently an alkyl group having 1 to 5 carbon atoms or an alkenyl group having 2 to 5 carbon atoms and preferably an ethyl group, a propyl group, or a butyl group.

The compounds represented by the general formula (N-1-21) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-21) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The compound represented by the general formula (N-1-22) is the following compound:

[Chem. 84]

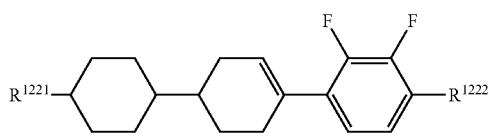

(N-1-22)

(in the formula, $R^{N1221}$ and $R^{N1222}$ each independently represent the same meaning as $R^{N11}$ and $R^{N12}$ in the general formula (N-1)).

$R^{N1221}$ and $R^{N1222}$ are preferably each independently an alkyl group having 1 to 5 carbon atoms or an alkenyl group having 2 to 5 carbon atoms and preferably an ethyl group, a propyl group, or a butyl group.

The compounds represented by the general formula (N-1-22) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a higher content causes a high effect. Furthermore, in order to improve dripping marks and image-sticking characteristics, the content range is preferably set to medium.

The lower limit of the content of the compound represented by the formula (N-1-21) with respect to the total amount of the nonpolymerizable liquid crystal compounds contained in the liquid crystal composition for a light-scattering liquid crystal device according to the present invention is 0 mass %, and the upper limit is preferably 25 mass %. More preferably, the lower limit of the content is 0 mass %, and the upper limit is 15 mass %.

Furthermore, the compound represented by the general formula (N-1-22) is preferably a compound selected from the group consisting of compounds represented by formulae (N-1-22.1) to (N-1-22.12), preferably a compound represented by any of formulae (N-1-22.1) to (N-1-22.5), and preferably a compound represented by any of formulae (N-1-22.1) to (N-1-22.4).

[Chem. 85]

(N-1-22.1)
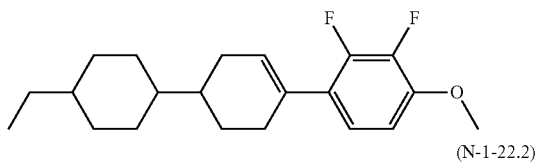

(N-1-22.2)
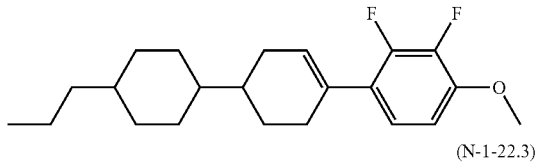

(N-1-22.3)
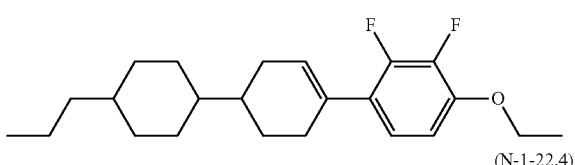

(N-1-22.4)
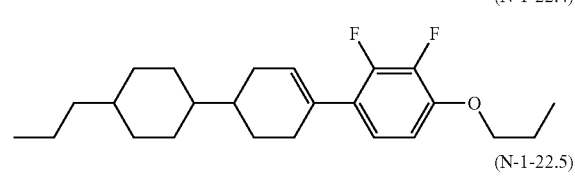

(N-1-22.5)
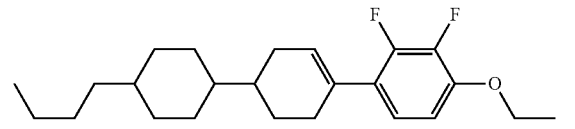

-continued (N-1-22.6)
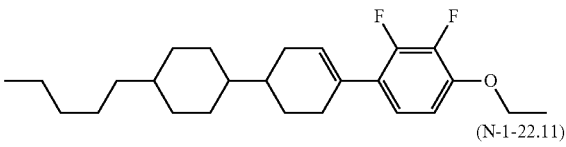

(N-1-22.11)
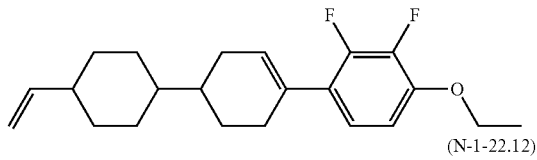

(N-1-22.12)
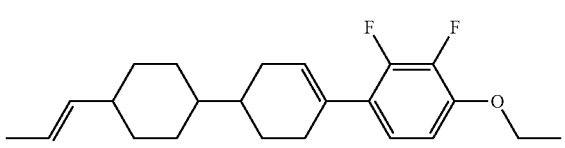

The compound represented by the general formula (N-2) is preferably a compound selected from the group consisting of compounds represented by formula (N-2-1) or (N-2-2):

[Chem. 86]

(N-2-1)
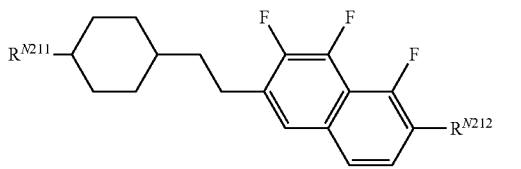

(N-2-2)
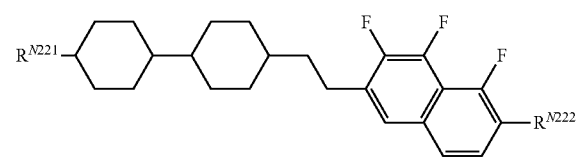

(in the formula, $R^{N211}$ and $R^{N212}$ each independently represent the same meaning as $R^{N21}$ and $R^{N22}$ in the general formula (N-2). Similarly, in the formula, $R^{N221}$ and $R^{N222}$ each independently represent the same meaning as $R^{N21}$ and $R^{N22}$ in the general formula (N-2)).

$R^{N211}$ and $R^{N221}$ are each preferably an alkyl group having 1 to 5 carbon atoms or an alkenyl group having 2 to 5 carbon atoms and preferably an ethyl group, a propyl group, a butyl group, a vinyl group, or a 1-propenyl group.

$R^{N221}$ and $R^{N222}$ are each preferably an alkyl group having 1 to 5 carbon atoms, an alkenyl group having 4 or 5 carbon atoms, or an alkoxy group having 1 to 4 carbon atoms and preferably an ethoxy group, a propoxy group, or a butoxy group.

The compounds represented by the formula (N-2-1) or (N-2-2) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a lower content causes a high effect. Furthermore, in order to improve dripping marks and image-sticking characteristics, the content range is preferably set to medium.

The lower limit of the content of the compound represented by the formula (N-2-1) or (N-2-2) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the formula (N-2-1) or (N-2-2) is preferably a compound selected from the group consisting of compounds represented by formulae (N-2-1.1) to (N-2-1.5) and formulae (N-2-2.1) and (N-2-2.2).

[Chem. 87]

(N-2-1.1)
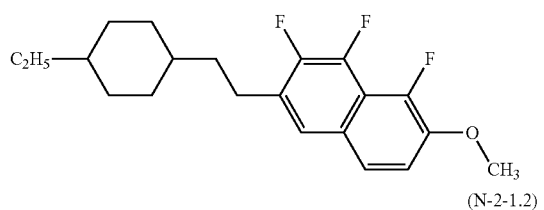

(N-2-1.2)
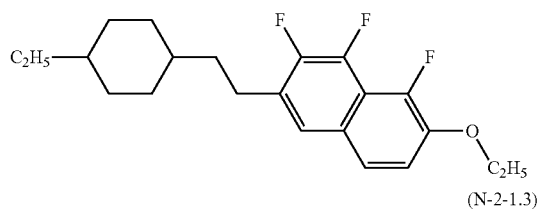

(N-2-1.3)
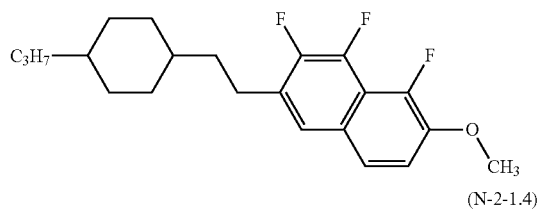

(N-2-1.4)
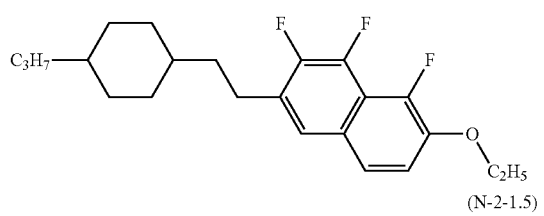

(N-2-1.5)
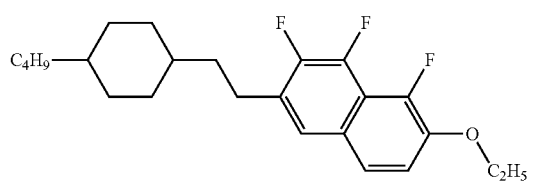

-continued (N-2-2.1)
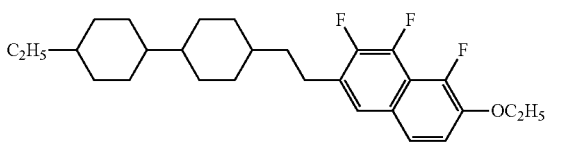

(N-2-2.2)
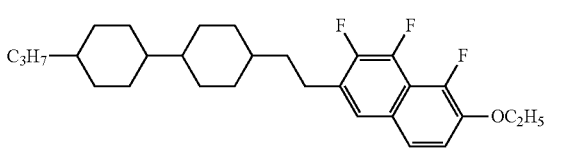

The compound represented by the general formula (N-3) is preferably a compound selected from the group consisting of compounds represented by a general formula (N-3-2):

[Chem. 88]

(N-3-2)
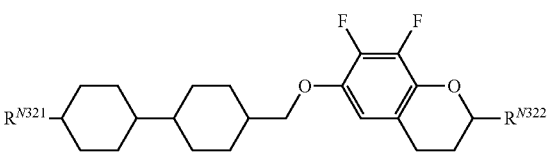

(in the formula, $R^{N321}$ and $R^{N322}$ each independently represent the same meaning as $R^{N\#1}$ and $R^{N32}$ in the general formula (N-3)).

$R^{N321}$ and $R^{N322}$ are each preferably an alkyl group having 1 to 5 carbon atoms or an alkenyl group having 2 to 5 carbon atoms and preferably a propyl group or a pentyl group.

The compounds represented by the general formula (N-3-2) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the improvement of Δε is emphasized, the content is preferably set to higher; when the solubility at low temperature is emphasized, a higher content causes a high effect; and when $T_{NI}$ is emphasized, a lower content causes a high effect. Furthermore, in order to improve dripping marks and image-sticking characteristics, the content range is preferably set to medium.

The lower limit of the content of the compound represented by the formula (N-3-2) with respect to the total amount of the nonpolymerizable liquid crystal compounds contained in the composition for a light-scattering liquid crystal device liquid crystal according to the present invention is preferably 0 mass %, and the upper limit is preferably 25 mass %. More preferably, the lower limit of the content is 0 mass %, and the upper limit is 15 mass %.

Furthermore, the compound represented by the general formula (N-3-2) is preferably a compound selected from the group consisting of compounds represented by formulae (N-3-2.1) to (N-3-2.3).

[Chem. 89]

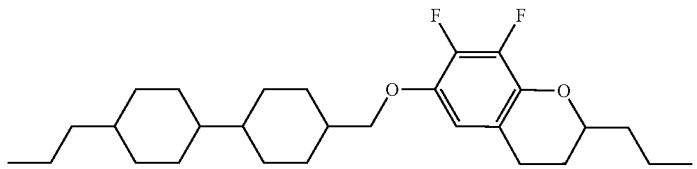

(N-3-2.1)

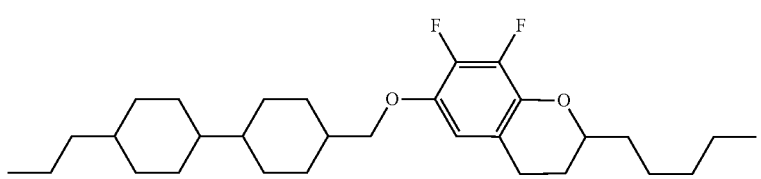

(N-3-2.2)

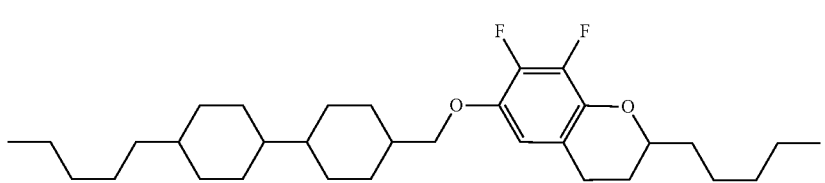

(N-3-2.3)

The liquid crystal composition for a light-scattering liquid crystal device according to the present invention preferably contains one type or two or more types of liquid crystal compounds represented by a general formula (L) as the nonpolymerizable liquid crystal compound.

The liquid crystal compound represented by the general formula (L) corresponds to a dielectrically almost neutral compound (the value of dielectric anisotropy Δε is −2 to 2).

[Chem. 90]

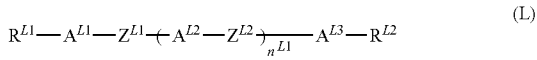

(L)

(In the formula, $R^{L1}$ and $R^{L2}$ each independently represent an alkyl group having 1 to 8 carbon atoms, and one or two or more non-adjacent —CH$_2$— groups in the alkyl group may be each independently substituted by CH=CH—, —C≡C—, —O—, —CO—, —COO—, or —OCO—;

$n^{L1}$ represents 0, 1, 2, or 3;

$A^{L1}$, $A^{L2}$, and $A^{L3}$ each independently represent a group selected from the group consisting of:

(a) a 1,4-cyclohexylene group (one —CH$_2$— group or two or more non-adjacent —CH$_2$— groups present in this group may be substituted by —O—);

(b) a 1,4-phenylene group (one —CH= group or two or more non-adjacent —CH= groups present in this group may be substituted by —N=); and (c) a naphthalene-2,6-diyl group, a 1,2,3,4-tetrahydronaphthalene-2,6-diyl group, or a decahydronaphthalene-2,6-diyl group (one —CH= group or two or more non-adjacent —CH= groups present in the naphthalene-2,6-diyl group or the 1,2,3,4-tetrahydronaphthalene-2,6-diyl group may be substituted by —N=), one or two or more hydrogen atoms present in the groups of the above-mentioned groups (a), (b), (c) may be each independently substituted by a cyano group, a fluorine atom, or a chlorine atom; and $Z^{L1}$ and $Z^{L2}$ each independently represent a single bond, —CH$_2$CH$_2$—, —(CH$_2$)S—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and when $n^{L1}$ is 2 or 3 and multiple $A^{L2}$s are present, they may be the same or different, and when $n^{L1}$ is 2 or 3 and multiple $Z^{L2}$s are present, they may be the same or different.)

The compounds represented by the general formula (L) may be used alone and can be used in combination. Although the type of the compound that can be used in combination is not particularly limited, an arbitrary combination is used according to the desired performance, such as solubility at low temperature, transition temperature, electrical reliability, and birefringence. The number of types of the compound to be used is, for example, one as an embodiment of the present invention. Alternatively, the number in another embodiment of the present invention is two, three, four, five, six, seven, eight, nine, or ten or more.

In the liquid crystal composition for a light-scattering liquid crystal device according to the present invention, it is necessary to appropriately adjust the content of the liquid crystal compound represented by the general formula (L) i according to the required performance such as solubility at low temperature, transition temperature, electrical reliability, birefringence, process adaptability, dripping mark, image-sticking, and dielectric anisotropy.

The lower limit of the content of the compound represented by the formula (L) with respect to the total amount of the nonpolymerizable liquid crystal compounds contained in the liquid crystal composition for a light-scattering liquid crystal device according to the present invention is preferably 1 mass %, and the upper limit is preferably 85 mass %. More preferably, the lower limit of the content is 3 mass %, and the upper limit is 65 mass %.

When the composition is required to maintain a low viscosity and have a high response speed, it is preferable that the above-mentioned lower limit be high and that the above-mentioned upper limit be high. Furthermore, when the composition according to the present invention is required to maintain a high $T_{NI}$ and have good temperature stability, it is preferable that the above-mentioned lower limit be high and that the above-mentioned upper limit be high. In addition, when high dielectric anisotropy is required for maintaining a low driving voltage, it is preferable that the lower limit be low and the upper limit be low.

When the reliability is emphasized, $R^{L1}$ and $R^{L2}$ are preferably both alkyl groups; when a reduction in the volatility of the compound is emphasized, they are preferably alkoxy groups; and when a reduction in viscosity is emphasized, at least one of them is preferably an alkenyl group.

The number of halogen atoms present in the molecule is preferably zero, one, two, or three and preferably zero or one, and when compatibility with other liquid crystal molecules is emphasized, the number is preferably one.

When the ring structure to which $R^{L1}$ or $R^{L2}$ bonds is a phenyl group (aromatic), $R^{L1}$ and $R^{L2}$ are each preferably a linear alkyl group having 1 to 5 carbon atoms, a linear alkoxy group having 1 to 4 carbon atoms, or an alkenyl group having 4 or 5 carbon atoms; and when the ring structure to which $R^{L1}$ or $R^{L2}$ bonds is a saturated ring structure such as cyclohexane, pyran, and dioxane, $R^{L1}$ and $R^{L2}$ are each preferably a linear alkyl group having 1 to 5 carbon atoms, a linear alkoxy group having 1 to 4 carbon atoms, or a linear alkenyl group having 2 to 5 carbon atoms. In order to stabilize the nematic phase, the number of carbon atoms and, when present, oxygen atoms in each of $R^{L1}$ and $R^{L2}$ is preferably five or less in total, and the $R^{L1}$ and $R^{L2}$ are preferably linear.

The alkenyl group is preferably selected from the groups represented by any of formulae (R1) to (R5) (in each formula, the black circle represents a carbon atom in the ring structure).

[Chem. 91]

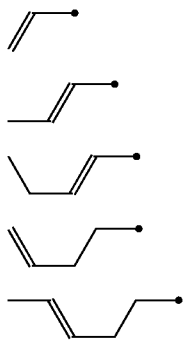

(R1)

(R2)

(R3)

(R4)

(R5)

$n^{L1}$ is preferably 0 when the response speed is emphasized and is preferably 2 or 3 in order to improve the upper limit temperature of the nematic phase and is preferably 1 for balancing between them. In addition, in order to satisfy the characteristics required as the composition, it is preferable to combine compounds having different $n^{L1}$ values.

$A^{L1}$, $A^{L2}$, and $A^{L3}$ are preferably aromatic when a large Δn is required and are preferably aliphatic in order to improve the response speed and preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably represent the following structures:

[Chem. 92]

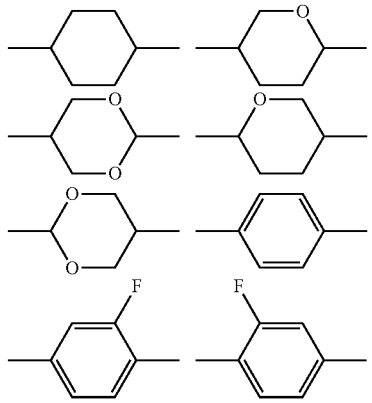

and more preferably represent a trans-1,4-cyclohexylene group or a 1,4-phenylene group.

$Z^{L1}$ and $Z^{L2}$ are preferably single bonds when the response speed is emphasized.

The number of halogen atoms in the molecule of the compound represented by the general formula (L) is preferably zero or one.

The compound represented by the general formula (L) is preferably a compound selected from the group consisting of compounds represented by general formulae (L-1) to (L-9).

The compound represented by the general formula (L-1) is the following compound:

[Chem. 93]

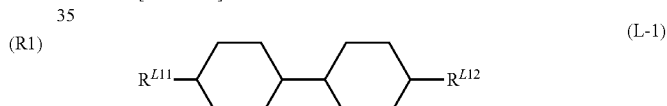

(L-1)

(in the formula, $R^{L11}$ and $R^{L12}$ each independently represent the same meaning as $R^{L1}$ and $R^{L2}$ in general formula (L)).

$R^{L11}$ and $R^{L12}$ are each preferably a linear alkyl group having 1 to 5 carbon atoms, a linear alkoxy group having 1 to 4 carbon atoms, or a linear alkenyl group having 2 to 5 carbon atoms.

The compounds represented by the general formula (L-1) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

The lower limit of the content with respect to the total amount of the nonpolymerizable liquid crystal compounds contained in the liquid crystal composition for a light-scattering liquid crystal device according to the present invention is preferably 0 mass %, and the upper limit is preferably 30 mass %. More preferably, the lower limit of the content is 0 mass %, and the upper limit is 20 mass %.

When the composition is required to maintain a low viscosity and have a high response speed, it is preferable that the above-mentioned lower limit be high and that the above-mentioned upper limit be high. Furthermore, when the composition is required to maintain a high $T_{NI}$ and have good temperature stability, it is preferable that the above-mentioned lower limit be medium and the above-mentioned upper limit be medium. In addition, when high dielectric anisotropy is required for maintaining a low driving voltage, it is preferable that the lower limit be low and the upper limit be low.

The compound represented by the general formula (L-1) is preferably a compound selected from the group consisting of compounds represented by a general formula (L-1-1):

[Chem. 94]

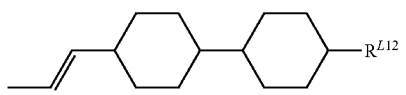

(L-1-1)

(in the formula, $R^{L12}$ represents the same meaning as that in the general formula (L-1)).

The compound represented by the general formula (L-1-1) is preferably a compound selected from the group consisting of compounds represented by formulae (L-1-1.1) to (L-1-1.3) and preferably a compound represented by a formula (L-1-1.2) or (L-1-1.3) and, in particular, preferably a compound represented by a formula (L-1-1.3).

[Chem. 95]

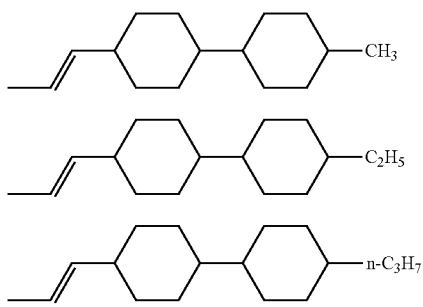

(L-1-1.1)
(L-1-1.2)
(L-1-1.3)

The lower limit of the content of the compound represented by the formula (L-1-1.3) with respect to the total amount of the nonpolymerizable liquid crystal compounds contained in the liquid crystal composition for a light-scattering liquid crystal device according to the present invention is preferably 0%, and the upper limit is preferably 20 mass %. More preferably, the lower limit of the content is 0 mass %, and the upper limit is 13 mass %.

The compound represented by the general formula (L-1) is preferably a compound selected from the group consisting of compounds represented by a general formula (L-1-2):

[Chem. 96]

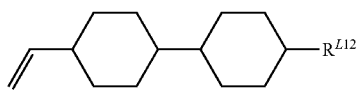

(L-1-2)

(in the formula, $R^{L12}$ represents the same meaning as that in the general formula (L-1)).

The lower limit of the content of the compound represented by the formula (L-1-2) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the general formula (L-1-2) is preferably a compound selected from the group consisting of compounds represented by formulae (L-1-2.1) to (L-1-2.4) and preferably a compound represented by any of formulae (L-1-2.2) to (L-1-2.4). In particular, the compound represented by the formula (L-1-2.2) is preferable for particularly improving the response speed of the composition. In addition, when a high $T_{NI}$ is required rather than the response speed, a compound represented by the formula (L-1-2.3) or (L-1-2.4) is preferably used. In order to improve the solubility at low temperature, it is not preferable that the content of the compounds represented by the formulae (L-1-2.3) and (L-1-2.4) is 30 mass % or more.

[Chem. 97]

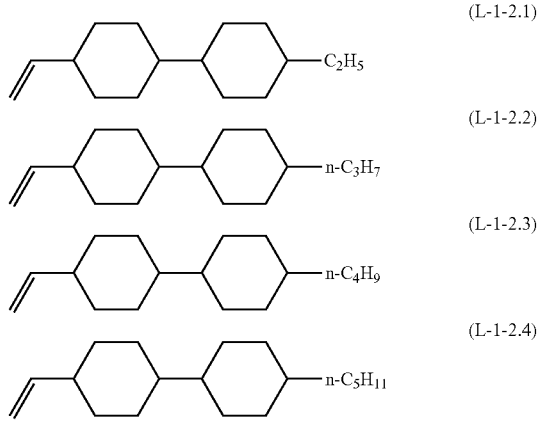

(L-1-2.1)
(L-1-2.2)
(L-1-2.3)
(L-1-2.4)

The compound represented by the general formula (L-1) is preferably a compound selected from the group consisting of compounds represented by a general formula (L-1-3):

[Chem. 98]

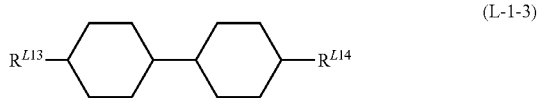

(L-1-3)

(in the formula, $R^{L13}$ and $R^{L14}$ each independently represent an alkyl group having 1 to 8 carbon atoms or an alkoxy group having 1 to 8 carbon atoms).

$R^{L13}$ and $R^{L14}$ are each preferably a linear alkyl group having 1 to 5 carbon atoms, a linear alkoxy group having 1 to 4 carbon atoms, or a linear alkenyl group having 2 to 5 carbon atoms.

The lower limit of the content of the compound represented by the formula (L-1-3) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the general formula (L-1-3) is preferably a compound selected from the group consisting of compounds represented by formulae (L-1-3.1) to (L-1-3.12) and preferably a compound represented by a formula (L-1-3.1), (L-1-3.3), or (L-1-3.4). In particular, the compound represented by the formula (L-1-3.1) is preferable for particularly improving the response speed of the composition. In addition, when a high $T_{NI}$ is required rather than the response speed, a compound represented by the formula (L-1-3.3), (L-1-3.4), (L-1-3.11), or (L-1-3.12) is preferably used. In order to improve the solubility at low temperature, it is not preferable that the total content of the compounds represented by the formulae (L-1-3.3), (L-1-3.4), (L-1-3.11), and (L-1-3.12) is 20 mass % or more.

[Chem. 99]

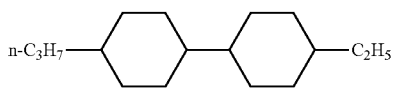
(L-1-3.1)

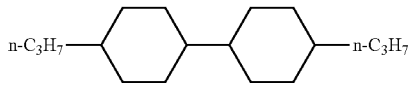
(L-1-3.2)

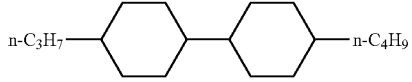
(L-1-3.3)

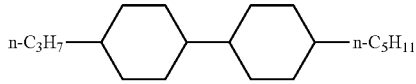
(L-1-3.4)

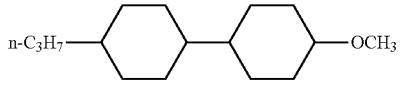
(L-1-3.11)

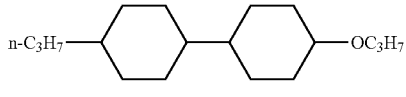
(L-1-3.12)

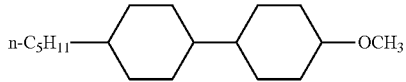
(L-1-3.13)

The compound represented by the general formula (L-1) is preferably a compound selected from the group consisting of compounds represented by a general formula (L-1-4) and/or (L-1-5):

[Chem. 100]

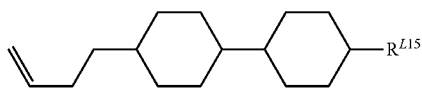
(I-1-4)

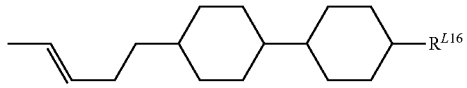
(I-1-5)

(in the formulae, $R^{L15}$ and $R^{L16}$ each independently represent an alkyl group having 1 to 8 carbon atoms or an alkoxy group having 1 to 8 carbon atoms).

$R^{L15}$ and $R^{L16}$ are each preferably linear an alkyl group having 1 to 5 carbon atoms, a linear alkoxy group having 1 to 4 carbon atoms, or a linear alkenyl group having 2 to 5 carbon atoms.

The lower limit of the content of the compound represented by the formula (L-1-4) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

The lower limit of the content of the compound represented by the formula (L-1-5) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compounds represented by the general formulae (L-1-4) and (L-1-5) are preferably compounds selected from the group consisting of compounds represented by formulae (L-1-4.1) to (L-1-5.3) and preferably compounds represented by the formulae (L-1-4.2) and (L-1-5.2).

[Chem. 101]

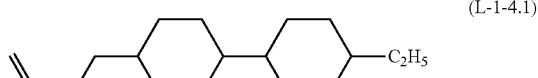
(L-1-4.1)

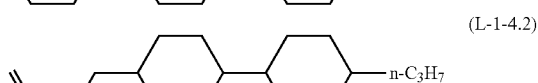
(L-1-4.2)

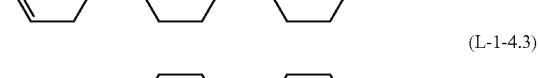
(L-1-4.3)

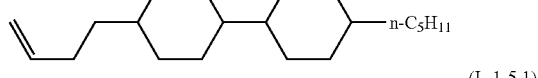
(L-1-5.1)

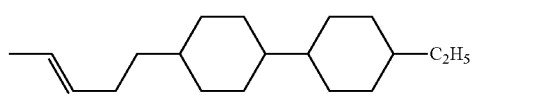
(L-1-5.2)

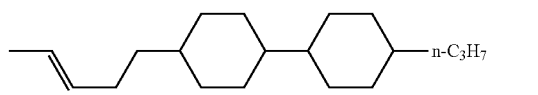
(L-1-5.3)

When the reliability of the composition is emphasized, a combination of two or more compounds selected from compounds represented by the formulae (L-1-3.1), (L-1-3.3), and (L-1-3.4)) is preferable; and when the response speed of the composition is emphasized, a combination of two or more compounds selected from compounds represented by the formulae (L-1-1.3) and (L-1-2.2) is preferable. The compound represented by the general formula (L-1) is preferably a compound selected from the group consisting of compounds represented by a general formula (L-1-6):

[Chem. 102]

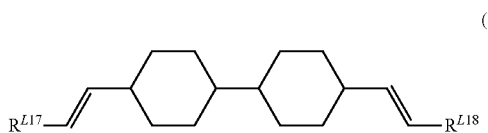

(L-1-6)

(in the formula, $R^{L17}$ and $R^{L18}$ each independently represent a methyl group or a hydrogen atom).

The lower limit of the content of the compound represented by the formula (L-1-6) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the general formula (L-1-6) is preferably a compound selected from the group consisting of compounds represented by formulae (L-1-6.1) to (L-1-6.3).

[Chem. 103]

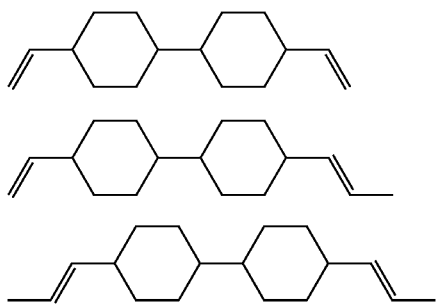

(L-1-6.1)

(L-1-6.2)

(L-1-6.3)

The compound represented by the general formula (L-2) is the following compound:

[Chem. 104]

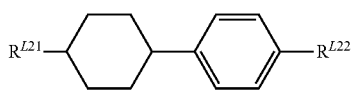

(L-2)

(in the formula, $R^{L21}$ and $R^{L22}$ each independently represent the same meaning as $R^{L1}$ and $R^{L2}$ in the general formula (L)).

$R^{L21}$ is preferably an alkyl group having 1 to 5 carbon atoms or an alkenyl group having 2 to 5 carbon atoms, and $R^{L22}$ is preferably an alkyl group having 1 to 5 carbon atoms, an alkenyl group having 4 or 5 carbon atoms, or an alkoxy group having 1 to 4 carbon atoms.

The compounds represented by the general formula (L-1) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

When the solubility at low temperature is emphasized, a higher content causes a high effect. In contrast, when the response speed is emphasized, a lower content causes a high effect. Furthermore, in order to improve dripping marks and image-sticking characteristics, the content range is preferably set to medium.

The lower limit of the content of the compound represented by the formula (L-2) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

Furthermore, the compound represented by the general formula (L-2) is preferably a compound selected from the group consisting of compounds represented by formulae (L-2.1) to (L-2.6) and is preferably a compound represented by the formula (L-2.1), (L-2.3), (L-2.4), or (L-2.6).

[Chem. 105]

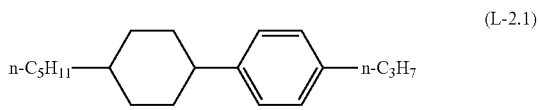

(L-2.1)

(L-2.2)

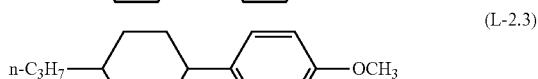

(L-2.3)

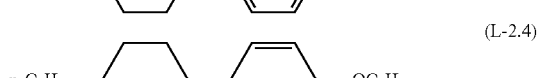

(L-2.4)

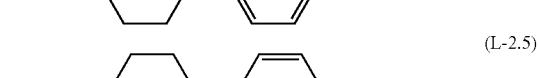

(L-2.5)

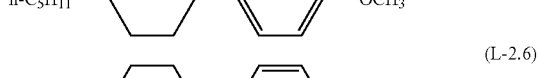

(L-2.6)

The compound represented by the general formula (L-3) is the following compound:

[Chem. 106]

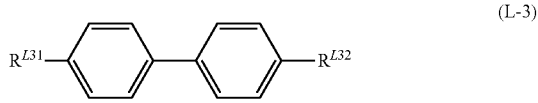

(L-3)

(in the formula, $R^{L31}$ and $R^{L32}$ each independently represent the same meaning as $R^{L1}$ and $R^{L2}$ in the general formula (L)).

$R^{L31}$ and $R^{L32}$ are preferably each independently an alkyl group having 1 to 5 carbon atoms, an alkenyl group having 4 or 5 carbon atoms, or an alkoxy group having 1 to 4 carbon atoms.

The compounds represented by the general formula (L-3) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

The lower limit of the content of the compound represented by the formula (L-3) with respect to the total amount of the nonpolymerizable liquid crystal compounds contained in the liquid crystal composition for a light-scattering liquid crystal device according to the present invention is preferably 0 mass %, and the upper limit is preferably 50 mass %. More preferably, the lower limit of the content is 1 mass %, and the upper limit is 35 mass %.

In order to obtain a high birefringence, a higher content causes a high effect. In contrast, when a high $T_{NI}$ is emphasized, a lower content causes a high effect. Furthermore, in order to improve dripping marks and image-sticking characteristics, the content range is preferably set to medium.

Furthermore, the compound represented by the general formula (L-3) is preferably a compound selected from the group consisting of compounds represented by formulae (L-3.1) to (L-3.7) and is preferably a compound represented by any of the formulae (L-3.1) to (L-3.4).

[Chem. 107]

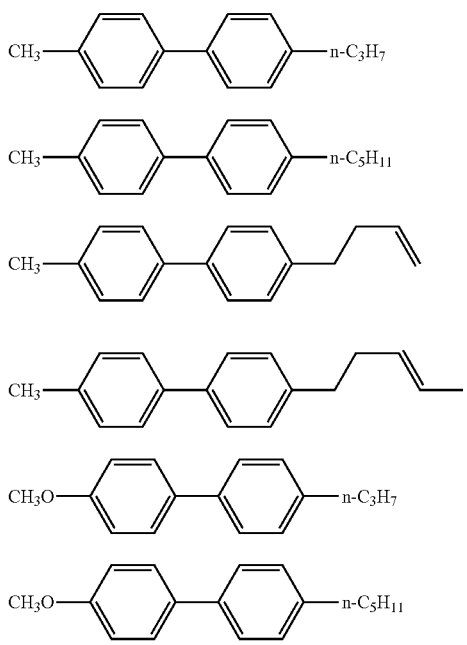

The compounds represented by the general formula (L-4) is the following compound:

[Chem. 108]

(L-4)

(in the formula, $R^{L41}$ and $R^{L42}$ each independently represent the same meaning as $R^{L1}$ and $R^{L2}$ in the general formula (L)).

$R^{L41}$ is preferably an alkyl group having 1 to 5 carbon atoms or an alkenyl group having 2 to 5 carbon atoms, and $R^{42}$ is preferably an alkyl group having 1 to 5 carbon atoms, an alkenyl group having 4 or 5 carbon atoms, or an alkoxy group having 1 to 4 carbon atoms.)

The compounds represented by the general formula (L-4) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

In the composition, it is necessary to appropriately adjust the content of the compound represented by the general formula (L-4) according to the required performance such as solubility at low temperature, transition temperature, electrical reliability, birefringence, process adaptability, dripping mark, image-sticking, and dielectric anisotropy.

The lower limit of the content of the compound represented by the formula (L-4) with respect to the total amount of the nonpolymerizable liquid crystal compounds contained in the liquid crystal composition for a light-scattering liquid crystal device according to the present invention is preferably 0 mass %, and the upper limit is preferably 35 mass %. More preferably, the lower limit of the content is 1 mass %, and the upper limit is 25 mass %.

The compound represented by the general formula (L-4) is preferably, for example, a compound represented by any of formulae (L-4.1) to (L-4.3).

[Chem. 109]

(L-4.1)

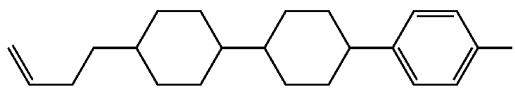

(L-4.2)

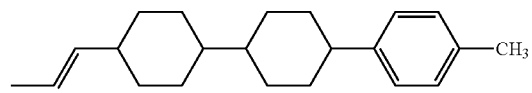

(L-4.3)

The composition may contain a compound represented by the formula (L-4.1), may contain a compound represented by the formula (L-4.2), may contain both a compound represented by the formula (L-4.1) and a compound represented by the formula (L-4.2), or may contain all compounds represented by the formulae (L-4.1) to (L-4.3) according to the required performance such as solubility at low temperature, transition temperature, electrical reliability, and birefringence.

The compound represented by the general formula (L-4) is preferably, for example, a compound represented by any of formulae (L-4.4) to (L-4.6) and is preferably a compound represented by a formula (L-4.4).

[Chem. 110]

(L-4.4)

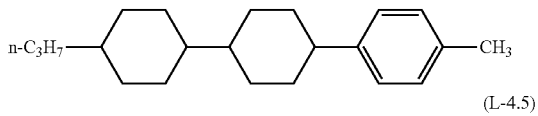
(L-4.5)

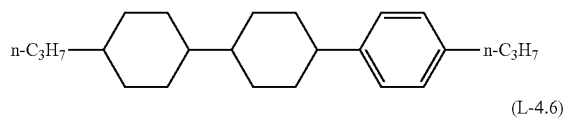
(L-4.6)

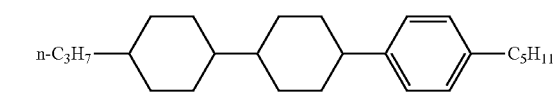

The composition may contain a compound represented by the formula (L-4.4), may contain a compound represented by the formula (L-4.5), or may contain both a compound represented by the formula (L-4.4) and a compound represented by the formula (L-4.5) according to the required performance such as solubility at low temperature, transition temperature, electrical reliability, and birefringence.

The compound represented by the general formula (L-4) is preferably a compound represented by any of formulae (L-4.7) to (L-4.10) and, in particular, preferably a compound represented by formula (L-4.9).

[Chem. 111]

(L-4.7)

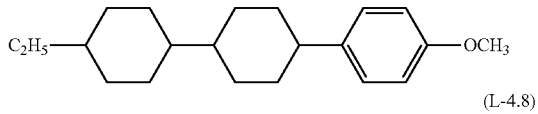
(L-4.8)

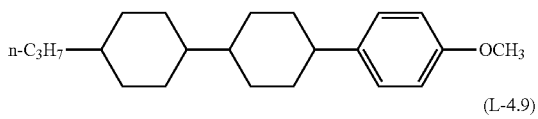
(L-4.9)

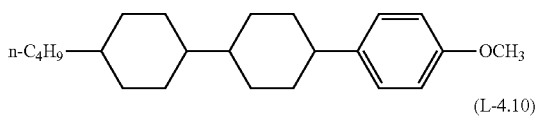
(L-4.10)

The compound represented by the general formula (L-5) is the following compound:

[Chem. 112]

(L-5)

(in the formula, $R^{L51}$ and $R^{L52}$ each independently represent the same meaning as $R^{L1}$ and $R^{L2}$ in the general formula (L)).

$R^{L51}$ is preferably an alkyl group having 1 to 5 carbon atoms or an alkenyl group having 2 to 5 carbon atoms, and $R^{L52}$ is preferably an alkyl group having 1 to 5 carbon atoms, an alkenyl group having 4 or 5 carbon atoms, or an alkoxy group having 1 to 4 carbon atoms.

The compounds represented by the general formula (L-5) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

In the composition, it is necessary to appropriately adjust the content of the compound represented by the general formula (L-5) according to the required performance such as solubility at low temperature, transition temperature, electrical reliability, birefringence, process adaptability, dripping mark, image-sticking, and dielectric anisotropy.

The lower limit of the content of the compound represented by the formula (L-5) with respect to the total amount of the nonpolymerizable liquid crystal compounds contained in the liquid crystal composition for a light-scattering liquid crystal device according to the present invention is preferably 0 mass %, and the upper limit is preferably 50 mass %. More preferably, the lower limit of the content is 1 mass %, and the upper limit is 35 mass %.

The compound represented by the general formula (L-5) is preferably a compound represented by a formula (L-5.1) or (L-5.2) and is, in particular, preferably a compound represented by a formula (L-5.1).

The lower limit of the content of these compounds with respect to the total amount of the nonpolymerizable liquid crystal compounds contained in the liquid crystal composition for a light-scattering liquid crystal device according to the present invention is preferably 0 mass %, and the upper limit is preferably 20 mass %. More preferably, the lower limit of the content is 0 mass %, and the upper limit is 13 mass %.

[Chem. 113]

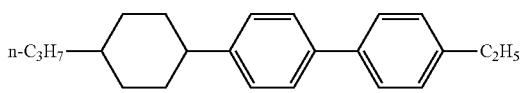
(L-5.1)

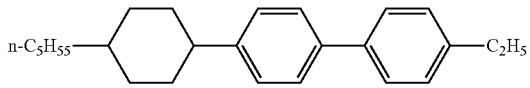
(L-5.2)

The compound represented by the general formula (L-5) is preferably a compound represented by a formula (L-5.3) or (L-5.4).

The lower limit of the content of these compounds with respect to the total amount of the nonpolymerizable liquid crystal compounds contained in the liquid crystal composition for a light-scattering liquid crystal device according to the present invention is preferably 0 mass %, and the upper limit is preferably 50 mass %. More preferably, the lower limit of the content is 1 mass %, and the upper limit is 35 mass %.

[Chem. 114]

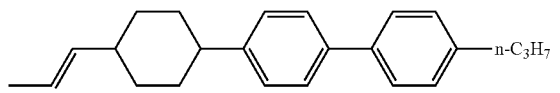
(L-5.3)

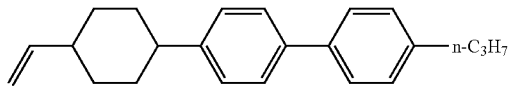
(L-5.4)

The compound represented by the general formula (L-5) is preferably a compound selected from the group consisting of compounds represented by formulae (L-5.5) to (L-5.7) and is, in particular, preferably a compound represented by a formula (L-5.7).

The lower limit of the content of these compounds with respect to the total amount of the nonpolymerizable liquid crystal compounds contained in the liquid crystal composition for a light-scattering liquid crystal device according to the present invention is preferably 0 mass %, and the upper limit is preferably 20 mass %. More preferably, the lower limit of the content is 0 mass %, and the upper limit is 13 mass %.

[Chem. 115]

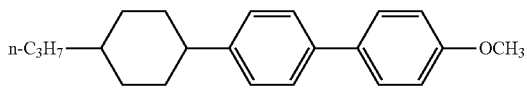
(L-5.5)

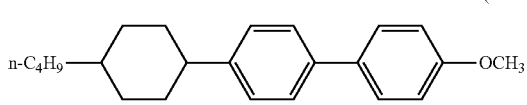
(L-5.6)

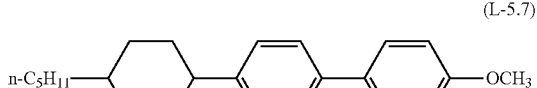
(L-5.7)

The compound represented by the general formula (L-6) is the following compound:

[Chem. 116]

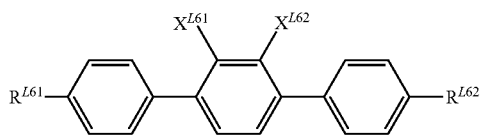
(L-6)

(in the formula, $R^{LE1}$ and $R^{L62}$ each independently represent the same meaning as $R^{L1}$ and $R^{L2}$ in the general formula (L), and $X^{L61}$ and $X^{L62}$ each independently represent a hydrogen atom or a fluorine atom).

$R^{L61}$ and $R^{L62}$ are each independently an alkyl group having 1 to 5 carbon atoms or an alkenyl group having 2 to 5 carbon atoms; and one of $X^{L61}$ and $X^{LE2}$ is preferably a fluorine atom, and the other is preferably a hydrogen atom.

The compounds represented by the general formula (L-6) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

The lower limit of the content of the compound represented by the formula (L-6) with respect to the total amount of the nonpolymerizable liquid crystal compounds contained in the liquid crystal composition for a light-scattering liquid crystal device according to the present invention is preferably 0 mass %, and the upper limit is preferably 35 mass %. More preferably, the lower limit of the content is 0 mass %, and the upper limit is 25 mass %. When an increase in the Δn is emphasized, a higher content is preferable; and when precipitation at low temperature is emphasized, a lower content is preferable.

The compound represented by the general formula (L-6) is preferably a compound represented by any of formulae (L-6.1) to (L-6.9).

[Chem. 117]

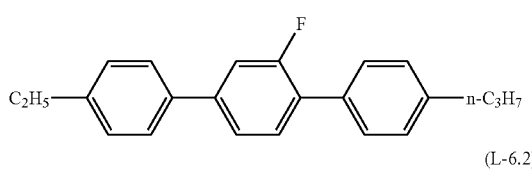
(L-6.1)

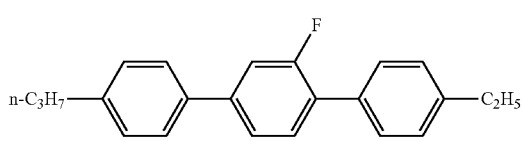
(L-6.2)

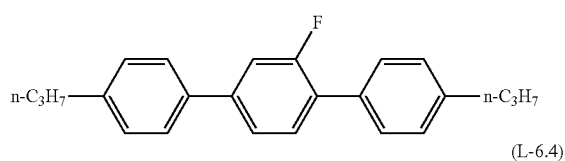
(L-6.3)

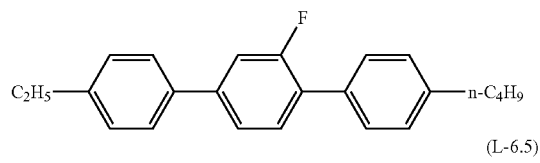
(L-6.4)

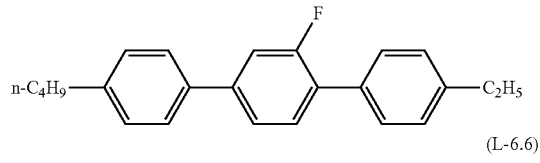
(L-6.5)

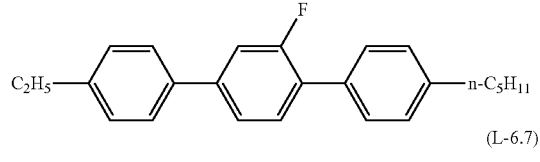
(L-6.6)

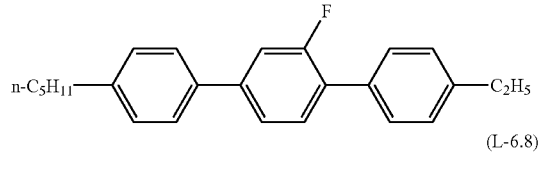
(L-6.7)

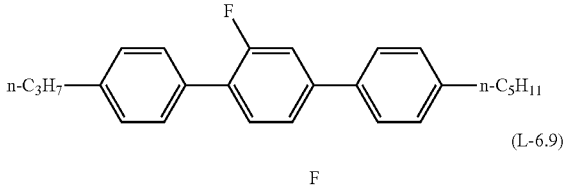
(L-6.8)

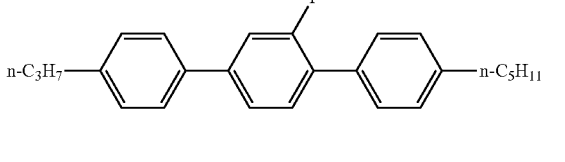
(L-6.9)

Although the type of the compound that can be used in combination is not particularly limited, it is preferable to contain one to three of these compounds and more preferably to contain one to four of these compounds. In addition, since a broad molecular weight distribution of the selected compounds is effective for solubility, it is preferable, for example, to select one compound represented by the formula (L-6.1) or (L-6.2), one compound represented by the formula (L-6.4) or (L-6.5), one compound represented by the formula (L-6.6) or (L-6.7), and one compound represented by the formula (L-6.8) or (L-6.9) and appropriately combine them. In particular, it is preferable to contain compounds represented by the formulae (L-6.1), (L-6.3), (L-6.4), (L-6.6), and (L-6.9).

Furthermore, the compound represented by the general formula (L-6) is preferably a compound represented by, for example, any of formulae (L-6.10) to (L-6.17) and, in particular, preferably a compound represented by a formula (L-6.11).

[Chem. 118]

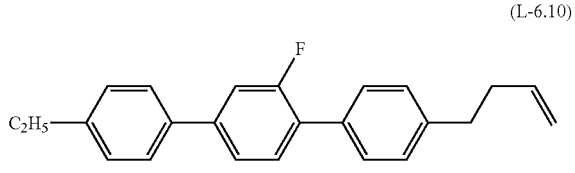
(L-6.10)

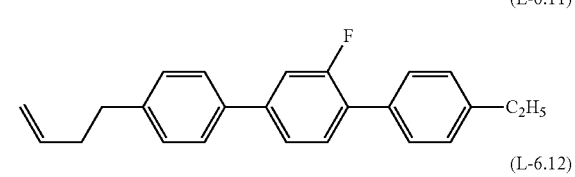
(L-6.11)

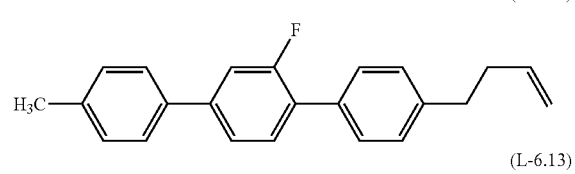
(L-6.12)

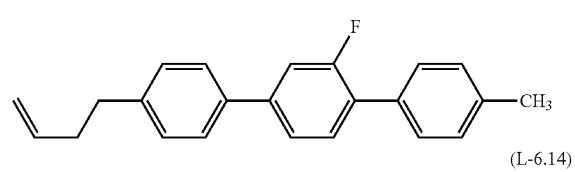
(L-6.13)

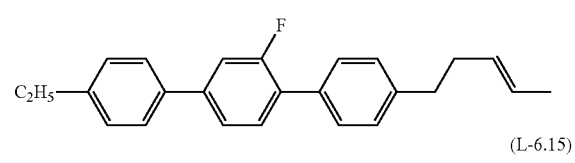
(L-6.14)

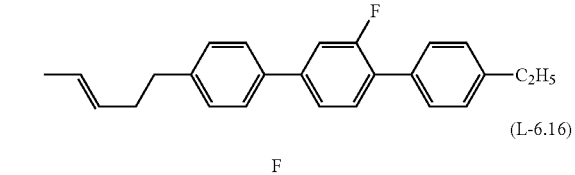
(L-6.15)

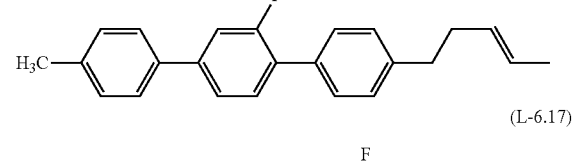
(L-6.16)

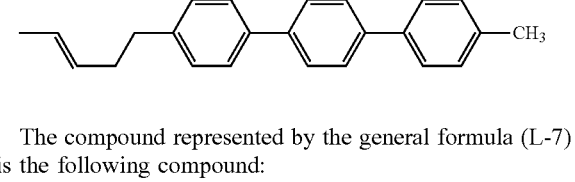
(L-6.17)

The compound represented by the general formula (L-7) is the following compound:

[Chem. 119]

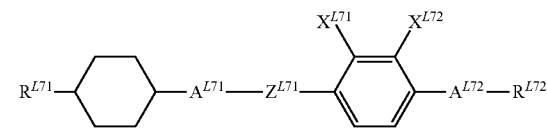
(L-7)

(in the formula, $R^{L71}$ and $R^{L72}$ each independently represent the same meaning as $R^{L1}$ and $R^{L2}$ in the general formula (L); $A^{L71}$ and $A^{L72}$ each independently represent the same meaning as $A^{L2}$ and $A^{L3}$ in the general formula (L), and hydrogen atoms on $A^{L71}$ and $A^{L72}$ may be each independently substituted by a fluorine atom; $Z^{L71}$ represents the same meaning as $Z^{L72}$ in the general formula (L); and $X^{L71}$ and $X^{L72}$ each independently represent a fluorine atom or a hydrogen atom).

In the formula, $R^{L71}$ and $R^{L72}$ are preferably each independently an alkyl group having 1 to 5 carbon atoms, an alkenyl group having 2 to 5 carbon atoms, or an alkoxy group having 1 to 4 carbon atoms; $A^{L71}$ and $A^{L72}$ are preferably each independently a 1,4-cyclohexylene group or a 1,4-phenylene group, and hydrogen atoms on $A^{L71}$ and $A^{L72}$ may be each independently substituted by a fluorine atom; $Z^{L71}$ is preferably a single bond or COO— and is preferably a single bond; and $X^{L71}$ and $X^{L72}$ are preferably hydrogen atoms.

Although the type of the compound that can be used in combination is not particularly limited, compounds are combined according to the required performance such as solubility at low temperature, transition temperature, electrical reliability, and birefringence. The number of types of the compound to be used is, for example, one as an embodiment of the present invention and is two, three, or four.

In the composition, it is necessary to appropriately adjust the content of the compound represented by the general formula (L-7) according to the required performance such as solubility at low temperature, transition temperature, electrical reliability, birefringence, process adaptability, dripping mark, image-sticking, and dielectric anisotropy.

The lower limit of the content of the compound represented by the formula (L-7) with respect to the total amount of the nonpolymerizable liquid crystal compounds contained in the liquid crystal composition for a light-scattering liquid crystal device according to the present invention is preferably 0 mass %, and the upper limit is preferably 25 mass %. More preferably, the lower limit of the content is 0 mass %, and the upper limit is 15 mass %.

When an embodiment of the composition having a high $T_{NI}$ is desired, a higher content of the compound represented by the formula (L-7) is preferable; and when an embodiment of a low viscosity is desired, a lower content is preferable.

Furthermore, the compound represented by the general formula (L-7) is preferably a compound represented by any of formulae (L-7.1) to (L-7.4) and is preferably a compound represented by a formula (L-7.2).

[Chem. 120]

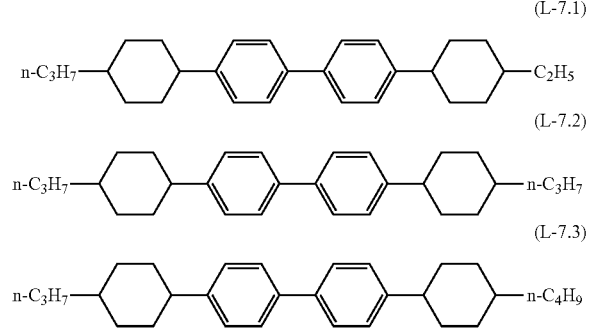

Furthermore, the compound represented by the general formula (L-7) is preferably a compound represented by any of formulae (L-7.11) to (L-7.13) and is preferably a compound represented by a formula (L-7.11).

[Chem. 121]

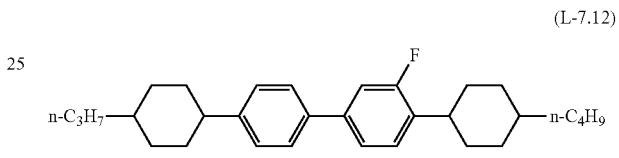

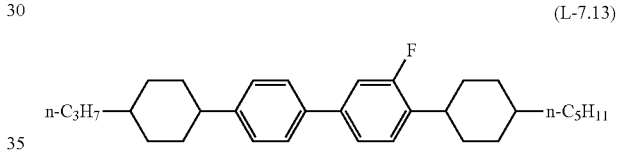

Furthermore, the compound represented by the general formula (L-7) is a compound represented by any of formulae (L-7.21) to (L-7.23) and is preferably a compound represented by a formula (L-7.21).

[Chem. 122]

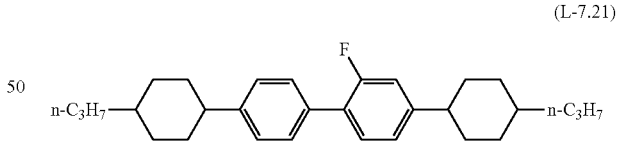

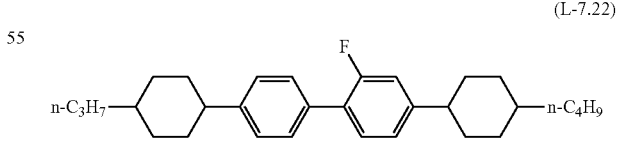

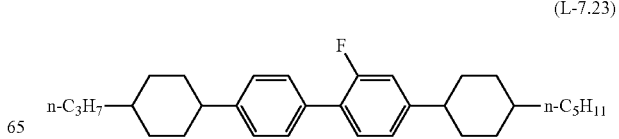

Furthermore, the compound represented by the general formula (L-7) is preferably a compound represented by any of formulae (L-7.31) to (L-7.34) and is preferably a compound represented by a formula (L-7.31) and/or a formula (L-7.32).

of formulae (L-7.41) to (L-7.44) and is preferably a compound represented by a formula (L-7.41) and/or a formula (L-7.42).

[Chem. 123]

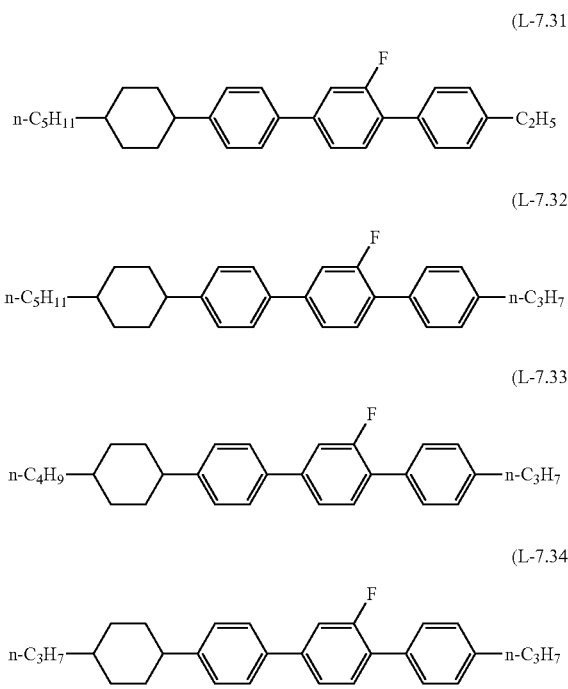

[Chem. 124]

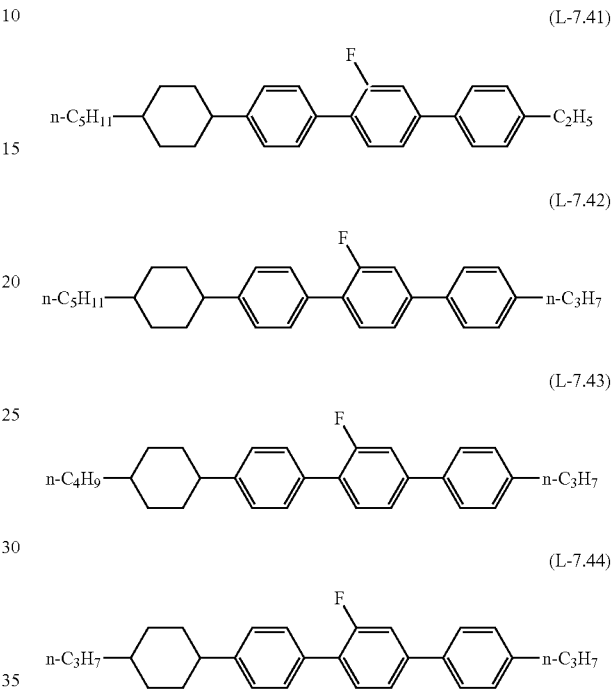

Furthermore, the compound represented by the general formula (L-7) is preferably a compound represented by any of formulae (L-7.51) to (L-7.53).

[Chem. 125]

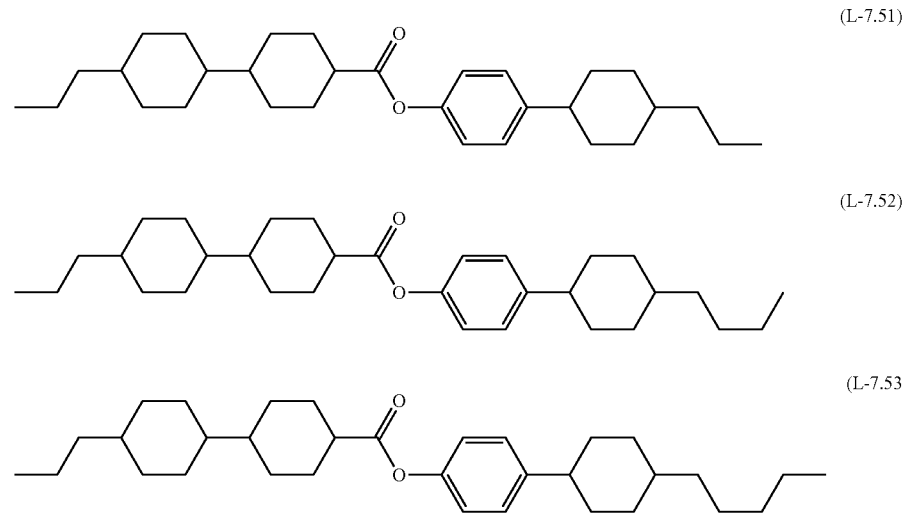

The compound represented by the general formula (L-8) is the following compound:

[Chem. 126]

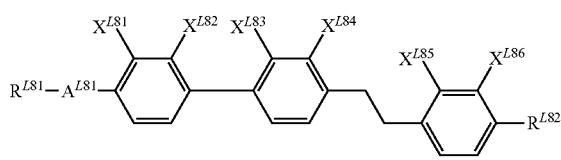

(L-8)

(in the formula, $R^{L81}$ and $R^{L82}$ each independently represent the same meaning as $R^{L1}$ and $R^{L2}$ in the general formula (L); $A^{L81}$ represents the same meaning as $A^{L1}$ in the general formula (L) or a single bond, and hydrogen atoms on $A^{L81}$ may be each independently substituted by a fluorine atom; and $X^{L81}$ to $X^{L8E}$ each independently represent a fluorine atom or a hydrogen atom).

In the formula, $R^{L81}$ and $R^{L82}$ are each independently an alkyl group having 1 to 5 carbon atoms, an alkenyl group having 2 to 5 carbon atoms, or an alkoxy group having 1 to 4 carbon atoms; $A^{L81}$ is preferably a 1,4-cyclohexylene group or a 1,4-phenylene group, and hydrogen atoms on $A^{L71}$ and $A^{L72}$ may be each independently substituted by a fluorine atom; the number of the fluorine atom on the same ring structure in the general formula (L-8) is preferably zero or one; and the number of the fluorine atom in the molecule is preferably zero or one.

Although the type of the compound that can be used in combination is not particularly limited, compounds are combined according to the required performance such as solubility at low temperature, transition temperature, electrical reliability, and birefringence. The number of types of the compound to be used is, for example, one as an embodiment of the present invention and is two, three, or four.

In the composition, it is necessary to appropriately adjust the content of the compound represented by the general formula (L-8) according to the required performance such as solubility at low temperature, transition temperature, electrical reliability, birefringence, process adaptability, dripping mark, image-sticking, and dielectric anisotropy.

The lower limit of the content of the compound represented by the formula (L-8) with respect to the total amount of the nonpolymerizable liquid crystal compounds contained in the liquid crystal composition for a light-scattering liquid crystal device according to the present invention is preferably 0 mass %, and the upper limit is preferably 30 mass %. More preferably, the lower limit of the content is 0 mass %, and the upper limit is 20 mass %.

When an embodiment of the composition having a high $T_{NI}$ is desired, a higher content of the compound represented by the formula (L-8) is preferable; and when an embodiment of a low viscosity is desired, a lower content is preferable.

Furthermore, the compound represented by the general formula (L-8) is preferably a compound represented by any of formulae (L-8.1) to (L-8.4) and is more preferably a compound represented by any of formulae (L-8.3), (L-8.5), (L-8.6), (L-8.13), (L-8.16) to (L-8.18), and (L-8.23) to (L-8.28).

[Chem. 127]

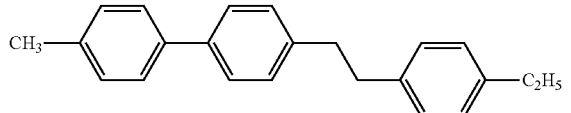

(L-8.1)

(L-8.2)

(L-8.3)

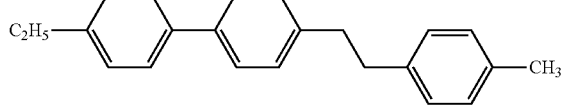

(L-8.4)

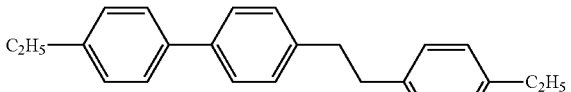

(L-8.5)

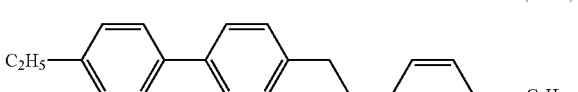

(L-8.6)

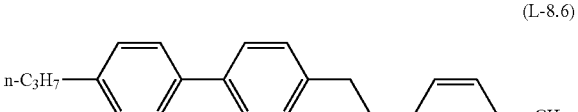

(L-8.7)

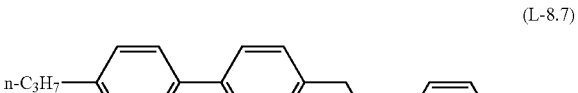

(L-8.8)

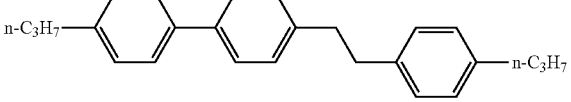

[Chem. 128]

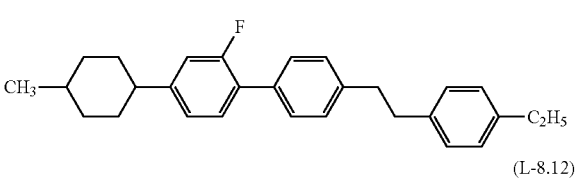

(L-8.11)

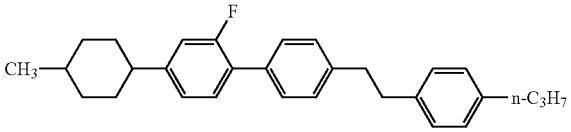

(L-8.12)

-continued (L-8.13)
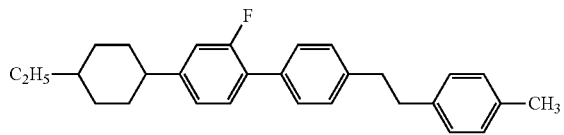

(L-8.14)
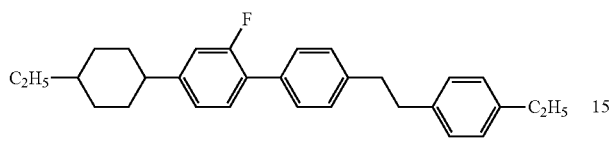

(L-8.15)
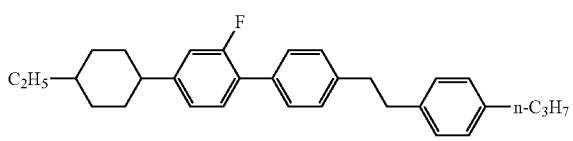

(L-8.16)
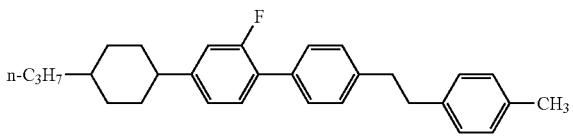

(L-8.17)
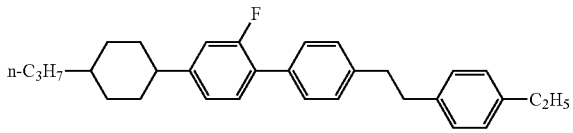

(L-8.18)
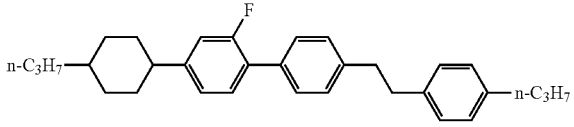

[Chem. 129]

(L-8.21)
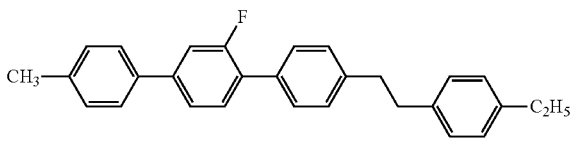

(L-8.22)
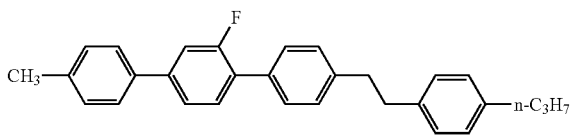

(L-8.23)
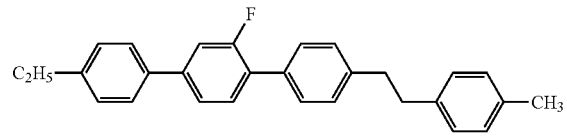

-continued (L-8.24)
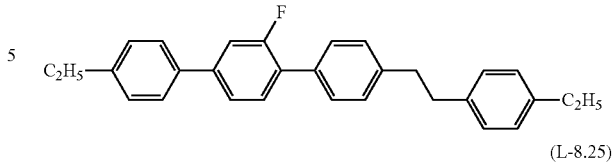

(L-8.25)
(L-8.26)
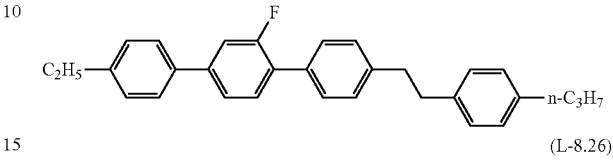

(L-8.27)
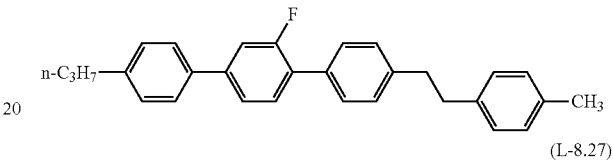

(L-8.28)
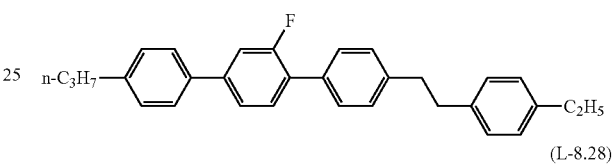

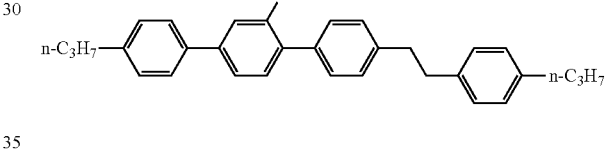

The compound represented by the general formula (L-9) is the following compound:

[Chem. 130]

(L-9)
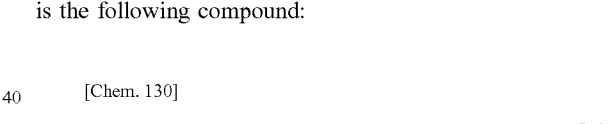

(in the formula, $R^{L91}$ and $R^{L92}$ each independently represent the same meaning as $R^{L1}$ and $R^{L2}$ in the general formula (L)).

$R^{L91}$ and $R^{L92}$ are preferably each independently an alkyl group having 1 to 5 carbon atoms, an alkenyl group having 4 or 5 carbon atoms, or an alkoxy group having 1 to 4 carbon atoms.

The compounds represented by the general formula (L-9) can be used alone, and a combination of two or more of the compounds can also be used. Although the type of the compound that can be used in combination is not particularly limited, an arbitrary combination is used according to the required performance, such as solubility at low temperature, transition temperature, electrical reliability, and birefringence. The number of types of the compound to be used is, for example, one as an embodiment of the present invention and is two, three, four, or five or more.

The lower limit of the content of the compound represented by the formula (L-9) with respect to the total amount of the nonpolymerizable liquid crystal compounds contained in the liquid crystal composition for a light-scattering liquid crystal device according to the present invention is preferably 0 mass %, and the upper limit is preferably 90 mass %. More preferably, the lower limit of the content is 0 mass %, and the upper limit is 75 mass %.

In order to obtain a high birefringence, a higher content causes a high effect. In contrast, when a high $T_{NI}$ is emphasized, a lower content causes a high effect. Furthermore, in order to improve dripping marks and image-sticking characteristics, the content range is preferably set to medium.

Furthermore, the compound represented by the general formula (L-9) is preferably a compound selected from the group consisting of compounds represented by formulae (L-9.1) to (L-9.4).

[Chem. 131]

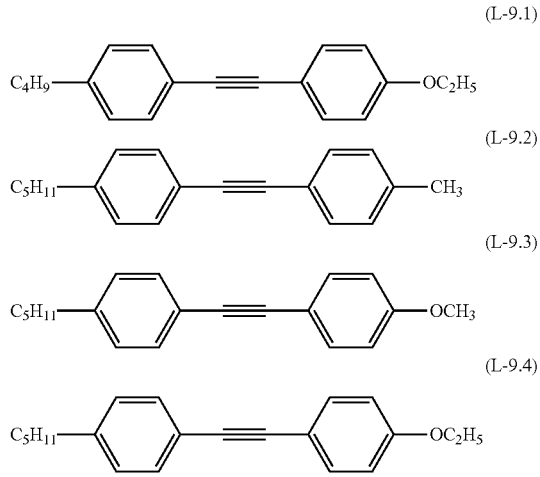

The lower limit of the total content of the compounds represented by the general formula (N) and the general formula (L) with respect to the total amount of the nonpolymerizable liquid crystal compounds contained in the liquid crystal composition for a light-scattering liquid crystal device according to the present invention is preferably 80 mass %, and the upper limit is preferably 100 mass %. More preferably, the lower limit of the content is 90 mass %, and the upper limit is 100 mass %.

The lower limit of the total content of the compounds represented by the general formulae (N-1-1) to (N-1-18) and the general formulae (L-1) to (L-9) with respect to the total amount of the nonpolymerizable liquid crystal compounds contained in the liquid crystal composition for a light-scattering liquid crystal device according to the present invention is preferably 80 mass %, and the upper limit is preferably 100 mass %. More preferably, the lower limit of the content is 95 mass %, and the upper limit is 100 mass %.

The liquid crystal composition for a light-scattering liquid crystal device according to the present invention preferably does not contain a compound having a structure in which oxygen atoms are bonded to each other, such as a peroxide (—CO—OO—) structure, in the molecule.

When the reliability and the long term stability of the composition are emphasized, the content of a compound having a carbonyl group with respect to the total mass of the composition is preferably 5 mass % or less, more preferably 3 mass % or less, and further preferably 1 mass % or less, and most preferably, the compound is not substantially contained.

When the stability by UV irradiation is emphasized, the content of a compound substituted by a chlorine atom with respect to the total mass of the composition is preferably 15 mass % or less, preferably 10 mass % or less, preferably 8 mass % or less, more preferably 5 mass % or less, and preferably 3 mass % or less, and further preferably, the compound is not substantially contained.

The content of a compound of which the ring structures in the molecule are all 6-membered rings is preferably high, and the content of the compound of which the ring structures in the molecule are all 6-membered rings with respect to the total mass of the composition is preferably 80 mass % or more, more preferably 90 mass % or more, and further preferably 95 mass % or more, and most preferably, the composition is substantially constituted of only compounds of which the ring structures in each molecule are all 6-membered rings.

In order prevent deterioration of the composition by oxidation, the content of a compound having a cyclohexenylene group as a ring structure is preferably low, and the content of the compound having a cyclohexenylene group with respect to the total mass of the composition is preferably 10 mass % or less, preferably 8 mass % or less, more preferably 5 mass % or less, and preferably 3 mass % or less, and further preferably, the compound is not substantially contained.

When improvement of the viscosity and improvement of the $T_{NI}$ are emphasized, the content of a compound having a methylbenzene-1,4-diyl group of which a hydrogen atom may be substituted by halogen in the molecule is preferably low, and the content of the compound having a 2-methylbenzene-1,4-diyl group in the molecule with respect to the total mass of the composition is preferably 10% or less, preferably 8% or less, more preferably 5% or less, and preferably 3% or less, and further preferably, the compound is not substantially contained.

In the present application, "not substantially contained" means that substances except for unintentionally contained substances are not contained.

When the liquid crystal compound contained in the liquid crystal composition for a light-scattering liquid crystal device according to the present invention includes an alkenyl group as a side chain, the alkenyl group bonding to cyclohexane preferably has 2 to 5 carbon atoms, and the alkenyl group bonding to benzene preferably has 4 or 5 carbon atoms, where an unsaturated bond of the alkenyl group preferably does not directly bond to benzene.

The average elastic constant ($K_{AVG}$) of the liquid crystal composition for a light-scattering liquid crystal device according to the present invention is preferably 10 to 25, and the lower limit thereof is preferably 10, preferably 10.5, preferably 11, preferably 11.5, preferably 12, preferably 12.3, preferably 12.5, preferably 12.8, preferably 13, preferably 13.3, preferably 13.5, preferably 13.8, preferably 14, preferably 14.3, preferably 14.5, preferably 14.8, preferably 15, preferably 15.3, preferably 15.5, preferably 15.8, preferably 16, preferably 16.3, preferably 16.5, preferably 16.8, preferably 17, preferably 17.3, preferably 17.5, preferably 17.8, and preferably 18, and the upper limit thereof is preferably 25, preferably 24.5, preferably 24, preferably 23.5, preferably 23, preferably 22.8, preferably 22.5, preferably 22.3, preferably 22, preferably 21.8, preferably 21.5, preferably 21.3, preferably 21, preferably 20.8, preferably 20.5, preferably 20.3, preferably 20, preferably 19.8, preferably 19.5, preferably 19.3, preferably 19, preferably 18.8, preferably 18.5, preferably 18.3, preferably 18, preferably 17.8, preferably 17.5, preferably 17.3, and preferably 17.

When power consumption reduction is emphasized, it is effective to suppress the amount of light from the backlight, and it is preferable to improve the light transmittance of the liquid crystal display device. For that purpose, it is preferable to set the value of $K_{AVG}$ lower. When improvement of the response speed is emphasized, it is preferable to set the value of $K_{AVG}$ higher.

(Light-Scattering Liquid Crystal Device)

A light-scattering liquid crystal device using the liquid crystal composition for a light-scattering liquid crystal device of the present invention includes a phase-separated liquid crystal layer, a homeotropic alignment film, and an electrode.

The specific embodiment of the liquid crystal device of the present invention is not particularly limited as long as it includes the above-described elements. For example, the liquid crystal device may have a configuration in which a phase-separated liquid crystal layer is sandwiched in a hollow device constituted of two transparent substrates, of which at least one includes an electrode, and a homeotropic alignment film.

The light-scattering liquid crystal device of the present invention maintains the homeotropic alignment of the phase-separated liquid crystal layer in the non-powered state. Consequently, the device can be used as a device that can be driven in a so-called reverse mode. That is, the liquid crystal device is in a transparent state when no voltage is applied and is in a scattering state when a voltage is applied.

In the light-scattering liquid crystal device of the present invention, the alignment of liquid crystal molecules is controlled by not only a homeotropic alignment film but also a dense polymer network made of an aligning polymer. Accordingly, the liquid crystal device of the present invention is unlikely to cause alignment disorder due to external stress and has high stress resistance. Since the liquid crystal device of the present invention is unlikely to cause display failure even in an environment where bending stress is applied, the device can b bendable. Accordingly, the liquid crystal device of the present invention may have a curved surface.

(Homeotropic Alignment Film)

The homeotropic alignment film may be any homeotropic alignment film that has a function of inducing homeotropic alignment by directly abutting on a complex liquid crystal composition or a phase-separated liquid crystal layer. As such an alignment film, a known film may be used. Normally, a pair of the homeotropic alignment films are disposed so as to sandwich a liquid crystal phase. In a hollow device, normally, the homeotropic alignment films are respectively disposed on surfaces of a pair of substrates facing each other.

Examples of the alignment film include a polyimide alignment film and an optical alignment film. Examples of the method for forming an alignment film include, when the alignment film is a polyimide alignment film, a method in which a polyimide resin composition is applied onto a transparent base material and is thermally cured at a temperature of 180° C. or more and is further subjected to rubbing treatment with cotton cloth or rayon cloth. Alternatively, a polymer film, such as a polyimide film, not subjected to rubbing treatment, can also be used. In particular, in order to express vertical alignment, a polyimide alignment film exhibiting vertical alignment is preferably used without rubbing. Alternatively, an optical alignment film exhibiting vertical alignment is preferably used. Alternatively, a spontaneous vertical alignment monomer (self-alignment additive) allowing vertical alignment without using a polyimide alignment film exhibiting vertical alignment can also be used. A known monomer can be used as the spontaneous vertical alignment monomer.

(Electrode)

The electrode is disposed in the liquid crystal device of the present invention so as to cause an electric field that can control the alignment of the liquid crystal molecules in the phase-separated liquid crystal layer. The electric field intensity is controlled by the degree of the voltage applied to the electrode.

The shape of the electrode is not particularly limited, and the conduction portion may be a striped, meshed, or randomly meshed shape. The electrode is preferably of a so-called comb-shaped structure. In addition, when the device is used in, for example, a smart window, the electrode is preferably a uniform electrode generally called a solid electrode and may be provided with a pattern according to the purpose.

(Transparent Substrate)

As the material of the transparent substrate, for example, glass or plastic can be used. The transparent substrate is preferably flexible from the viewpoint of applying the liquid crystal device of the present invention to a flexible display.

(Example of Manufacturing of Liquid Crystal Device)

The light-scattering liquid crystal device of the present invention is preferably produced from a polymerizable liquid crystal device in which a liquid crystal composition for a light-scattering liquid crystal device is sandwiched by hollow devices from the viewpoint of productivity. In the polymerizable liquid crystal device, a liquid crystal compound and a polymerizable compound including a mesogen group in the complex liquid crystal composition are in a homeotropic alignment state by the alignment restricting force of the homeotropic alignment film. In this alignment state, the polymerizable compound in the complex liquid crystal composition is ultraviolet-cured by the above-described method to form a phase-separated liquid crystal layer from the complex liquid crystal composition. Consequently, a light-scattering liquid crystal device is obtained. In the method for irradiating ultraviolet, the lamp may be an apparatus that is usually used for ultraviolet polymerization, such as metal halide, high-pressure mercury, and UV-LED. The ultraviolet intensity in a sensor of 365 nm is preferably 1 to 100 mW/cm$^2$, more preferably 1 to 20 mW/cm$^2$, and further preferably 2 to 10 mW/cm$^2$. The ultraviolet irradiation energy is preferably 1 to 50 J/cm$^2$ and more preferably 2 to 20 J/cm$^2$. The temperature of ultraviolet irradiation is preferably 15° C. to 30° C.

The method for sandwiching a liquid crystal composition for a light-scattering liquid crystal device in a hollow device may be a usual method, and, for example, a vacuum injection method or an ODF method can be used. In the process of manufacturing a polymerizable liquid crystal device by the ODF method, a closed loop bank of a sealant, for example, an epoxy-based photothermal dual curing sealant, is drawn on the substrate of one of a back plane and a front plane of the hollow device with a dispenser, a predetermined amount of the complex liquid crystal composition is dropped in the bank under degassing, and the front plane and the back plane are then joined to each other. A polymerizable liquid crystal device can be thus manufactured. The liquid crystal composition for a light-scattering liquid crystal device to be used in the present invention has high phase stability and is unlikely to volatilize and therefore can be suitably used in the ODF process. In addition, when roll-to-roll production using a film substrate is performed, the polymerizable liquid crystal device may be produced by dropping a liquid crystal composition for a light-scattering liquid crystal device onto a substrate by a simple falling-drop method and attaching it to the opposite substrate. Alternatively, without a sealing structure, a method of sealing the entire film by lamination treatment in a post-process may be adopted.

Preferable embodiments of the liquid crystal device of the present invention will now be described using drawings, but the present invention is not limited thereto.

The light-scattering liquid crystal device of the present invention may be configured such that the alignment of the liquid crystal molecules can be controlled by applying a voltage and is preferably configured as a vertical electric field-type liquid crystal device. The vertical electric field-type liquid crystal device is a liquid crystal device in which the electrode is disposed so as to cause an electric field vertical to the homeotropic alignment film. In the vertical electric field-type liquid crystal device, usually, an electrode is provided to each of two transparent substrate sandwiching a phase-separated liquid crystal layer.

FIG. 1 is a diagram schematically illustrating the configuration of a vertical electric field-type liquid crystal device when no voltage is applied. A vertical electric field-type liquid crystal device according to the present invention will now be described with reference to FIG. 1.

The configuration of the polymer network vertical electric field-type liquid crystal device according to the present invention includes, as described in FIG. 1, a first substrate 11 and a second substrate 12 each provided with a transparent electrode (layer) 2 made of a transparent conductive material, and a phase-separated liquid crystal layer sandwiched between the first substrate 11 and the second substrate 12, and is a liquid crystal device in which the alignment of the liquid crystal molecules in the phase-separated liquid crystal layer when no voltage is applied is substantially vertical to a homeotropic alignment film 3. The phase-separated liquid crystal layer is constituted of liquid crystal molecules 4 contained in the liquid crystal composition and an aligning polymer 5. Incidentally, in FIG. 1, for convenience, the aligning polymer 5 is expressed by a large number of fixed polymerizable compound molecules. However, in actual, polymerizable compound molecules are complicatedly bound to each other to form a polymer network. Furthermore, a pair of homeotropic alignment films 3 are formed on the surfaces of the transparent electrodes (layers) 2, respectively, so as to be in direct contact with the phase-separated liquid crystal layer.

That is, the polymer network vertical electric field-type liquid crystal device according to the present invention has a configuration in which a first substrate 11, an electrode 2, a homeotropic alignment film 3, a composite layer formed by phase-separated liquid crystal molecules 4 and an aligning polymer 5, a homeotropic alignment film 3, an electrode 2, and a second substrate 12 are sequentially stacked.

Figure 2:
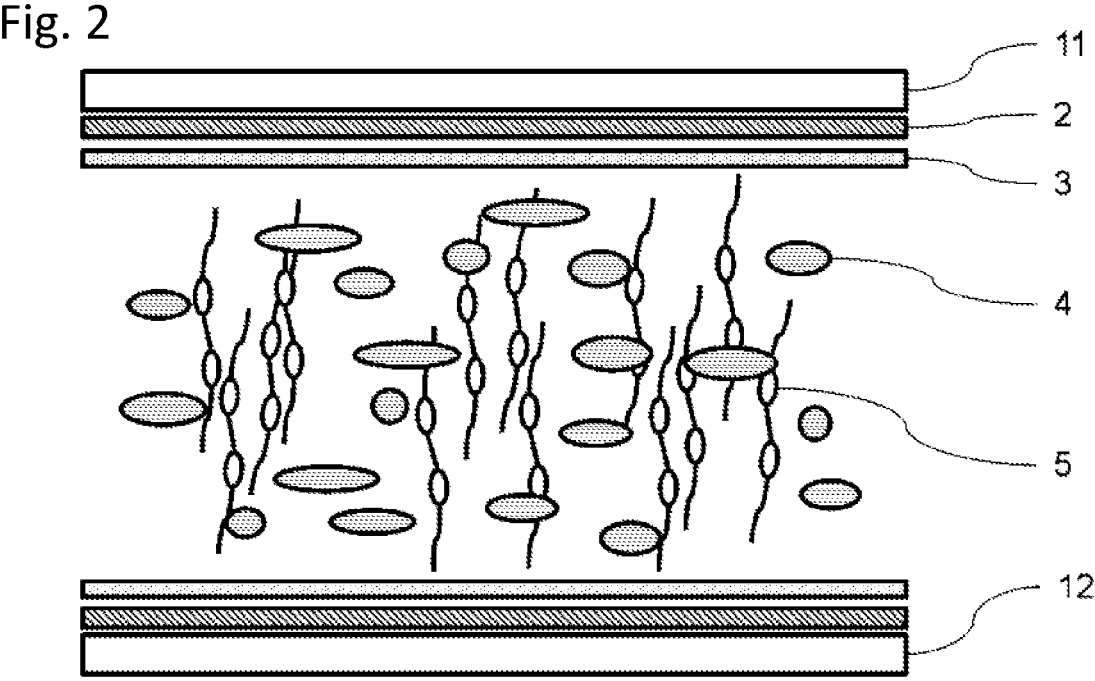
FIG. 2 is a diagram schematically illustrating the state of the device of FIG. 1 when a voltage is applied.

FIG. 2 is a diagram schematically illustrating the configuration of the vertical electric field-type device when a voltage is applied.

The vertical electric field-type liquid crystal device transits from the state shown in FIG. 1 to the state shown in FIG. 2 by applying a voltage to the electrodes. On this occasion, the liquid crystal molecules 4 are aligned in a direction parallel to the homeotropic alignment film by occurrence of a vertical electric field. In the vertical electric field-type liquid crystal device shown in FIG. 2, since the alignment directions of the liquid crystal molecules 4 and the aligning polymer 5 in the phase-separated liquid crystal layer are different from each other, light scattering occurs at the interface of the respective components, and the vertical electric field-type liquid crystal device becomes a light non-transmissive state.

Thus, since the light transmission state of the vertical electric field-type liquid crystal device of the present invention can be changed by the presence or absence of voltage application, the device can be utilized as a liquid crystal dimming device to be used by being incorporated in an apparatus requiring a dimming function or as a liquid crystal display device to be used in a display for displaying images. In particular, the vertical electric field-type liquid crystal device of the present invention can be driven in a reverse mode and is therefore especially suitable for applications requiring power saving and permeability in the event of a power outage or no power supply.

The above-described polymer network vertical electric field-type liquid crystal dimming device is preferably used in, for example, building materials, dimming glass, in-vehicle smart windows, or dimming units of OLED displays and is particularly useful as a smart window from the point of the high light-scattering properties and of capable of reducing the driving voltage.

The above-described vertical electric field-type liquid crystal display device can be used in the same applications as existing polymer dispersion-type liquid crystal display device and also can be preferably used in, particularly, transparent displays and flexible displays.

(Other Electric Field-Type)

The light-scattering liquid crystal device of the present invention may adopt a horizontal electric field-type or another electric field-type instead of the vertical electric field-type. Alternatively, a fringe electric field, which is adopted in an FFS driving mode, may be adopted.

EXAMPLES

The present invention will now be described in more detail with reference to Examples, but is not limited to these Examples. In addition, "%" for compositions in the following Examples and Comparative Examples means "mass %".

Details of each of the evaluation characteristics in each of Examples and Comparative Examples are as follows.

Toff(0): the light transmittance [%] in the cell substrate surface normal line direction when no voltage is applied (transparent state);
* This numerical value increases with an increase in transparency.
Toff(35): the light transmittance [%] in the direction of 35 degrees from the cell substrate surface normal line when no voltage is applied (transparent state);
* This numerical value increases with an increase in transparency, even from a diagonal direction.
ΔToff: the difference between the light transmittance in the cell substrate surface normal line direction and the light transmittance in the direction of 35 degrees from the cell substrate surface normal line when no voltage is applied (transparent state);
* This numerical value decreases with a decrease in the difference between the transparency in the diagonal direction and the transparency in the normal direction, and the transparency is uniform regardless of the viewing direction.
Ton(0): the saturated light transmittance [%] in the cell substrate surface normal line direction when a voltage is applied (scattering state);
V90: the applied voltage [V] to give 90% transmittance in the light transmittance change width;
V10: the applied voltage [V] to give 10% transmittance in the light transmittance change width;
Contrast: Toff(0)/Ton(0);
Haze: the proportion of diffused light transmittance to total light transmittance; * This numerical value decreases with an increase in the transparency.

The structures of polymerizable compounds (1-A) to (10-B) used in Examples and Comparative Examples are as the following formulae:

[Chem. 132]
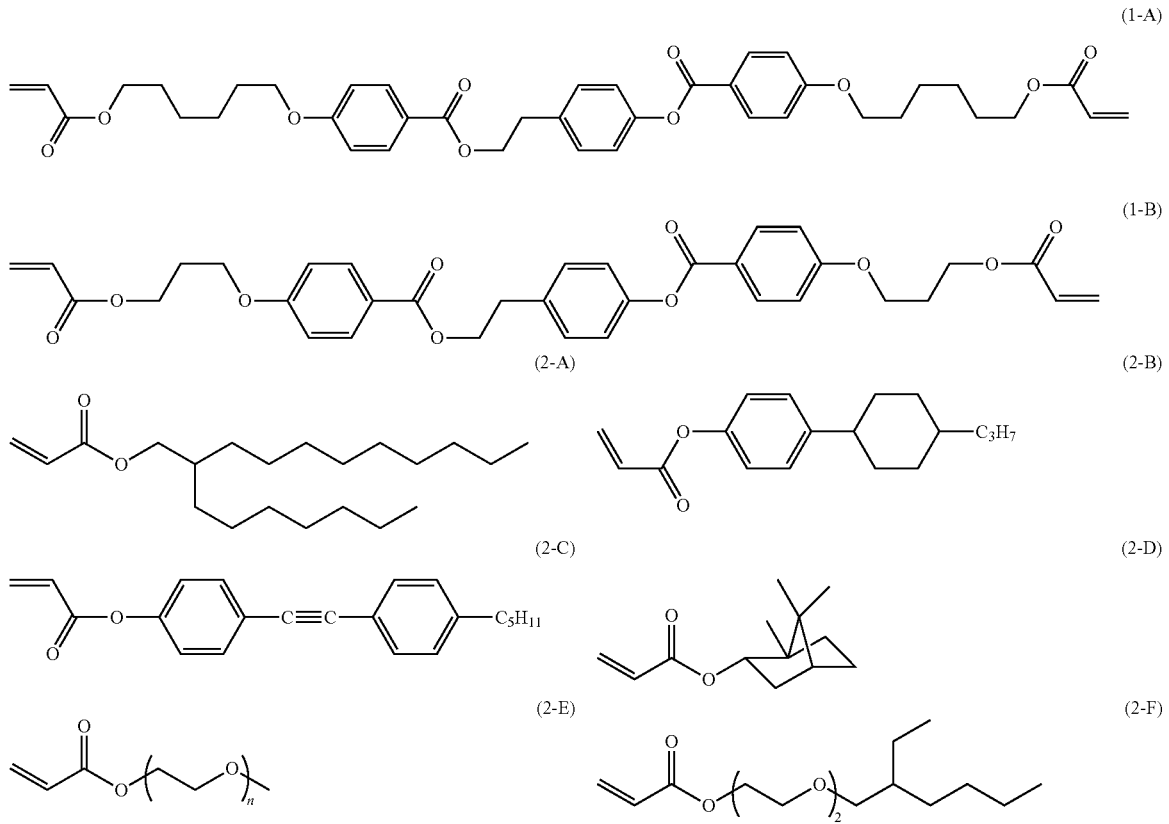
n in a polymerizable compound (2-E) represents n≈7 to 8.
[Chem. 133]
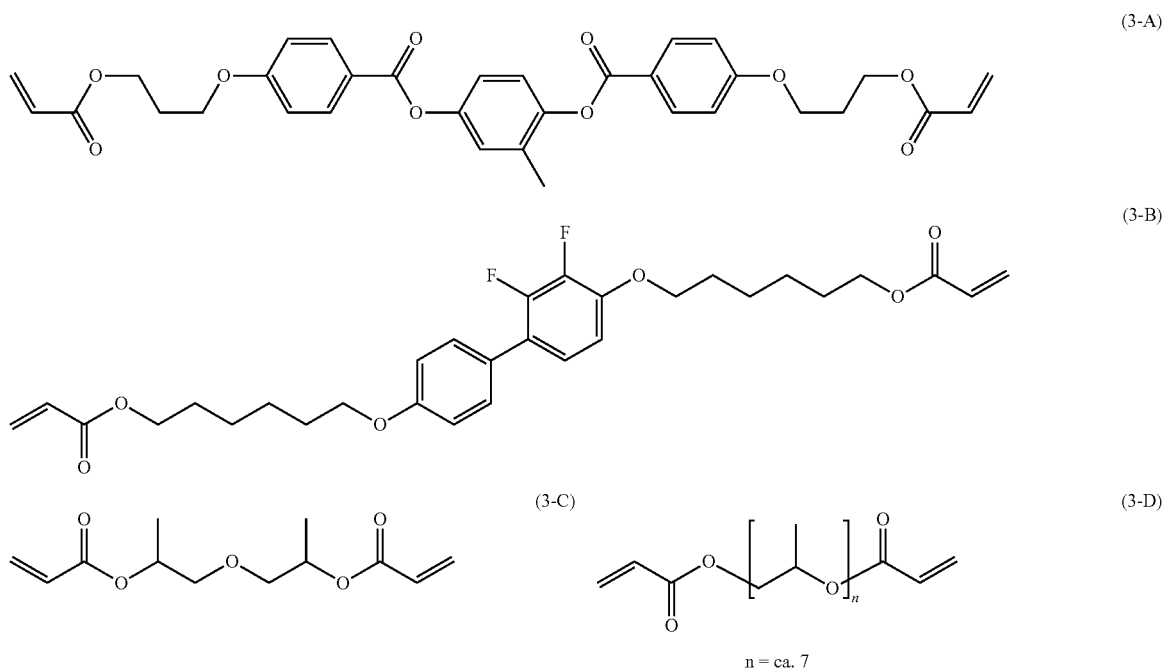

-continued (3-E)

n + m = ca. 7

[Chem. 134]

(3-F)

n = ca. 12

(3-G)

(3-H)

n = ca. 9

(3-I)

m + n = ca. 2

(3-J)

m + n = ca. 4

The liquid crystal compositions "L-1" to "L-7" showing a negative dielectric anisotropy used in Examples and Comparative Examples are as follows (mass %).

(Liquid Crystal Composition "L-1")

[Chem. 135]

$C_5H_{11}$—⟨⟩—⟨⟩—$CH_3$

20%

$C_3H_7$—⟨⟩—⟨⟩—⟨⟩—$C_2H_5$

8%

$C_3H_7$—⟨⟩—$CH_2O$—⟨⟩—$OCH_3$ (2,3-diF)

15%

-continued $C_3H_7$—⟨⟩—⟨⟩—$CH_2O$—⟨⟩—$OC_2H_5$ (2,3-diF)

7%

$C_2H_5$—⟨⟩—⟨⟩—⟨⟩—$OC_2H_5$ (2,3-diF)

10%

$C_3H_7$—⟨⟩—⟨⟩—⟨⟩—$OC_4H_9$ (2,3-diF)

10%

-continued
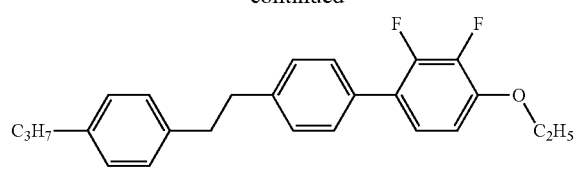
10%
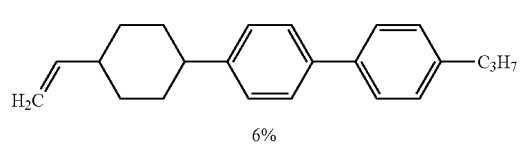
6%
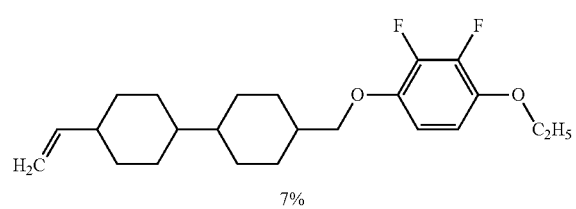
7%
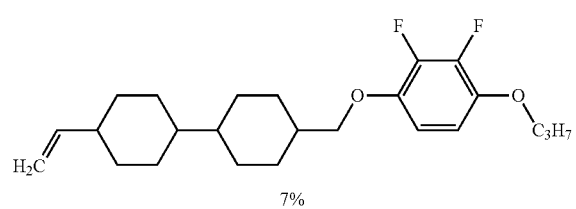
7%
(Liquid Crystal Composition "L-2")
[Chem. 136]
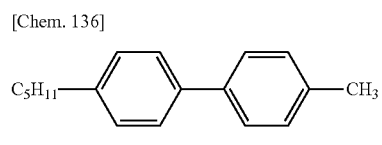
20%
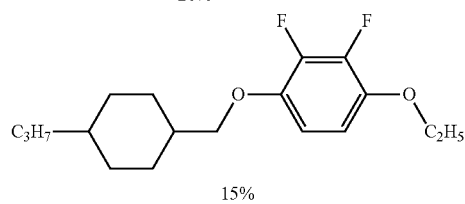
15%
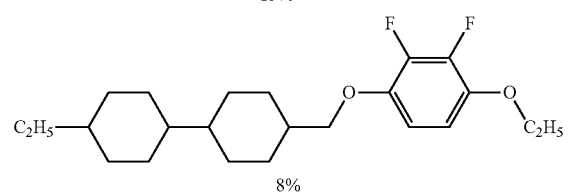
8%
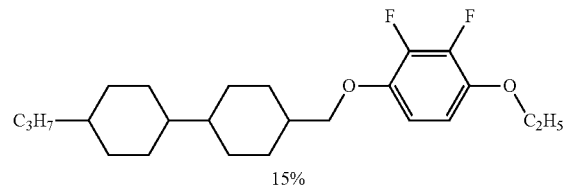
15%
-continued
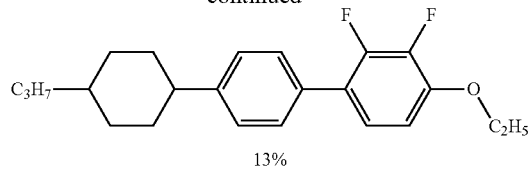
13%
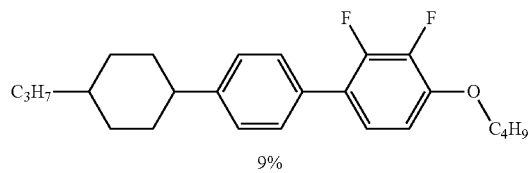
9%
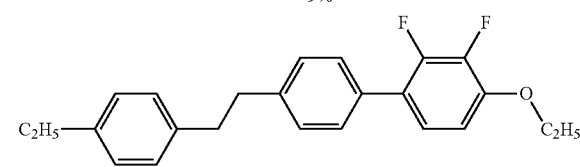
10%
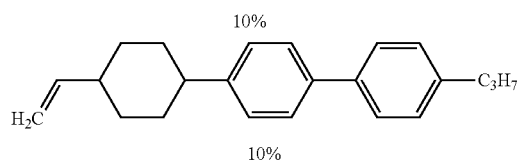
10%
(Liquid Crystal Composition "L-3")
[Chem. 137]
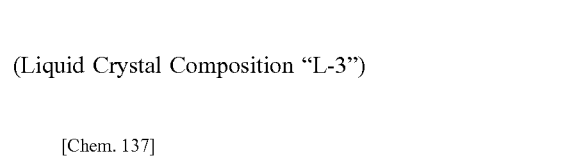
20%
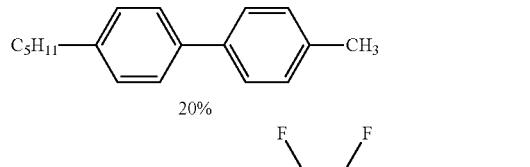
4%
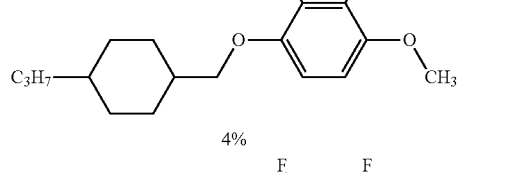
10%
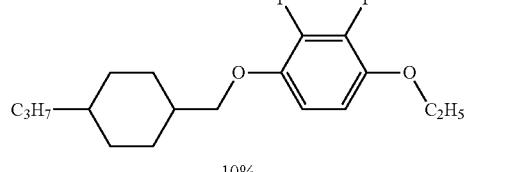
11%
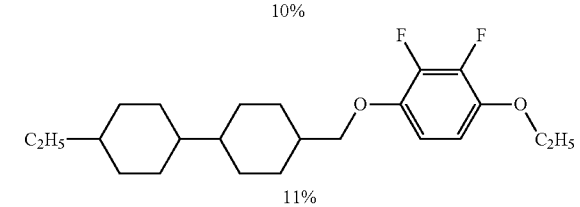
15%

-continued
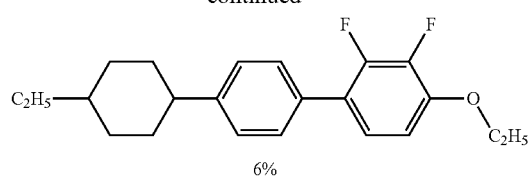
6%
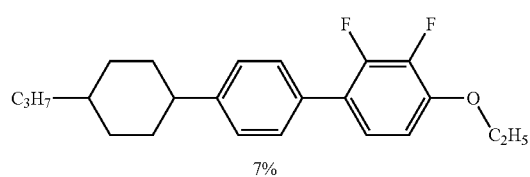
7%
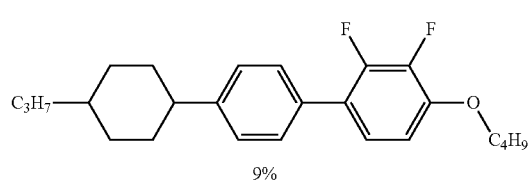
9%
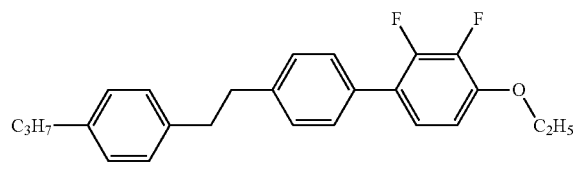
10%
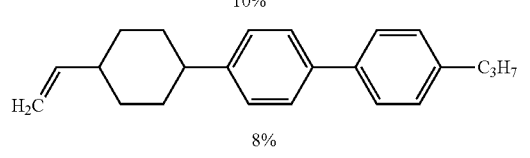
8%
(Liquid Crystal Composition "L-4")
[Chem. 138]
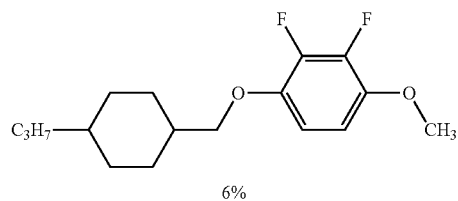
6%
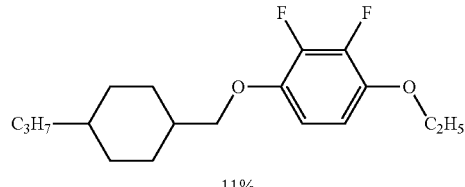
11%
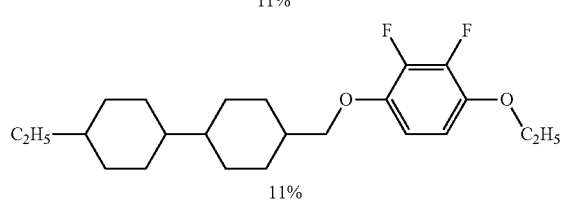
11%
-continued
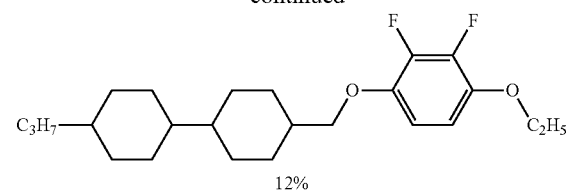
12%
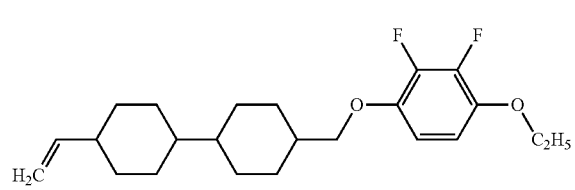
8%
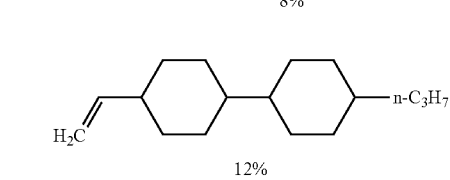
12%
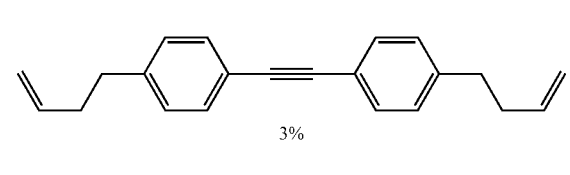
3%
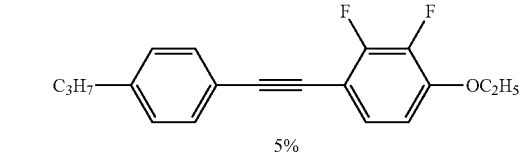
5%
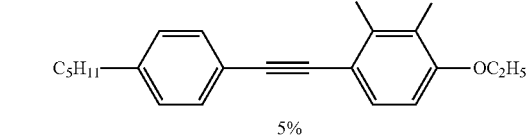
5%
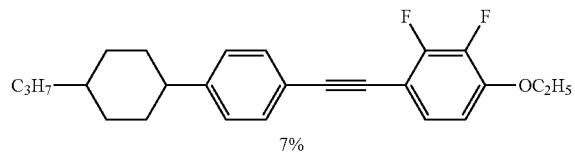
7%
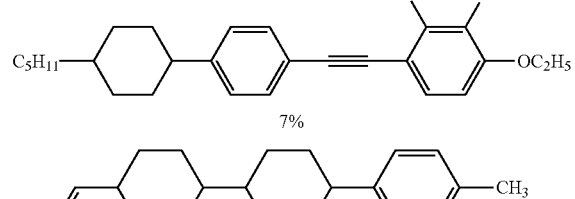
7%
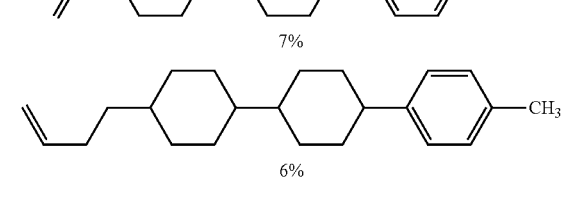
7%
6%

(Liquid Crystal Composition "L-5")
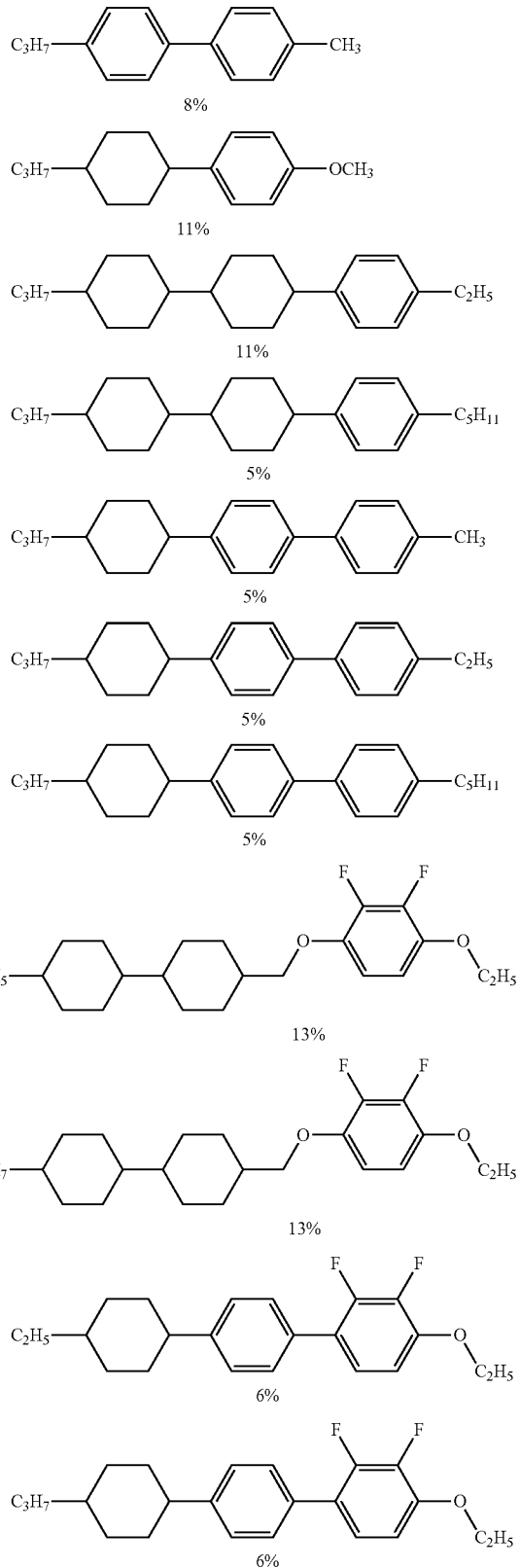
(Liquid Crystal Composition "L-6")
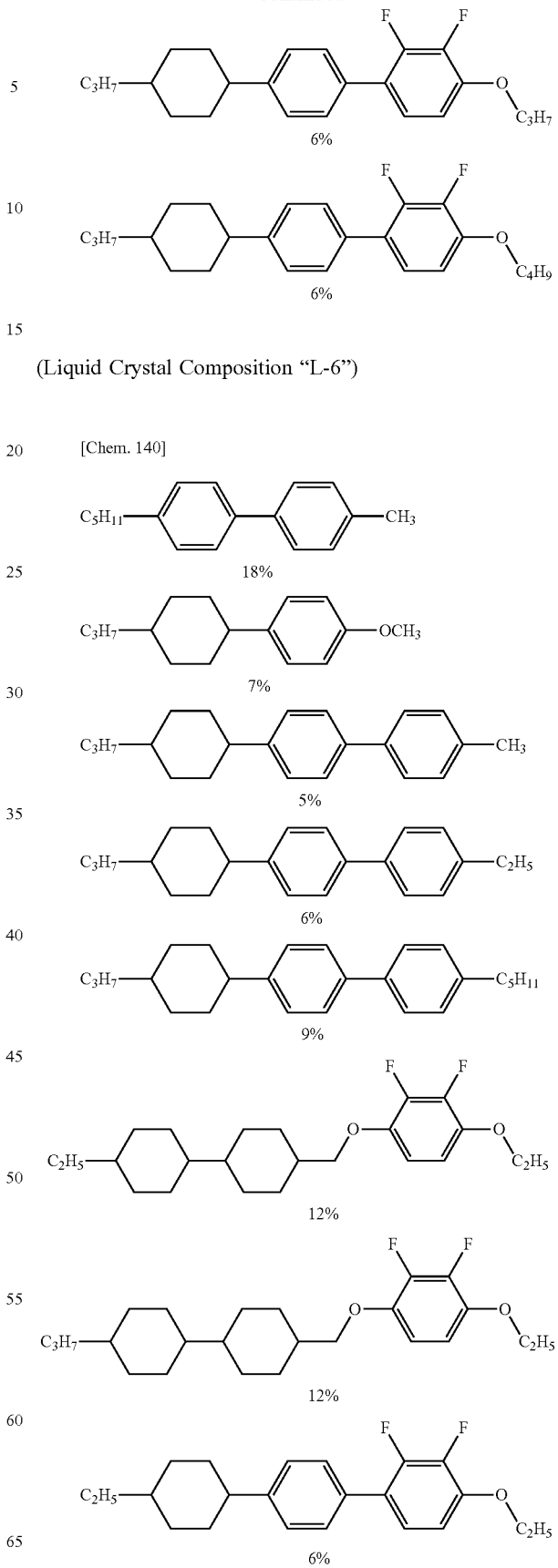

-continued

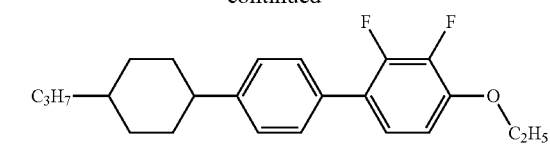
6%

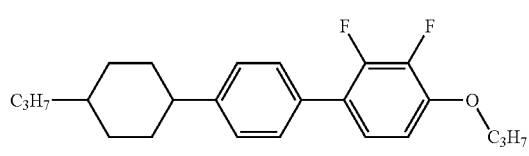
6%

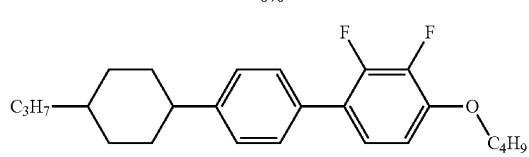
6%

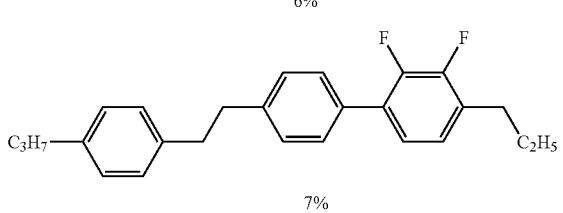
7%

(Liquid Crystal Composition "L-7")

[Chem. 141]

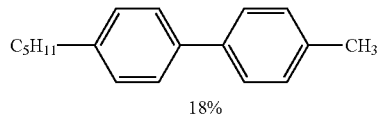
18%

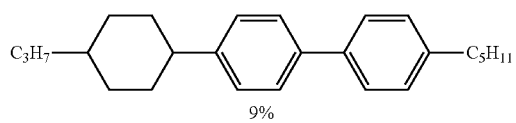
9%

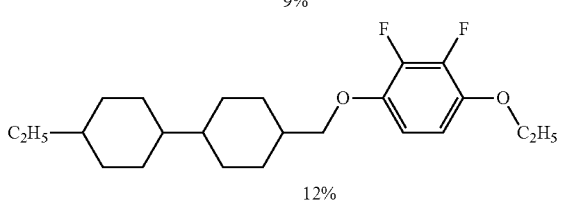
12%

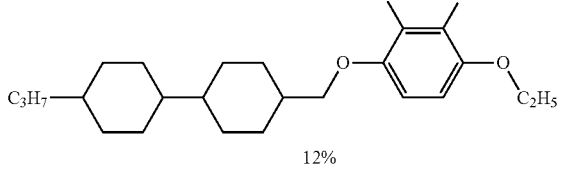
12%

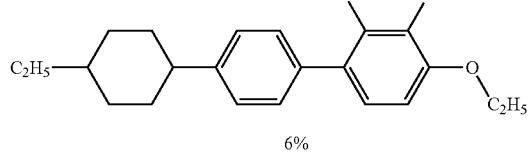
6%

-continued

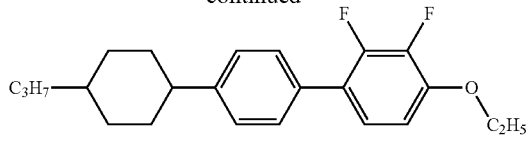
6%

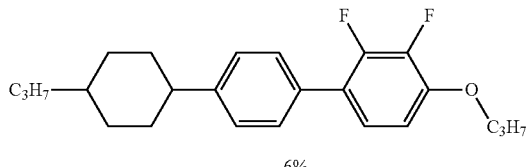
6%

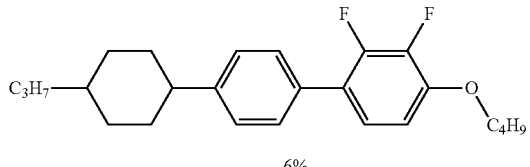
6%

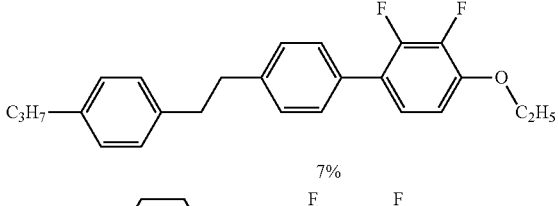
7%

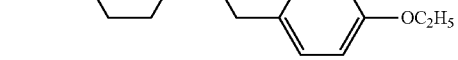
7%

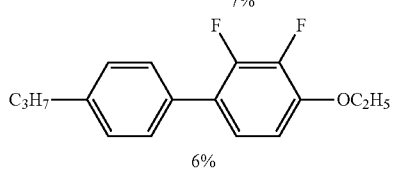
6%

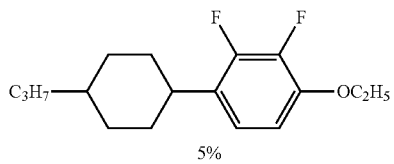
5%

A polymerizable composition "A1" having the following contents (mass %) of polymerizable compounds was prepared.

Polymerizable compositions "A1" to "A26" used in Examples and Comparative Examples are as follows (mass %).

(Polymerizable Composition "A1")
 Polymerizable compound (1-A): 50%
 Polymerizable compound (2-A): 35%
 Polymerizable compound (3-C): 15%
(Polymerizable Composition "A2")
 Polymerizable compound (1-A): 30%
 Polymerizable compound (2-A): 35%
 Polymerizable compound (3-A): 20%
 Polymerizable compound (3-C): 15%
(Polymerizable Composition "A3")
 Polymerizable compound (1-A): 40%
 Polymerizable compound (1-B): 15%
 Polymerizable compound (2-A): 30%

Polymerizable compound (3-C): 15%
(Polymerizable Composition "A4")
   Polymerizable compound (1-A): 50%
   Polymerizable compound (2-A): 50%
(Polymerizable Composition "A5")
   Polymerizable compound (1-A): 60%
   Polymerizable compound (2-A): 40%
(Polymerizable Composition "A6")
   Polymerizable compound (1-A): 50%
   Polymerizable compound (2-A): 35%
   Polymerizable compound (3-D): 15%
(Polymerizable Composition "A7")
   Polymerizable compound (1-A): 60%
   Polymerizable compound (3-C): 20%
   Polymerizable compound (3-D): 20%
(Polymerizable Composition "A8")
   Polymerizable compound (1-B): 100%
(Polymerizable Composition "A9")
   Polymerizable compound (1-B): 60%
   Polymerizable compound (3-C): 40%
(Polymerizable Composition "A10")
   Polymerizable compound (1-B): 60%
   Polymerizable compound (3-C): 20%
   Polymerizable compound (3-D): 20%
(Polymerizable Composition "A11")
   Polymerizable compound (1-A): 25%
   Polymerizable compound (2-A): 75%
(Polymerizable Composition "A12")
   Polymerizable compound (1-B): 46.6%
   Polymerizable compound (2-A): 53.4%
(Polymerizable Composition "A13")
   Polymerizable compound (1-A): 30%
   Polymerizable compound (1-B): 30%
   Polymerizable compound (2-A): 40%
(Polymerizable Composition "A14")
   Polymerizable compound (1-A): 50%
   Polymerizable compound (2-A): 40%
   Polymerizable compound (3-E): 10%
(Polymerizable Composition "A15")
   Polymerizable compound (1-A): 50%
   Polymerizable compound (2-A): 40%
   Polymerizable compound (3-F): 10%
(Polymerizable Composition "A16")
   Polymerizable compound (1-A): 50%
   Polymerizable compound (2-A): 40%
   Polymerizable compound (3-G): 10%
(Polymerizable Composition "A17")
   Polymerizable compound (1-A): 50%
   Polymerizable compound (2-A): 40%
   Polymerizable compound (3-H): 10%
(Polymerizable Composition "A18")
   Polymerizable compound (1-A): 50%
   Polymerizable compound (2-A): 40%
   Polymerizable compound (3-I): 10%
(Polymerizable Composition "A19")
   Polymerizable compound (1-A): 50%
   Polymerizable compound (2-A): 40%
   Polymerizable compound (3-J): 10%
(Polymerizable Composition "A20")
   Polymerizable compound (1-B): 46.6%
   Polymerizable compound (2-A): 43.4%
   Polymerizable compound (2-B): 10%
(Polymerizable Composition "A21")
   Polymerizable compound (1-B): 46.6%
   Polymerizable compound (2-A): 43.4%
   Polymerizable compound (2-C): 10%
(Polymerizable Composition "A22")
   Polymerizable compound (3-A): 100%
(Polymerizable Composition "A23")
   Polymerizable compound (3-A): 60%
   Polymerizable compound (3-C): 40%
(Polymerizable Composition "A24")
   Polymerizable compound (3-A): 60%
   Polymerizable compound (3-C): 20%
   Polymerizable compound (3-D): 20%
(Polymerizable Composition "A25")
   Polymerizable compound (3-C): 100%
(Polymerizable Composition "A26")
   Polymerizable compound (1-A): 30%
   Polymerizable compound (1-B): 30%
   Polymerizable compound (2-A): 20%
   Polymerizable compound (2-D): 20%
(Polymerizable Composition "A27")
   Polymerizable compound (1-A): 50%
   Polymerizable compound (1-E): 50%
(Polymerizable Composition "A28")
   Polymerizable compound (1-A): 50%
   Polymerizable compound (1-F): 50%

Example 1

A liquid crystal composition for a light-scattering liquid crystal device (polymerizable liquid crystal composition) was prepared by mixing 92 mass % of liquid crystal composition "L-1", 7.76 mass % of polymerizable composition "A1", and 0.24 mass % of benzyl dimethyl ketal as a polymerization initiator. The resulting polymerizable liquid crystal composition showed a nematic phase at normal temperature.

A liquid crystal cell in which two substrates each provided with a rectangle ITO transparent electrode and a polyimide alignment film material of a thickness of about 0.1 μm for vertical alignment were opposed to each other at an interval of 5 μm was prepared as a set.

The prepared polymerizable liquid crystal composition was poured in this cell by a vacuum injection method. The alignment state in the cell was verified approximately 10 minutes after the pouring, and it was confirmed that the polymerizable liquid crystal composition was uniformly aligned in the vertical direction.

Subsequently, the produced filled liquid crystal cell was irradiated with ultraviolet while maintaining at 25±1° C. to polymerize the polymerizable monomer to form a phase-separated liquid crystal layer from the polymerizable liquid crystal composition, thus producing a light-scattering liquid crystal device. On this occasion, the ultraviolet light source used was a metal halide lamp, and the irradiation with ultraviolet light was performed at an illumination of 8.6 mW/cm$^2$ for 240 seconds (total integrate energy: 2.1 J/cm$^2$). The illumination was measured using UNIMETER UIT-101 equipped with light receiver UVD-365PD manufactured by Ushio Inc.

The resulting liquid crystal device when no voltage was applied was in a transparent state, and no scattering was observed. It was thus confirmed that the liquid crystal was vertically aligned.

The voltage-transmittance characteristic was measured with an apparatus equipped with a light projector on one substrate surface side of the liquid crystal device and a light receiver on the other substrate surface side under conditions of not using any polarizing plate on the top and bottom of the liquid crystal device. The voltage-transmittance characteristic was measured by a method of applying a square wave between the electrodes of the liquid crystal device at a measurement temperature of 25° C., stepwise increasing the voltage in a range from 0 V to the saturation of the transmittance change, and recording the transmittance detected by the light receiver disposed on the opposite side of the light projector with respect to the liquid crystal device. It was confirmed that with an increase in voltage, the light scattering increased, and the transmittance decreased. On this occasion, the transmittances were measured at directions in which the light projection/receiving direction was in the normal direction (0°) with respect to the substrate of the liquid crystal device and in the direction (35°) tilted by 35 degrees from the normal line. The voltage-transmittance characteristic was measured with a liquid crystal characteristic measuring apparatus LCD-5200 (manufactured by Otsuka Electronics Co., Ltd.).

Transmittance Toff, Ton, and V10 were determined from the voltage-transmittance characteristic curve.

In the normal line (0°) direction, the transmittance Toff(0) when no voltage was applied was 87.3%, the saturation transmittance Ton(0) when a voltage was applied was 28.0%, and the applied voltage V10 to give 10% transmittance in the light transmittance change width was 17 V. The transmittance Toff(35) in the diagonal direction (35°) from the normal line when no voltage was applied was 84.7%.

In addition, the haze (Hz) of the liquid crystal device when the measurement light was incident in the normal direction with respect to the substrate of the liquid crystal device was measured with a haze meter (NDH-2000, manufactured by Nippon Denshoku Industries Co., Ltd.). The value of haze is determined from the total light transmittance (TT) and the parallel light transmittance (PT) by the following expression:

$$Hz=[\{TT-PT\}/TT]\times 100(\%).$$

The determined haze of the liquid crystal device was 1.0%.

Examples 2 to 25 and Comparative Examples 1 to 4

Liquid crystal compositions (polymerizable liquid crystal compositions) for lymer network liquid crystal device in Examples 2 to 25 and Comparative Examples 1 to 4 were prepared under the same conditions as in Example 1 except that the liquid crystal compositions, the polymerizable compositions, and the initiators shown in the following tables were used in the proportions shown in the tables. The resulting polymerizable liquid crystal compositions showed a nematic phase at normal temperature.

In addition, the transmittance Toff(0) when no voltage was applied, the saturation transmittance Ton(0) when a voltage was applied, and the applied voltage V10 to give 10% transmittance in the transmittance change width in the normal line (0°) direction, and the transmittance Toff (35) in the diagonal direction (35°) from the normal line when no voltage was applied, and the haze of the resulting liquid crystal device were measured under the same conditions as in Example 1, and the resulting values are shown in the following tables.

In addition, the list of the evaluation results in Examples 1 to 28 and Comparative Examples 1 to 4 is collectively shown in the following tables. The evaluation criteria are as follows.

Haze
  Excellent: less than 0.5,
  Good: 0.5 or more and less than 1.6,
  Fair: 1.6 or more and less than 4.0, and
  Poor: 4.0 or more.
ΔToff
  Excellent: less than 2.0,
  Good: 2.0 or more and less than 3.0,
  Fair: 3.0 or more and less than 4.0, and
  Poor: 4.0 or more.
Contrast
  Excellent: 12.0 or more,
  Good: 4.0 or more and less than 12.0,
  Fair: 2.0 or more and less than 4.0, and
  Poor: less than 2.0.
Driving Voltage V10
  Excellent: less than 16,
  Good: 16 or more and less than 31,
  Fair: 31 or more and less than 46, and
  Poor: 46 or more.

Incidentally, regarding Examples 24 to 26, the adhesion with a base material was also evaluated. The evaluation criteria are as follows.
  Excellent: no peeling from the substrate occurred after high temperature storage at 85° C. for 500 hours,
  Good: no peeling from the substrate occurred after high temperature storage at 85° C. for 100 hours, and
  Poor: peeling from the substrate occurred after high temperature storage at 85° C. for 24 hours.

TABLE 1

|  |  | Example 1 | Example 2 | Example 3 | Example 4 | Example 5 |
|---|---|---|---|---|---|---|
| Composition of complex liquid crystal composition | Liquid crystal composition | L-1 | L-1 | L-1 | L-1 | L-1 |
|  | Polymerizable composition | A1 | A2 | A3 | A4 | A5 |
|  | Proportion of liquid crystal composition in polymerizable liquid crystal composition (wt %) | 92 | 92 | 92 | 92 | 92 |
|  | Initiator [wt %] | 0.24 | 0.24 | 0.24 | 0.24 | 0.24 |
| Liquid crystal cell | Type of alignment film | Vertical | Vertical | Vertical | Vertical | Vertical |
|  | Liquid crystal layer thickness [μm] | 5 | 5 | 5 | 5 | 5 |
| Transmittance when no voltage is applied | Cell surface normal (0°) direction, transmittance when transparent, Toff(0) [%] | 87.3 | 88.6 | 89.4 | 88.7 | 89.3 |
|  | Cell surface diagonal (35°) direction, transmittance when transparent, Toff(35) [%] | 84.7 | 86.2 | 88.3 | 86.3 | 87.5 |
|  | ΔToff {Toff(0) − Toff(35)} [%] | 2.6 | 2.4 | 1.1 | 2.4 | 1.8 |
|  | Evaluation | Excellent | Excellent | Excellent | Excellent | Excellent |
| Transmittance when a voltage is applied | Cell surface normal (0°) direction, 10 V, transmittance [%] | 28.0 | 26.0 | 30.0 | 25.0 | 32.0 |
|  | Cell surface normal (0°) direction, 15 V, transmittance [%] | 10.2 | 8.2 | 11.5 | 7.9 | 8.0 |

TABLE 1-continued

|  |  | Example 1 | Example 2 | Example 3 | Example 4 | Example 5 |
|---|---|---|---|---|---|---|
|  | Cell surface normal (0°) direction, 20 V, transmittance [%] | 5.3 | 4.5 | 6.1 | 4.3 | 4.4 |
|  | Cell surface normal (0°) direction, saturation voltage, Ton(0) [%] | 3.7 | 3.5 | 4.6 | 3.4 | 3.5 |
|  | Evaluation | Good | Good | Good | Good | Good |
| Contrast | Toff(0)/Ton(0) | 24 | 25 | 19 | 26 | 28 |
|  | Evaluation | Excellent | Excellent | Good | Excellent | Excellent |
| Driving voltage | Voltage at 10% relative transmittance, V10 [V] | 17 | 15 | 19 | 12 | 14 |
|  | Evaluation | Good | Excellent | Good | Excellent | Fair |
| Saturation voltage | Voltage at 1% relative transmittance, V1 [V] | 25 | 23 | 27 | 19 | 22 |
|  | Evaluation | Good | Good | Good | Good | Good |
| Haze | Haze (when OFF), Hz [%] | 1.0 | 0.4 | 0.7 | 0.4 | 0.5 |
|  | Evaluation | Excellent | Excellent | Excellent | Excellent | Excellent |
|  | Haze (when ON), Hz [%] | 75(30 V) | 74(30 V) | 76(30 V) | 75(30 V) | 71(30 V) |
|  | Evaluation | Good | Good | Good | Good | Good |

TABLE 2

|  |  | Example 6 | Example 7 | Example 8 | Example 9 | Example 10 |
|---|---|---|---|---|---|---|
| Composition of complex liquid crystal composition | Liquid crystal composition | L-1 | L-2 | L-2 | L-3 | L-3 |
|  | Polymerizable composition | A6 | A5 | A7 | A8 | A9 |
|  | Proportion of liquid crystal composition in polymerizable liquid crystal composition [wt %] | 92 | 92 | 90 | 96 | 96 |
|  | Initiator [wt %] | 0.24 | 0.24 | 0.24 | 0.08 | 0.08 |
| Liquid crystal cell | Type of alignment film | Vertical | Vertical | Vertical | Vertical | Vertical |
|  | Liquid crystal layer thickness [μm] | 5 | 5 | 5 | 5 | 5 |
| Transmittance when no voltage is applied | Cell surface normal (0°) direction, transmittance when transparent, Toff(0) [%] | 87.6 | 88.1 | 87.4 | 87.0 | 86.8 |
|  | Cell surface diagonal (35°) direction, transmittance when transparent, Toff(35) [%] | 83.1 | 85.8 | 84.6 | 82.8 | 82.4 |
|  | ΔToff {Toff(0) − Toff(35)} [%] | 4.5 | 2.3 | 2.8 | 4.2 | 4.4 |
|  | Evaluation | Good | Excellent | Excellent | Good | Good |
| Transmittance when a voltage is applied | Cell surface normal (0°) direction, 10 V, transmittance [%] | 32.0 | 31.0 | 27.0 | 31.0 | 29.0 |
|  | Cell surface normal (0°) direction, 15 V, transmittance [%] | 12.0 | 11.7 | 8.1 | 10.0 | 8.0 |
|  | Cell surface normal (0°) direction, 20 V, transmittance [%] | 5.9 | 5.7 | 4.4 | 5.1 | 4.7 |
|  | Cell surface normal (0°) direction, saturation voltage, Ton(0) [%] | 4.6 | 4.5 | 3.5 | 3.5 | 3.5 |
|  | Evaluation | Good | Good | Good | Good | Good |
| Contrast | Toff(0)/Ton(0) | 19 | 20 | 25 | 25 | 25 |
|  | Evaluation | Good | Excellent | Excellent | Excellent | Excellent |
| Driving voltage | Voltage at 10% relative transmittance, V10 [V] | 18 | 18 | 14 | 14 | 13 |
|  | Evaluation | Good | Fair | Excellent | Good | Good |
| Saturation voltage | Voltage at 1% relative transmittance, V1 [V] | 27 | 26 | 22 | 22 | 21 |
|  | Evaluation | Good | Good | Good | Good | Good |
| Haze | Haze (when OFF), Hz [%] | 0.9 | 0.6 | 1.2 | 2.0 | 1.9 |
|  | Evaluation | Excellent | Excellent | Good | Good | Good |
|  | Haze (when ON), Hz [%] | 74(30 V) | 70(30 V) | (74(30 V) | 75(30 V) | 76(30 V) |
|  | Evaluation | Good | Good | Good | Good | Good |

TABLE 3

|  |  | Example 11 | Example 12 | Example 13 | Example 14 |
|---|---|---|---|---|---|
| Composition of complex liquid crystal composition | Liquid crystal composition | L-3 | L-3 | L-4 | L-4 |
|  | Polymerizable composition | A10 | A4 | A11 | A12 |
|  | Proportion of liquid crystal composition in polymerizable liquid crystal composition [wt %] | 96 | 92 | 86 | 92 |
|  | Initiator (wt %) | 0.08 | 0.16 | 0.28 | 0.28 |
| Liquid crystal cell | Type of alignment film | Vertical | Vertical | Vertical | Vertical |
|  | Liquid crystal layer thickness [μm] | 5 | 5 | 5 | 5 |
| Transmittance when no voltage is applied | Cell surface normal (0°) direction, transmittance when transparent, Toff(0) [%] | 86.7 | 88.8 | 86.7 | 87.0 |
|  | Cell surface diagonal (35°) direction, transmittance when transparent, Toff(35) [%] | 82.6 | 85.0 | 82.2 | 82.5 |
|  | ΔToff {Toff(0)−Toff(35)} [%] | 4.1 | 3.8 | 4.5 | 4.5 |
|  | Evaluation | Good | Good | Good | Good |
| Transmittance when a voltage is applied | Cell surface normal (0°) direction, 10 V, transmittance [%] | 28.0 | 75.8 | 16.3 | 15.0 |
|  | Cell surface normal (0°) direction, 15 V, transmittance [%] | 7.0 | 25.3 | 7.6 | 6.7 |
|  | Cell surface normal (0°) direction, 20 V, transmittance [%] | 4.5 | 10.5 | 6.1 | 6.0 |
|  | Cell surface normal (0°) direction, saturation voltage, Ton(0) [%] | 3.5 | 5.6 | 4.5 | 4.4 |
|  | Evaluation | Good | Good | Excellent | Excellent |
| Contrast | Toff(0)/Ton(0) | 25 | 16 | 19 | 20 |
|  | Evaluation | Excellent | Good | Good | Excellent |
| Driving voltage | Voltage at 10% relative transmittance, V10 [V] | 13 | 18.2 | 11 | 10 |
|  | Evaluation | Good | Good | Good | Excellent |
| Saturation voltage | Voltage at 1% relative transmittance, V1 [V] | 20 | 26 | 27 | 15 |
|  | Evaluation | Good | Good | Good | Excellent |
| Haze | Haze (when OFF), Hz [%] | 1.9 | 1.9 | 1.8 | 2.1 |
|  | Evaluation | Good | Good | Good | Good |
|  | Haze (when ON), Hz [%] | 76 (30 V) | 77 (30 V) | 76 (30 V) | 75 (10 V) |
|  | Evaluation | Good | Good | Good | Excellent |

TABLE 4

|  |  | Example 15 | Example 16 | Example 17 | Example 18 | Example 19 |
|---|---|---|---|---|---|---|
| Composition of complex liquid crystal composition | Liquid crystal composition | L-5 | L-6 | L-6 | L-6 | L-6 |
|  | Polymerizable composition | A13 | A13 | A14 | A15 | A16 |
|  | Proportion of liquid crystal composition in polymerizable liquid crystal composition [wt %] | 90 | 90 | 90 | 90 | 90 |
|  | Initiator [wt %] | 0.20 | 0.20 | 0.20 | 0.20 | 0.20 |
| Liquid crystal cell | Type of alignment film | Vertical | Vertical | Vertical | Vertical | Vertical |
|  | Liquid crystal layer thickness [μm] | 5 | 5 | 5 | 5 | 5 |
| Transmittance when no voltage is applied | Cell surface normal (0°) direction, transmittance when transparent, Toff(0) [%] | 88.5 | 88.8 | 88.6 | 88.5 | 88.7 |
|  | Cell surface diagonal (35°) direction, transmittance when transparent, Toff(35) [%] | 84.0 | 84.3 | 86.4 | 86.5 | 86.8 |
|  | ΔToff {Toff(0) − Toff(35)} [%] | 4.5 | 4.5 | 2.2 | 2.0 | 2.1 |
|  | Evaluation | Good | Good | Excellent | Excellent | Excellent |
| Transmittance when a voltage is applied | Cell surface normal (0°) direction, 10 V, transmittance [%] | 15.2 | 15.0 | 15.1 | 15.4 | 15.1 |
|  | Cell surface normal (0° C.) direction, 15 V, transmittance [%] | 6.8 | 6.7 | 6.8 | 7.0 | 6.7 |
|  | Cell surface normal (0°) direction, 20 V, transmittance [%] | 6.1 | 5.9 | 6.2 | 6.5 | 6.3 |
|  | Cell surface normal (0°) direction, saturation voltage, Ton(0) [%] | 4.7 | 4.6 | 4.2 | 4.3 | 4.4 |
|  | Evaluation | Excellent | Excellent | Excellent | Excellent | Excellent |
| Contrast | Toff(0)/Ton(0) | 19 | 19 | 21 | 21 | 20 |
|  | Evaluation | Good | Good | Excellent | Excellent | Excellent |
| Driving voltage | Voltage at 10% relative transmittance, V10 [V] | 10 | 9 | 10 | 11 | 9 |
|  | Evaluation | Excellent | Excellent | Excellent | Good | Excellent |
| Saturation voltage | Voltage at 1% relative transmittance, V1 [V] | 15 | 14 | 15 | 15 | 14 |
|  | Evaluation | Excellent | Excellent | Excellent | Excellent | Excellent |

TABLE 4-continued

|  |  | Example 15 | Example 16 | Example 17 | Example 18 | Example 19 |
|---|---|---|---|---|---|---|
| Haze | Haze (when OFF), Hz [%] | 1.8 | 1.9 | 0.7 | 0.9 | 0.7 |
|  | Evaluation | Good | Good | Excellent | Excellent | Excellent |
|  | Haze (when ON), Hz [%] | 76(10 V) | 77(10 V) | 75(10 V) | 76(10 V) | 75(10 V) |
|  | Evaluation | Excellent | Excellent | Excellent | Excellent | Excellent |

TABLE 5

|  |  | Example 20 | Example 21 | Example 22 | Example 23 |
|---|---|---|---|---|---|
| Composition of complex liquid crystal composition | Liquid crystal composition | L-6 | L-8 | L-6 | L-7 |
|  | Polymerizable composition | A17 | A18 | A19 | A13 |
|  | Proportion of liquid crystal composition in polymerizable liquid crystal composition [wt %] | 90 | 90 | 90 | 90 |
|  | Initiator [wt %] | 0.20 | 0.20 | 0.20 | 0.20 |
| Liquid crystal cell | Type of alignment film | Vertical | Vertical | Vertical | Vertical |
|  | Liquid crystal layer thickness [μm] | 5 | 5 | 5 | 5 |
| Transmittance when no voltage is applied | Cell surface normal (0°) direction, transmittance when transparent, Toff(0) [%] | 88.6 | 88.8 | 88.7 | 88.0 |
|  | Cell surface diagonal (35°) direction, transmittance when transparent, Toff(35) [%] | 86.1 | 88.4 | 86.5 | 85.7 |
|  | ΔToff {Toff(0)-Toff(35)} [%] | 2.5 | 2.4 | 2.2 | 2.3 |
|  | Evaluation | Excellent | Excellent | Excellent | Excellent |
| Transmittance when a voltage is applied | Cell surface normal (0°) direction, 10 V, transmittance [%] | 15.2 | 15.5 | 15.4 | 15.1 |
|  | Cell surface normal (0°) direction, 15 V, transmittance [%] | 6.8 | 7.2 | 7.0 | 6.9 |
|  | Cell surface normal (0°) direction, 20 V, transmittance [%] | 6.4 | 6.7 | 6.5 | 6.0 |
|  | Cell surface normal (0°) direction, saturation voltage, Ton(0) [%] | 4.2 | 4.1 | 4.3 | 4.4 |
|  | Evaluation | Excellent | Excellent | Excellent | Excellent |
| Contrast | Toff(0)/Ton(0) | 21 | 22 | 21 | 20 |
|  | Evaluation | Excellent | Excellent | Excellent | Excellent |
| Driving voltage | Voltage at 10% relative transmittance, V10 M | 9 | 10 | 10 | 10 |
|  | Evaluation | Excellent | Excellent | Excellent | Excellent |
| Saturation voltage | Voltage at 1% relative transmittance, V1 M | 14 | 15 | 15 | 15 |
|  | Evaluation | Excellent | Excellent | Excellent | Excellent |
| Haze | Haze (when OFF), Hz [%] | 0.8 | 0.6 | 0.4 | 0.8 |
|  | Evaluation | Excellent | Excellent | Excellent | Excellent |
|  | Haze (when ON), Hz [%] | 77 (10 V) | 76 (10 V) | 77 (10 V) | 75 (10 V) |
|  | Evaluation | Excellent | Excellent | Excellent | Excellent |

TABLE 6

|  |  | Example 24 | Example 25 | Example 26 | Example 27 | Example 28 |
|---|---|---|---|---|---|---|
| Composition of complex liquid crystal composition | Liquid crystal composition | L-4 | L-4 | L-6 | L-6 | L-6 |
|  | Polymerizable composition | A20 | A21 | A26 | A27 | A28 |
|  | Proportion of liquid crystal composition in polymerizable liquid crystal composition [wt %] | 92 | 92 | 88 | 88 | 88 |
|  | Initiator [wt %] | 0.28 | 0.28 | 0.20 | 0.20 | 0.20 |
| Liquid crystal cell | Type of alignment film | Vertical | Vertical | Vertical | Vertical | Vertical |
|  | Liquid crystal layer thickness [μm] | 5 | 5 | 10 | 10 | 10 |
| Transmittance when no voltage is applied | Cell surface normal (0°) direction, transmittance when transparent, Toff(0) [%] | 87.1 | 87.2 | 89.1 | 88.9 | 88.7 |
|  | Cell surface diagonal (35°) direction, transmittance when transparent, Toff(35) [%] | 82.6 | 82.7 | 87.3 | 87.1 | 86.9 |
|  | ΔToff {Toff(0) − Toff(35)} [%] | 4.5 | 4.5 | 1.8 | 1.8 | 1.8 |
|  | Evaluation | Good | Good | Excellent | Excellent | Excellent |
| Transmittance when a voltage is applied | Cell surface normal (0°) direction, 10 V, transmittance [%] | 15.1 | 15.0 | 20.3 | 21.5 | 20.6 |
|  | Cell surface normal (0°) direction, 15 V, transmittance [%] | 6.6 | 6.7 | 8.4 | 8.7 | 8.8 |
|  | Cell surface normal (0°) direction, 20 V, transmittance [%] | 6.0 | 6.0 | 6.8 | 7.2 | 7.1 |

TABLE 6-continued

|  |  | Example 24 | Example 25 | Example 26 | Example 27 | Example 28 |
| --- | --- | --- | --- | --- | --- | --- |
|  | Cell surface normal (0°) direction, saturation voltage, Ton(0) [%] | 4.4 | 4.3 | 4.8 | 4.7 | 4.7 |
|  | Evaluation | Excellent | Excellent | Excellent | Excellent | Excellent |
| Contrast | Toff(0)/Ton(0) | 20 | 20 | 19 | 18 | 18 |
|  | Evaluation | Excellent | Excellent | Good | Good | Good |
| Driving voltage | Voltage at 10% relative transmittance, V10 [V] | 10 | 10 | 14 | 15 | 17 |
|  | Evaluation | Excellent | Excellent | Good | Good | Good |
| Saturation voltage | Voltage at 1% relative transmittance, V1 [V] | 15 | 15 | 25 | 27 | 26 |
|  | Evaluation | Excellent | Excellent | Good | Good | Good |
| Haze | Haze (when OFF), Hz [%] | 2.0 | 2.0 | 1.9 | 1.8 | 1.8 |
|  | Evaluation | Good | Good | Good | Good | Good |
|  | Haze (when ON), Hz [%] | 74(10 V) | 75(10 V) | 77(50 V) | 78(50 V) | 76(50 V) |
|  | Evaluation | Excellent | Excellent | Good | Good | Good |

TABLE 7

|  |  | Comparative Example 1 | Comparative Example 2 | Comparative Example 3 | Comparative Example 4 |
| --- | --- | --- | --- | --- | --- |
| Composition of complex liquid crystal composition | Liquid crystal composition | L-3 | L-3 | L-3 | L-3 |
|  | Polymerizable composition | A22 | A23 | A24 | A25 |
|  | Proportion of liquid crystal composition in polymerizable liquid crystal composition [wt %] | 96 | 96 | 96 | 98 |
|  | Initiator [wt %] | 0.08 | 0.08 | 0.08 | 0.08 |
| Liquid crystal cell | Type of alignment film | Vertical | Vertical | Vertical | Vertical |
|  | Liquid crystal layer thickness [μm] | 5 | 5 | 5 | 5 |
| Transmittance when no voltage is applied | Cell surface normal (0°) direction, transmittance when transparent, Toff(0) [%] | 82.0 | 80.0 | 81.1 | 55.1 |
|  | Cell surface diagonal (35°) direction, transmittance when transparent, Toff(35) [%] | 77.5 | 75.7 | 76.7 | 50.0 |
|  | ΔToff {Toff(0) − Toff(35)} [%] | 4.5 | 4.3 | 4.4 | 5.1 |
|  | Evaluation | Good | Good | Good | Poor |
| Transmittance when a voltage is applied | Cell surface normal (0°) direction, 10 V, transmittance [%] | 32.0 | 30.0 | 29.0 | 53.0 |
|  | Cell surface normal (0°) direction, 15 V, transmittance [%] | 18.0 | 17.1 | 17.0 | 50.0 |
|  | Cell surface normal (0°) direction, 20 V, transmittance [%] | 9.0 | 8.2 | 8.2 | 48.0 |
|  | Cell surface normal (0°) direction, saturation voltage, Ton(0) [%] | 6.6 | 6.0 | 6.1 | 45.0 |
|  | Evaluation | Fair | Fair | Fair | Poor |
| Contrast | Toff(0)/Ton(0) | 12 | 13 | 13 | 1 |
|  | Evaluation | Fair | Fair | Fair | Poor |
| Driving voltage | Voltage at 10% relative transmittance, V10 [V] | 17 | 16 | 16 | — |
|  | Evaluation | Good | Good | Good | Poor |
| Saturation voltage | Voltage at 1% relative transmittance, V1 [V] | 38 | 37 | 36 | — |
|  | Evaluation | Poor | Poor | Poor | Poor |
| Haze | Haze (when OFF), Hz [%] | 2.0 | 2.1 | 1.9 | 11.0 |
|  | Evaluation | Good | Good | Good | Poor |
|  | Haze (when ON), Hz [%] | 61(30 V) | 63(30 V) | 65(30 V) | 62(30 V) |
|  | Evaluation | Fair | Fair | Fair | Fair |

In general, in the light-scattering liquid crystal device, the transparency (haze and ΔToff), contrast, and driving voltage are incompatible with each other. However, the results above demonstrate that in Examples, all of these factors are maintained at high levels. The liquid crystal devices of Examples have particularly practical transparency and are therefore suitable for applications requiring high transparency, such as see-through TVs, window displays, smart windows, and other optical-control driving panels.

The results above demonstrate that the results of Comparative Example 1 were inferior to Examples in all of transparency, contrast, and driving voltage. Although the reasons are unclear, Comparative Examples 1 to 4 do not use a polymerizable compound forming a flexible mesogen structure having a structure of $Z^1$ in the mesogen skeleton represented by the general formula (1) but use a polymerizable compound forming a rigid mesogen skeleton, and it is inferred that this is due to the strong intermolecular interaction between the driving host liquid crystal and the rigid polymer network when the polymer network is formed.

Figure 3:
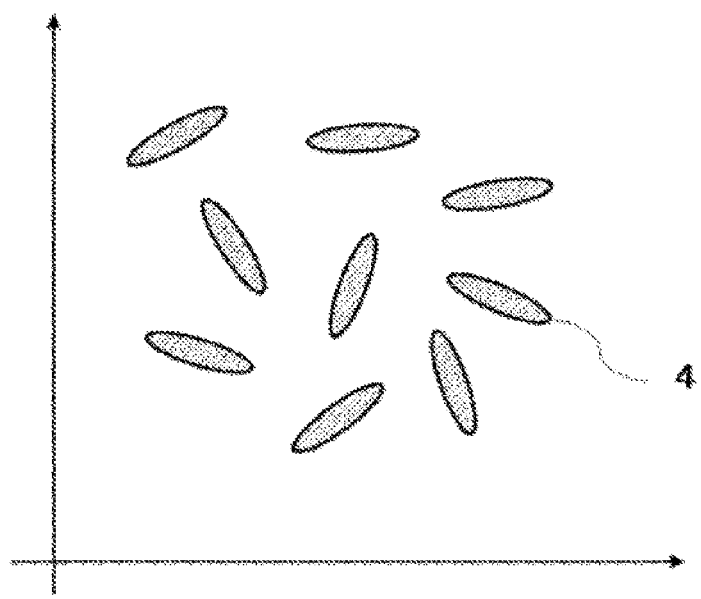
FIG. 3 is a perspective view of the state of FIG. 2 from a direction perpendicular to the transparent substrate.

In a liquid crystal device constituted by using a liquid crystal composition having a negative dielectric anisotropy, although the liquid crystal molecules are aligned in a direction approximately parallel to the substrate surface when a voltage is applied, the molecular longitudinal axis can rotate freely with a direction substantially perpendicular to the substrate surface as the rotation axis. Accordingly, as shown in FIG. 3, it is thought that the liquid crystal molecules of the liquid crystal device are randomly aligned in the direction approximately parallel to the substrate surface. It is inferred that as a result, a refractive index difference occurs not only between the liquid crystal molecule and the mesogen group of the aligning polymer but also between the liquid crystal molecules, and light scattering can be effectively obtained in the whole phase-separated liquid crystal layer.

REFERENCE SIGNS LIST

11 first transparent substrate
12 second transparent substrate
2 electrode
3 homogeneous alignment film
4 liquid crystal molecule
5 aligning polymer

The invention claimed is:
1. A light-scattering liquid crystal device comprising a liquid crystal layer comprising a polymer network formed by polymerizing a liquid crystal composition, and a pair of alignment films each in direct contact with the liquid crystal layer;
the composition comprising at least two polymerizable compound selected from the group consisting of compounds represented by following general formula (1) as a first component and comprising a compound having a negative dielectric anisotropy as a second component:

$$P^1-S^1-X^1-(A^1-Z^1)_n-A^2-X^2-S^2-P^2 \quad (1)$$

in the formula, $P^1$ and $P^2$ are each independently represented by the following formulae (P-1) to (P-20);

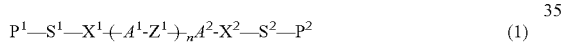 (P-1)

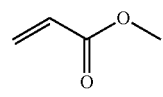 (P-2)

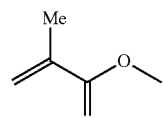 (P-3)

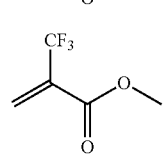 (P-4)

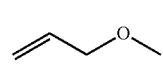 (P-5)

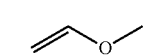 (P-6)

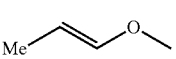 (P-7)

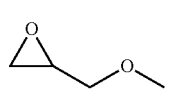 (P-8)

-continued

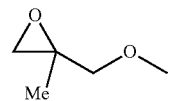 (P-8)

 (P-9)

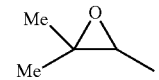 (P-10)

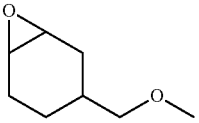 (P-11)

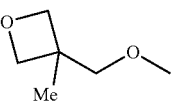 (P-12)

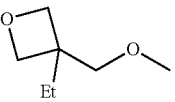 (P-13)

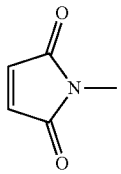 (P-14)

HS— (P-15)

 (P-16)

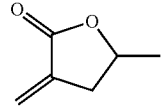 (P-17)

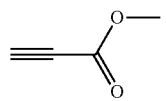 (P-18)

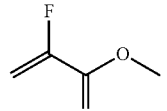 (P-19)

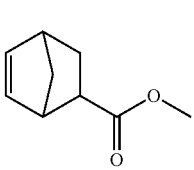 (P-20)

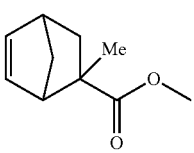

$S^1$ and $S^2$ each independently represent a linear alkylene group having 2 to 8 carbon atoms, a fluorine-substituted alkylene group having 2 to 6 carbon atoms, an alkylene group having 4 to 14 carbon atoms in which the alkylene group is partially substituted by —O—, or a single bond;
$X^1$ and $X^2$ each independently represent —O—, —S—, —OCH$_2$—, —CO—, —COO—, —OCO—, —CO—S—, —S—CO—, —O—CO—O—, or a single bond, provided that each $P^1$—($S^1$—$X^1$)— and each ($X^2$—$S^2$)—$P^2$ bond does not include —O—O—;
$Z^1$ represents —O—, —S—, —OCH$_2$—, —CH$_2$O—, —CO—, —COO—, —OCO—, —CO—S—, —S—CO—, —O—CO—O—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—$R^{Z1}$—, —OCO—$R^{Z1}$—, —$R^{Z1}$—COO—, —$R^{Z1}$—OCO—, —COO—CH$_2$—, —OCO—CH$_2$—, —CH$_2$—COO—, —CH$_2$—OCO—, —CH=CH—, —CH$_2$CH$_2$—, or a single bond, provided that —$R^{Z1}$— represents an alkylene group having 2 to 6 carbon atoms, and when multiple $Z^1$s are present, $Z^1$s are the same or different provided that at least one of $Z^1$s represents a group selected from the group consisting of —COO— $R^{Z1}$—, —OCO—$R^{Z1}$—, —$R^{Z1}$—COO—;
$A^1$ and $A^2$ each independently represent a group selected from the following (a) to (c):
(a) a trans-1.4-cyclohexylene group, one methylene group or two or more non-adjacent methylene groups present in this group may be substituted by —O— or —S—;
(b) a phenylene group, one —CH= group or two or more non-adjacent —CH= groups present in this group may be substituted by a nitrogen atom; and
(c) a cyclohexenylene group, a bicyclo(2.2.2)octylene group, a piperidine group, a naphthalene group, a decahydronaphthalene group, and a tetrahydronaphthalene group, wherein one or two or more hydrogen atoms present in the above-mentioned groups (a), (b), (c) may be each independently substituted by a fluorine atom, a chlorine atom, an alkyl group having 1 to 8 carbon atoms, a halogenated alkyl group having 1 to 8 carbon atoms, a halogenated alkoxy group having 1 to 8 carbon atoms, or an alkoxy group having 1 to 8 carbon atoms, and when multiple $A^1$s are present, $A^1$s are the same or different; and
n each independently represents an integer of 2 to 4,
the composition comprising a polymerizable compound, as a third component, represented by a following general formula (2-ii):

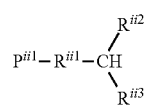
(2-ii)

in the formula, $P^{ii1}$ represents a polymerizable functional group;
$R^{ii1}$ represents a single bond or an alkylene group having 1 to 9 carbon atoms, and one or two or more —CH$_2$— groups in the alkylene group are each independently optionally substituted by —O—, —CO—, —COO—, or —OCO— in such a manner that oxygen atoms are not directly adjacent to each other, and one or two or more hydrogen atoms present in the alkylene group are each independently optionally substituted by a fluorine atom;

$R^{ii2}$ and $R^{ii3}$ each independently represent a hydrogen atom or an alkyl group having 1 to 21 carbon atoms, and one or two or more —CH$_2$— groups in the alkyl group are each independently optionally substituted by —O—, —CO—, —COO—, or —OCO— in such a manner that oxygen atoms are not directly adjacent to each other, and one or two or more hydrogen atoms present in the alkyl group are each independently optionally substituted by $P^{ii2}$, a fluorine atom, an alkyl group having 1 to 8 carbon atoms, or a halogenated alkyl group having 1 to 8 carbon atoms; or
a polymerizable compound represented by a following general formula (3-i):

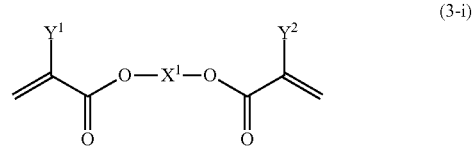
(3-i)

in the formula, $Y^1$ and $Y^2$ each represent a hydrogen atom or a methyl group; and
$X^1$ represents linear or branched alkylene having 6 to 80 carbon atoms, where an arbitrary carbon atom of the alkylene is optionally substituted by —O—, —CH=CH—, —CO—, —C≡C—, —OCO—, —COO—, or OH in such a manner that oxygen atoms are not directly adjacent to each other, and
wherein a ratio of the first component to a total mass of the first component and the third component is 10% by mass or more and 85% by mass or less, and
wherein the pair of alignment films are selected from a group consisting of a homeotropic alignment film without rubbing and a homeotropic alignment layer formed by polymerizing a spontaneous vertical alignment monomer.

2. The light-scattering liquid crystal device according to claim 1, the composition comprising one or two or more compounds represented by a general formula (N-1) as the compound having a negative dielectric anisotropy of the second component:

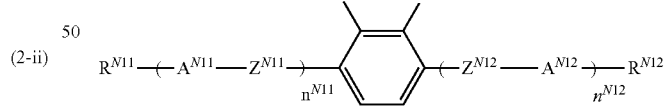
(N-1)

in the formula, $R^{N11}$ and $R^{N12}$ each independently represent an alkyl group having 1 to 8 carbon atoms, and one or two or more non-adjacent —CH$_2$— groups in the alkyl group are each independently optionally substituted by CH=CH—, —C≡C—, —O—, —CO—, —COO—, or —OCO—;
$A^{N11}$ and $A^{N12}$ each independently represent a group selected from the group consisting of:
(a) a 1,4-cyclohexylene group, one —CH$_2$— group or two or more non-adjacent —CH$_2$— groups present in this group are optionally substituted by —O—;
(b) a 1,4-phenylene group, one —CH= group or two or more non-adjacent —CH= groups present in this group are optionally substituted by —N=;

(c) a naphthalene-2,6-diyl group, a 1,2,3,4-tetrahydronaphthalene-2,6-diyl group, or a decahydronaphthalene-2,6-diyl group, one —CH= group or two or more non-adjacent —CH= groups present in the naphthalene-2,6-diyl group or the 1,2,3,4-tetrahydronaphthalene-2,6-diyl group are optionally substituted by —N=; and (d) a 1,4-cyclohexenylene group, and the groups (a), (b), (c), and (d) are each independently optionally substituted by a cyano group, a fluorine atom, or a chlorine atom;

$Z^{N11}$ and $Z^{N12}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and $n^{N11}$ and $n^{N12}$ each independently represent an integer of 0 to 3, provided that $n^{N11}+n^{N12}$ is each independently 1, 2, or 3, and when multiple $A^{N11}$s, $A^{N12}$s, $Z^{N11}$s, or $Z^{N12}$s are present, $A^{N11}$s, $A^{N12}$s, $Z^{N11}$s, or $Z^{N12}$s are the same or different.

3. The light-scattering liquid crystal device according to claim 1, wherein a content percentage of the first component with respect to the total mass of the first component and the second component is 2 to 20 mass %.

4. A smart window using the light-scattering liquid crystal device according to claim 1.

5. The light-scattering liquid crystal device according to claim 1, comprising at least one compound according to general formula (2-ii) and at least one compound according to general formula (3-i).

6. The light-scattering liquid crystal device according to claim 1, comprising at least two compounds according to general formula (2-ii) or general formula (3-i).

* * * * *